US008755578B1

(12) United States Patent
Smolyar

(10) Patent No.: US 8,755,578 B1
(45) Date of Patent: Jun. 17, 2014

(54) SYSTEM AND METHOD FOR QUANTIFICATION OF SIZE AND ANISOTROPIC STRUCTURE OF LAYERED PATTERNS

(71) Applicant: Igor Vladimir Smolyar, Charlestown, WV (US)

(72) Inventor: Igor Vladimir Smolyar, Charlestown, WV (US)

(*) Notice: Subject to any disclaimer, the term of this patent is extended or adjusted under 35 U.S.C. 154(b) by 129 days.

(21) Appl. No.: 13/653,479

(22) Filed: Oct. 17, 2012

Related U.S. Application Data

(60) Provisional application No. 61/547,804, filed on Oct. 17, 2011.

(51) Int. Cl.
*G06K 9/00* (2006.01)

(52) U.S. Cl.
USPC ............................................ 382/128

(58) Field of Classification Search
None
See application file for complete search history.

(56) References Cited

U.S. PATENT DOCUMENTS

| 4,373,393 A | 2/1983 | Heikkenen |
| 2010/0067804 A1 | 3/2010 | Okochi |
| 2011/0115787 A1 | 5/2011 | Kadlec |

FOREIGN PATENT DOCUMENTS

GB 2202119 A 9/1988

OTHER PUBLICATIONS

Cooley and W.G. Franzin, ("image analysis of walleye, opercula for age and growth studies", minister of supply and services canada 1995).*

J.M. Casselman, ("Age and Growth Assessment of Fish from Their Calcified structures—Techniques and Tools", in "NOAA Technical Report NMFS 8. Proceedings of the International Workshop on Age Determination of Oceanic Pelagic Fishes: Tunas, Billfishes, and Shark", Feb. 1982).*
Guth, P.L., Drainage basin morphometry:a global snapshot from the shuttle radar topography mission,Hydrol. Earth Syst. Sci., 15, 2091-2099, 2011, doi: 10.5194/hess-15/2091-2011.
Lehner, B., K. Verdin, and A. Jarvis (2008), New Global Hydrography Derived From Spaceborne Elevation Data, Eos Trans. AGU, 89(10), 93-94, doi:10.1029/2008EO100001.
Slater et al., Global Assessment of the new ASTER Global Digital Elevation Model, [Photogrammetric Engineering & Remote Sensing, 77(4), 2011, pp. 335-349.
McEwen, A.S., et al., Mars Reconnaissance Orbiter's High Resolution Imaging Science Experiment (HiRISE),. J. Geophys. Res., 112, EO5S02, 2007, doi: 10.1029/2005JE002605.
Rea, J. and R. Knight, Geostatistical analysis of ground-penetrating radar data: A means of describing spatial variation in the subsurface,Water Resour. Res., 34(3), 329-339,1998, doi: 10.1029/97WR03070.
Hayward, R.K., et al., 2007, Mars Global Digital Dune Database: MC2-MC29: U.S. Geological survey Open File Report 2007-1158.

(Continued)

*Primary Examiner* — Amara Abdi
(74) *Attorney, Agent, or Firm* — Rosenberg, Klein & Lee

(57) ABSTRACT

Parameterization of incremental patterns of various categories is provided by a computer system. The computer system initially undergoes filtering of the incremental patterns under study. Transects are plotted in a predetermined direction to growth incremental bands, and converted into an anisotropic structure in a 2-D domain. The width of the incremental bands along transects are calculated in combination with the area of incremental bands between neighboring transects. The structure of the incremental bands along with the width and area of the incremental hands across a 2-D plane for different levels of noise are calculated. Noise is reduced by averaging width and area across the 2-D plane. Indices of adequacy of the model and structural anisotropy of the incremental patterns are calculated.

20 Claims, 49 Drawing Sheets

(56) References Cited

OTHER PUBLICATIONS

Casselman, J.M., Age and Growth Assessment of Fish from Their Calcified Structures—Techniques and Tools, in "NOAA Technical Report NMFS 8. Proceedings of the International Workshop on Age Determination of Oceanic Pelagic Fishes: Tunas, Billfishes, and Shark," edited by E.D. Prince and L.M. Pulos, 1983, pp. 1-17.

"Sockeye Salmon (*Oncorhynchus nerka*) Population Biology and Future Management," edited by H.D. Smith, L. Margolis, and C.C. Wood, Canadian Special Publication of Fisheries and Aquatic Sciences 98, 1987, pp. 327-334.

Friedland, et al.,Linkage between ocean climate, post-smolt growth, and survival of Atlantic Salmon (*Salmo salar* L.) in the North Sea, 2000, ICES of Marine Science 57:419-429.

I. Smolyar, et al.Mathematical Model of Fish Scales and algorithms for their analysis, Kola Branch of the Russian Academy of Sciences, Preprint, Apatity, 1988, pp. 1-22.

I. Smolyar, et al., Discrete model of fish scale incremental pattern: a formalization of the 2D anisotropic structure, ICES J. of Mar. Sc. 2004, vol. 61, pp. 992-1003.

P.F.A. Alkemade,Propulsion of Ripples on Glass by Ion Bombardment, Phys. Rev. Lett., 96, 107602, 2006.

Morales-Nin, B., A. Lombarte and B. Japon, Approaches to otolith age determination: image signal treatment and age attribution, Sci. Mar., 62(3): 247-256, 1998.

Jansma, E., P. W. Brewer and I. Zandhuis, TRiDaS 1.1: The tree-ring data standard, Elsevier, Nov. 30, 2009.

Cooley, P.M. and W.G. Franzin, Image Analysis of Walleye (*Stizostrdion vitreum vitreum*) Opercula for Age and Growth Studies, Canadian Technical Report of Fisheries and Aquatic Sciences 2055, 1995.

WinDENDRO 2005: An Image Analysis System for Tree-Rings Analysis, www.reagentinstruments.com.

Conner, W.S and R.A. Schowengerdt, Design of a Computer Vision Based Tree Ring Dating System, 1998 IEEE Southwest Symposium on Image Analysis and Interpretation, Apr. 5-7, 1998.

Jones, C.M., 1992. Development and application of the otolith increment technique, p. 1-11. In D.K. Stevenson and S. E. Campana [ed.] Otolith microstructure examination and analysis. Can Spec. Publ. Fish. Aquat. Sci. 117.

Cerda, M, N. Hitschfeld-Kahler and D. Mery, Robust Tree-Ring Detection, PSIVT 2007, LNCS 4872, pp. 575-585, 2007.

von Arx, G. and H. Dietz, A Tool for the Analysis of Annual Root rings in Perennial Forbs, Media Cybernetics Applications Note, http://www.mediacy.com/index.aspx?page=AH_RootRing.

Choimaa, L., G. Helle, T. Neubert, G. Schleser, K. Ziemons and H. Rongen, Videobild basiertes Baumjahresring-Analyse System, irtuelle Instrumente in der Praxis, Begleitband zum Kongress VIP 2005 ISBN: 3-7785-2947-1, Seite 68.

Laggoune, H., M. Sarifuddin and V. Guesdon, Tree-ring Analysis, Canadian Conference on Electrical and Computer Engineering, Jun. 2005, IEEE 2005.

Nagy, E. and M. Nagy, Image Processing as a Possibility of Automatic Quality Control, Annals of the Faculty of Engineering Hunedoara, 2004, Tome II, Fascicole 1.

Aynekulu, E., M. Denich and B. Neuwirth, The applicability of GIS in Dendrochronology.

Szedlmayer, S.T., M. Szedlmayer, and M.E. Sieracki, Automated Enumeration by Computer Digitization of Age-0 Weakfish *Cynoscion regalis* Scale Circuli, Manuscript accepted Nov. 14, 1990, Fishery Bulletin, U.S. 89:337-340 (1991).

\* cited by examiner

Earth sand ripples

Martian layered landscape

Iguana bone

Fish scale

Human Bone

Nano ripples

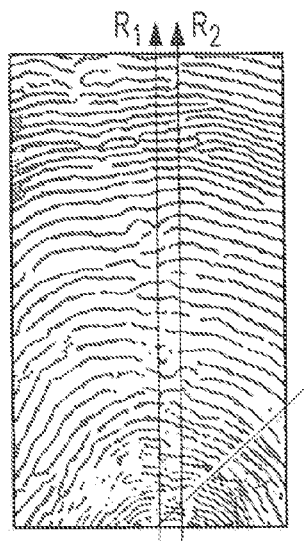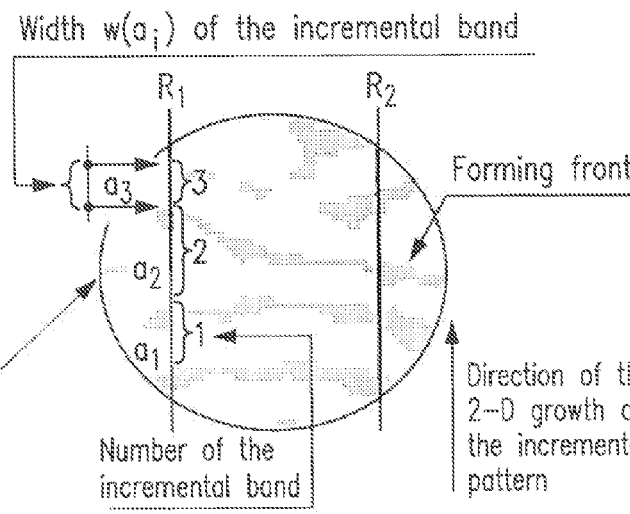
FIG. 2A
Prior Art
FIG. 2B
Prior Art
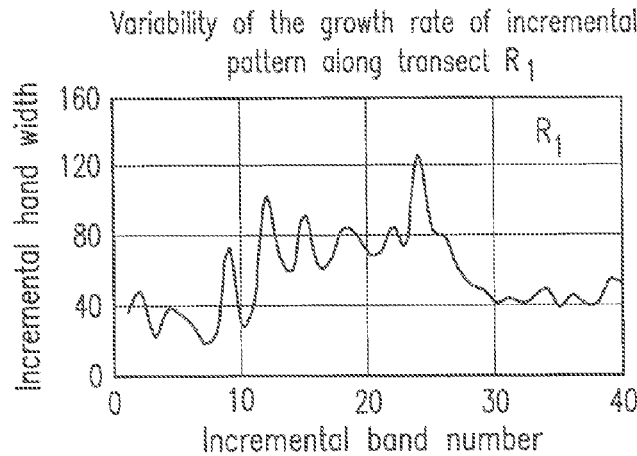
FIG. 2C
Prior Art
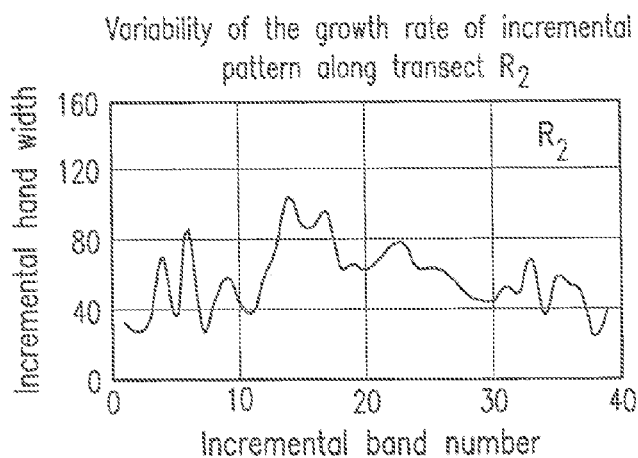
FIG. 2D
Prior Art

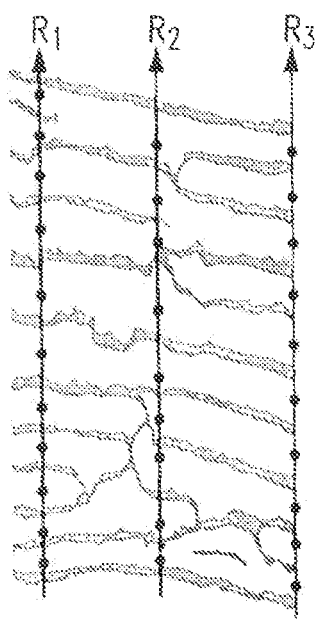
FIG. 3A
Prior Art
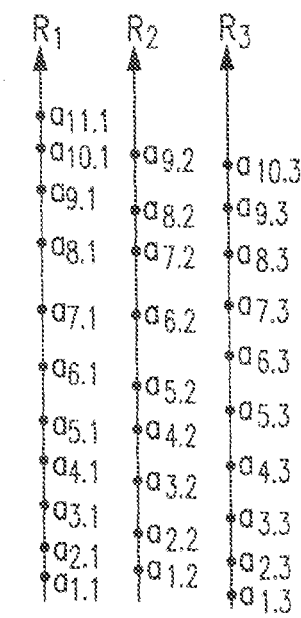
FIG. 3B
Prior Art
Table 1 ($F_{m,n}$)
| IB number, i | Width $w(a_{ij})$, of IB | | |
|---|---|---|---|
| | $R_1$ | $R_2$ | $R_3$ |
| 1 | 16 | 16 | 21 |
| 2 | 16 | 25 | 19 |
| 3 | 24 | 26 | 24 |
| 4 | 20 | 26 | 29 |
| 5 | 26 | 28 | 29 |
| 6 | 31 | 43 | 29 |
| 7 | 27 | 17 | 23 |
| 8 | 36 | 29 | 27 |
| 9 | 21 | 31 | 22 |
| 10 | 21 | | 21 |
| 11 | 17 | | |
FIG. 3C
Prior Art IB=Incremental Band
B — IB number $(A_L)$
W $(A_L)$ — IB average width
L $(A_L)$ — IB length Table 2

| B($A_L$) | W($A_L$) | L($A_L$) |
|---|---|---|
| 1 | 18 | 3 |
| 2 | 19 | 3 |
| 3 | 16 | 2 |
| 4 | 21 | 1 |
| 5 | 19 | 1 |
| 6 | 21 | 2 |
| 7 | 24 | 1 |
| 8 | 25 | 2 |
| 9 | 20 | 1 |
| 10 | 28 | 2 |
| 11 | 26 | 1 |
| 12 | 29 | 3 |
| 13 | 33 | 3 |
| 14 | 23 | 1 |
| 15 | 27 | 2 |
| 16 | 26 | 3 |
| 17 | 21 | 1 |
| 18 | 22 | 1 |
| 19 | 23 | 3 |
| 20 | 20 | 3 |
| 21 | 21 | 3 |
| 22 | 23 | 3 |
| 23 | 25 | 3 |

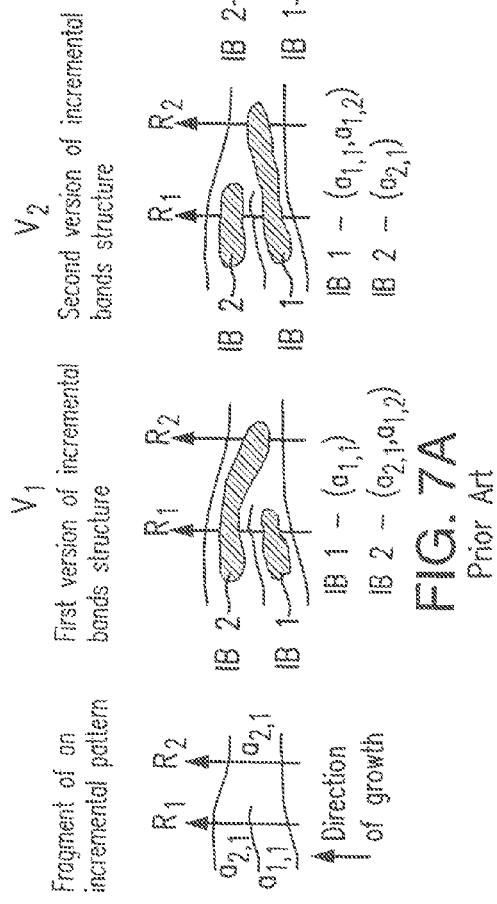
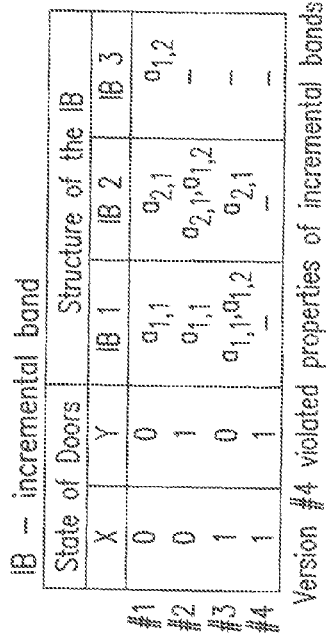
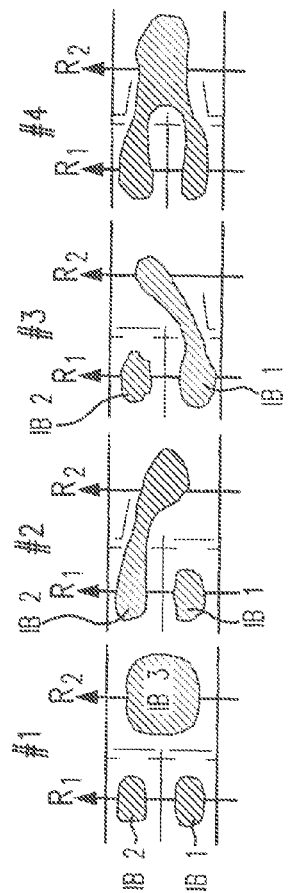
FIG. 7A Prior Art
FIG. 7B Prior Art
FIG. 7C Prior Art

```
 1  nCLUSTER = startClusterBLACK_PIXEL - 1
 2  For m = 1 To yMAX - yMIN 'yMAX - yMIN is the y length of the pattern
 3      For n = xMIN To xMAX
 4          If Cells(m + yMIN, n).Value = blackPixelCODE Then
 5              nCLUSTER = nCLUSTER + 1
 6              Cells(m + yMIN, n).Value = nCLUSTER
 7              Set_1(1,1) = m + yMIN: Set_1(1,2) = n
 8              n_1 = 1: n_2=0
 9              loopCODE = 1
10              Do While loopCODE = 1
11                  For i = 1 To n_1
12                      yCoord = Set_1(i, 1): xCoord = Set_1(i,2)
13                      If Cells(yCoord - 1, xCoord - 1).Value = blackPixelCODE Then
14                          Cells(yCoord - 1, xCoord - 1).Value = nCLUSTER
15                          n_2 = n_2 + 1
16                          Set_2(n_2, 1) = yCoord - 1: Set_2(n_2, 2) = xCoord - 1
17                      End If
18                      If Cells(yCoord - 1, xCoord).Value = blackPixelCODE Then
19                          Cells(yCoord - 1, xCoord).Value = nCLUSTER
20                          n_2 = n_2 + 1
21                          Set_2(n_2,1) = yCoord - 1: Set_2(n_2,2) = xCoord
22                      End If
23                      If Cells(yCoord - 1, xCoord + 1).Value = blackPixelCODE Then
24                          Cells(yCoord - 1, xCoord + 1).Value = nCluster
25                          n_2 = n_2 + 1
26                          Set_2(n_2,1) = yCoord - 1: Set_2(n_2, 2) = xCoord + 1
27                      End If
28                      If Cells(yCoord, xCoord - 1).Value = blackPixelCODE Then
29                          Cells(yCoord, xCoord - 1).Value = nCLUSTER
30                          n_2 = n_2 +1
31                          Set_2(n_2, 1) = yCoord: Set_2(n_2,2) = xCoord - 1
32                      End If
```

Cont from FIG 13B

| | |
|---|---|
| 33 | If Cells(yCoor, xCoord + 1). Value = blackPixelCODE Then |
| 34 | Cells(yCoord, xCoord + 1). Value = nCLUSTER |
| 35 | n_2 = n_2 + 1 |
| 36 | Set_2(n_2,1) = yCoord: Set_2(n_2,2) = xCoord + 1 |
| 37 | End If |
| 38 | If Cells(yCoord + 1, xCoord - 1). Value = blackPixelCODE Then |
| 39 | Cells(yCoord + 1, xCoord - 1). Value = nCLUSTER |
| 40 | n_2 = n_2 + 1 |
| 41 | Set_2(n_2,1) = yCoord + 1: Set_2(n_2,2) = xCoord - 1 |
| 42 | End If |
| 43 | If Cells(yCoord + 1, xCoord). Value = blackPixelCODE Then |
| 44 | Cells(yCoord + 1, xCoord). Value = nCLUSTER |
| 45 | n_2 = n_2 + 1 |
| 46 | Set_2(n_2, 1) = yCoord + 1: Set_2(n_2,2) = xCoord |
| 47 | End If |
| 48 | If Cells(yCoord + 1, xCoord + 1). Value = blackPixelCODE Then |
| 49 | Cells(yCoord + 1, xCoord + 1). Value = nCLUSTER |
| 50 | n_2 = n_2 + 1 |
| 51 | Set_2(n_2, 1) = yCoord + 1: Set_2(n_2,2) + xCoord + 1 |
| 52 | End If |
| 53 | Next i |
| 54 | If n_2 > 0 Then |
| 55 | n_1 = n_2 |
| 56 | For j = 1 To n_2: Set_1(j, 1) = Set_2(j,1): Set_1(j, 2) = Set_2(j, 2): Next j |
| 57 | n_2 = 0 |
| 58 | Else |
| 59 | loopCODE = 2 |
| 60 | End If |
| 61 | Loop |
| 62 | End If |
| 63 | Next n |
| 64 | Next m |

FIG. 13B continued

Incremental Pattern Before Segmentation

Black and White Incremental
Pattern in the CSV Format

| Structure of Incremental Bands Before Sorting | Structure of Incremental Bands After Sorting Over T |
|---|---|
| 1. $pw_{1,1}$ $pw_{2,2}$ $pw_{3,3}$ | 1.           $pw_{2,1}$ $pw_{3,1}$ |
| 2. $pw_{1,2}$ $pw_{2,3}$ | 10.                    $pw_{3,2}$ |
| 3. $pw_{1,3}$ $pw_{2,5}$ $pw_{3,5}$ | 1. $pw_{1,1}$ $pw_{2,2}$ $pw_{3,3}$ |
| 4. $pw_{1,4}$ | 2. $pw_{1,2}$ $pw_{2,3}$ |
| 5. $pw_{1,5}$ $pw_{2,7}$ $pw_{3,6}$ | 7.           $pw_{2,4}$ $pw_{3,4}$ |
| 6.           $pw_{2,1}$ $pw_{3,1}$ | 3. $pw_{1,3}$ $pw_{2,5}$ $pw_{3,5}$ |
| 7.           $pw_{2,4}$ $pw_{3,4}$ | 4. $pw_{1,4}$ |
| 8.           $pw_{2,6}$ | 8.           $pw_{2,6}$ |
| 9.           $pw_{2,8}$ $pw_{3,7}$ | 5. $pw_{1,5}$ $pw_{2,7}$ $pw_{3,6}$ |
| 10.                    $pw_{3,2}$ | 9.           $pw_{2,8}$ $pw_{3,7}$ |

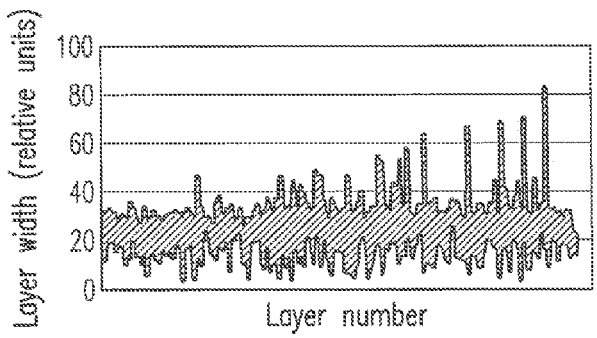

1) Number of transects: 140.
2) Averaged over one version of incremental bands' structure, i.e. signal/noise = 1.
3) All incremental bands are taken into account irrespective of their length.

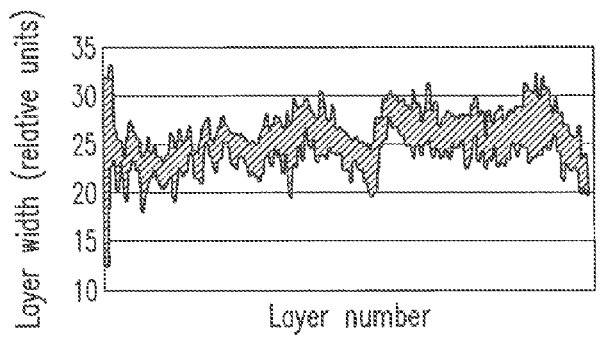

1) Number of transects: 140.
2) Averaged over 36 versions of incremental bands' structure, i.e. signal/noise = 6
3) All incremental bands are taken into account irrespective of their length.

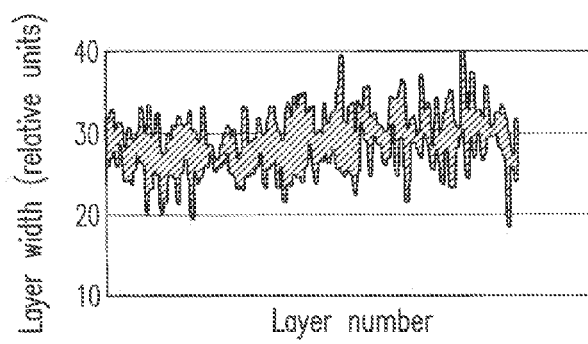

1) Number of transects: 140.
2) Averaged over one version of incremental bands' structure, i.e. signal/noise = 1.
3) Incremental bands are taken into account with length > 10.

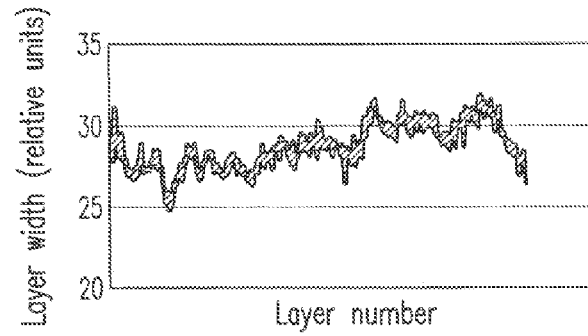

1) Number of transects: 140.
2) Averaged over 36 versions of incremental bands' structure, i.e. signal/noise = 6.
3) Incremental bands are taken into account with length > 10.

FIG. 24C

SYSTEM AND METHOD FOR QUANTIFICATION OF SIZE AND ANISOTROPIC STRUCTURE OF LAYERED PATTERNS

REFERENCE TO RELATED APPLICATIONS

The present Utility Patent Application is based on the Provisional Application No. 61/547,804 filed on 17 Oct. 2011.

FIELD OF THE INVENTION

The present invention relates to a study of natural phenomena, and particularly, to the study of layered patterns (aka incremental patterns) resulting from growth processes found in biological systems and formation processes of geological objects, as well as to the study of nano- (micro, as well as millimeter) scale ripples formed on different categories of solid surfaces and in nanotechnology fabrication.

The present invention also relates to a computer-based analysis and parameterization of incremental patterns, such as nano- (and millimicron) ripples, as well as incremental patterns formed in the hard tissues of biological objects, such as, for example, fish scales, bones of animals and humans, as well as layered geological patterns, such as, for example, underwater and terrestrial sand ripples, dunes, sediment profiles, etc.

Even more in particular, the present invention relates to a computer analysis of layered patterns, and to processing, with a reduced level of noise, of layered patterns with structural anisotropy with the purpose of quantification of the size and structure of the layered patterns across of 2-D plane.

Additionally, the present invention relates to a quantitative description, in a 2-dimensional domain, of cyclic variability of layered patterns with the purpose of characterization of historic aspects and/or mechanisms of the layered patterns formation.

DESCRIPTION OF THE RELATED ART

Growth processes in biological systems and formation of layered geological objects on the Earth, Mars, and other planets, give rise to a rich variety of incremental patterns. The study of the patterns' sizes and structures may provide valuable information about both the mechanisms of patterns formation, as well as various aspects of their functions.

As is seen in FIGS. 1A-1F, there is a striking similarity between growth layers of various biological systems, the configuration of layered geological objects, and nano- (as well as micro- and milli) ripples found in nanotechnology and semiconductor devices fabrication contrary to their differences in size and physical nature.

Recently developed new technologies of imaging of geological objects (Guth, P. L., "Drainage basin morphometry: a global snapshot from the shuttle radar topography mission", Hydrol. Earth Syst., 15, 2091-2099, doi: 10.5194/hess-15-2091-2011, 2011; Lehner et al., "New Global hydropathy derived from spaceborne elevation data", EOS, 98, 2008, 93-94; Slater et al., "Global Assessment of the new ASTER Global Digital Elevation Model", Photogrammetric Engineering & Remote Sensing, 77(4), 2011, pp. 335-349; McEwen, A. S., et al., "Mars Reconnaissance Orbiter's High Resolution Imaging Science Experiment (HiRISE), J. Geophys. Res., 112, EO5S02, 2007, doi:10.1029/2005 JE002605), as well as ground penetrating radar (Rea, J. and R. Knight, "Geostatistical analysis of ground-penetrating radar data: A means of describing spatial variation in the subsurface", Water Resour. Res., 34(3), 1998, 329-339, doi:10.1029/97WR03070) permitted to obtain a large number of images of layered geological objects.

Incremental patterns are a primary source of information about the duration and amplitude of periodic phenomena, as well as about other natural events occurring during a period of formation. The information about cyclicity of events, interactions between environmental and/or physiological cycles, perturbations, etc., are all inherently contained within incremental biological and geological patterns.

Incremental patterns, as shown in FIGS. 1A-1F, include incremental bands, i.e., are layered. The width of each layer is a reflection of a growth rate of biological objects. The layer analysis also is an important source of information for study of layered geological formations on Earth and other planets. Access to the images of the incremental patterns (Hayward, R. K., et al., 2007, Mars Global Digital Dune Database: MC2-MC29: U.S. Geological Survey Open File Report 2007-1158. [http://pubs.usgs.gov/of/2007/1158/]) greatly facilitates the layered pattern formations study.

The significance of the study of layers (incremental bands) for biological research is that changes in layer widths potentially reflect internal and external events in the life of an organism.

Since many incremental structures preserve their pattern in either a form of a resilient hard tissue, or as a fossil, the information about the growth rate is preserved well after formation, thus providing means for study of the chronological aspects of development of biological objects, as well as the accretion rates in the recent and distant past that cannot be examined otherwise.

The analysis of incremental patterns, with respect to the recognition of history of pattern formation includes two basic steps. In the first step, an incremental pattern is quantified, i.e., a plot of "Growth Rate vs. Time" is constructed. In the second step, features are extracted from this plot and various processing methods are applied to analyze the growth rate formed in the incremental patterns in order to recognize events in history of the pattern formation.

Commonly used algorithms, (i.e., J. M. Casselman, "Age and Growth Assessment of Fish from Their Calcified structures—Techniques and Tools," in "NOAA Technical Report NMFS 8. Proceedings of the International Workshop on Age Determination of Oceanic Pelagic Fishes: Tunas, Billfishes, and Shark", Edited by E. D. Prince and L. M., Pulos, 1983, pp. 1-17; R. C. Cook, et al., InSeasonal Stock Identification of Sockeye Salmon (*Oncorhynchus nerka*) Using Scale Pattern Recognition, In "Sockeye Salmon (*Oncorhynchus nerka*) Population Biology and Future Management", Edited by H. D. Smith, L. Margolis, and C. C. Wood, Canadian Special Publication of Fisheries and Aquatic Sciences 98, 1987, pp. 327-334; and Friedland, et al., "Linkage between ocean climate, post-smolt growth, and survival of Atlantic salmon (*Salmo salar* L.) in the North Sea", 2000, ICES of Marine Science 57:419-429) of the quantification of growth rate in an incremental pattern found in a fish scale include the following steps:

Step 1: as shown in FIG. 2A, a transect R (i.e., $R_1$ and $R_2$) is arbitrarily plotted from its initiation point to its outer margin;

Step 2: as shown in FIG. 2B, each incremental band (IB) crossed by the transect R is labeled ($a_1, a_2, a_3 \ldots a_i$) in the direction of growth. The label ($a_i$) of incremental band is associated with the time $T_i$, i.e., it is assumed that the incremental band $a_i$ was formed during the time $T_i$;

Step 3: as also shown in FIG. 2B, the width of each of the incremental bands $a_1, a_2, \ldots$ is measured. A chart of "Incremental band width vs. Incremental band number" is plotted for each transect $R_1$ and $R_2$, as shown in FIGS. 2C-2D, respectively. Due to the fact that the width $w(a_i)$ of the incremental band $a_i$ is assumed to be the measure of the growth rate of the incremental band $a_i$ at a time instance $T_i$, the charts, shown in FIGS. 2C-2D, represent the variability of the growth rate of an incremental band along the respective transect $R_1$ and $R_2$.

This approach may have the following shortcomings:

(a). the shape of the chart shown in FIGS. 2C-2D is sensitive to the direction of plotting a transect R. Minor changes in the direction of plotting the transect R ($R_1$ vs. $R_2$), may cause significant changes in the plots, as shown in FIG. 2C vs. FIG. 2D, thus making the plot unstable with respect to the chosen direction of measuring the width of incremental bands due to the structural anisotropy of each incremental pattern.

(b). each plot shown in FIGS. 2C-2D, describes the variability of the growth rate of an incremental pattern along one transect R (either $R_1$ or $R_2$). However, the incremental patterns are 2-D objects. If the measure of the width of incremental bands is carried out along a single transect, then the 2-D incremental pattern is merely being reduced to a 1-D domain. In this case the potentially important information relevant to the interpretation of growth rate can be lost.

Another approach (I. Smolyar, et al., "Mathematical Model of Fish Scales and algorithms for their analysis", Kola Branch of the Russian Academy of Sciences, Preprint, Apatity, 1988, pp. 1-22; and I. Smolyar, et al., "Discrete model of fish scale incremental pattern: a formalization of the 2D anisotropic structure," *ICES J. of Mar. Sc.* 2004, Vol. 61, pp. 992-1003) for the quantification of the growth rate of incremental patterns is presented in FIGS. 3A-3C. This technique contemplates drawing n transects $R_1, \ldots, R_j, \ldots, R_n$ over the incremental bands in directions perpendicular to their propagating front, as shown in FIG. 3A. As shown in FIG. 3B, vertexes $a_{i,j}$ are found, each of which is the point of intersection of an incremental band $a_i$ with a transect $R_j$.

A growth rate is assumed to be proportional to an incremental band width. An incremental width $W(a_{i,j})$ is the width of the incremental band (IB) $a_i$ at the transect $R_j$. Along every transect applied to the incremental pattern, temporal points associated with each increment permit the documentation of the growth rate at time points $T_i$, $T_{i+1}$, $T_{i+2}$, ....

Table 1 ($F_{mn}$) containing the incremental width $W(a_{i,j})$ of each incremental band $a_i$ respective the transect $R_j$, is shown in FIG. 3C, wherein the $W(a_{i,j})$ is a measure of a growth rate at a time point $T_i$ along the transect $R_j$.

If the structure is isotropic, then the same number of incremental bands m cross each transect $R_i$, and there is an exact correspondence between $a_{i,j} \in R_j$, and $a_{i,j+1} \in R_{j+1}$ where, $i=1, \ldots, m$, and $j=1, \ldots, n$.

However, the incremental patterns in question are commonly of an anisotropic nature, for which incremental bands may be defined in various ways as presented in the following paragraphs.

Shown in FIG. 4A, an arbitrarily chosen structure for 23 incremental bands $A_1, \ldots, A_p, \ldots, A_{23}$ is presented. The structure of the incremental band $A_p$ which crosses k transects $R_1, \ldots, R_k$ is determined by the set of k vertices $a_1, a_2, \ldots, a_k$, where $A_p=(a_1, a_2, \ldots a_k)$, and the length of the incremental band $A_p$ is $L(A_p)=k$.

In FIG. 4B, the parameter L(A) relates to an actual number of times an incremental band is crossed by transects. This is a tool for evaluating the level of anisotropy of the incremental structure under study. In the case of an isotropical pattern, L(A)=number of transects crossing each incremental band. In the opposite case, when L(A)=1 for each incremental band, i.e., only one transect crosses each incremental band, the structure is characterized by the highest level of anisotropy.

The width of the band $A_p$ representing the growth rate at time point $T_i$, incremental bands have the following properties:

(i) Incremental bands cannot intersect each other;
(ii) Incremental bands cannot merge; and
(iii) Incremental band $A_i$ cannot cross the transect $R_j$ more than once.

Any arbitrarily chosen segment of the incremental bands must be in agreement with the above properties.

The average width W(A) of an incremental band A which crosses k transects:

$$W(A)=[w(a_1)+w(a_2)+ \ldots +w(a_k)]/k \quad \text{(Eq. 1)}$$

The length $L(A_i)$ and average width $W(A_i)$ for every incremental band $A_i$ of the incremental pattern depicted in FIG. 4A are presented in the Table 2 shown in FIG. 4B, where the band length $L(A_i)$ is a measure of its structural integrity, i.e., the level of continuity expressed by increments for a given number and placement of transects.

The greater the value of $L(A_i)$ reflects the higher the confidence value that is the average width $W(A_i)$ is a measure of the growth rate of the incremental pattern (IP) at a time point $T_i$ rather than a source of "noise" caused by the IP's structural anisotropy.

In contrast, a lower value of the parameter $L(A_i)$ reflects a higher level of anisotropy and, consequently, a lower confidence in the description of the incremental pattern growth rate through an incremental band's average width.

Quantification of a highly anisotropic structure is presented in FIGS. 5A-5D. As may be seen in FIGS. 5A-5C, the incremental structure under study has a minimal isotropy (i.e. it is the most anisotropic), and thus has a low relative structural integrity. In this case, all areas (segments) of the incremental pattern (presented in FIGS. 5A-5C) are to be used to quantify the growth rate of the overall incremental pattern.

The result of the quantification of the growth rate of an incremental pattern with structural anisotropy is presented as a set of 2-D plots (for each segment, i.e. shown in FIGS. 5A-5C, of the overall structure) rendering, when combined together, a pseudo 3-D chart, shown in FIG. 5D. This pseudo 3-D chart represents the results for an arbitrarily chosen structural solution of anisotropic incremental bands presented in FIGS. 5A-5C.

When a 2-D chart "W(A) vs. T", is constructed, it is desirable to use the L(A)=n, i.e., the set of incremental bands crossed by all transects $R_1, \ldots, R_n$, that is, to use a portion of the incremental pattern under study having a maximum (if not ultimate) isotropy, and thus relatively high structural integrity. In the case presented in FIGS. 5A-5C, not all areas of the incremental patterns are used for the quantification of the growth rate. If, however, L(A)=1, then the plot "W(A) vs. T" is constructed from all incremental bands regardless of L(T).

Since it is impossible to know in advance what value of L(A) is optimal for the quantification of the growth rate of an incremental pattern and recognition of the organismal life history, the final 3-D plot "W(A) vs. T vs. L(A)", shown in FIG. 5D, is built of plots "W(A) vs. T" for all possible values of L(A).

Referring to FIGS. 6A-6B, a model M of a fish scale is constructed which is the combination of a structure and size of incremental bands:

$$M=\{G(n), F_{m,n}\} \quad \text{(Eq. 2)}$$

where G(n) is an n-partite graph which represents an incremental pattern structure, and $F_{m,n}$ is the Table 1 presented in FIG. 3C.

FIG. 6B depicts typical elements of the incremental structure (FIG. 6A) and their corresponding graphs, where each vertex $a_{i,j}$ is associated with the point of intersection between an incremental band $a_i$ and a transect $R_j$.

Vertices $a_{1,j}$, $a_{2,j}$, . . . situated along the transect $R_j$, j=1, . . . n form a class of vertices $A_j$. Vertices belonging to the class $A_j$, j=2, . . . n−1, may only be connected across to vertices from classes $A_{j−1}$ and $A_{j+1}$. The vertex $a_{i,j}$ is connected with the vertex $a_{i,j+1}$ if an edge between $a_{i,j}$ and $a_{i,j+1}$ crosses zero forming fronts of the bands.

In terms of the graph G(n), the description of the structure of incremental bands needs to solve several problems. First of all, a set of paths in G(n) is to be found which connects vertices of classes $A_1$, . . . , $A_n$, which would include all vertices of G(n) that satisfy the properties of IBs. This problem is typical in graph theory, and a wide range of methods have been developed for their solution, for example, in F. Harrary, "Graph Theory", Mass, 1969.

The description of the structure of a fish scale pattern in terms of a Boolean function has been introduced for the comparison of different versions of incremental band structures. For example, FIG. 7A depicts a simple fragment of a fish scale pattern. The combination of two incremental bands $A_1$ and $A_2$ forms two versions, $V_1$ and $V_2$, of the incremental bands structure. To define all possible versions, the notions of "door open" and "door closed" are introduced, as shown in FIG. 7B.

FIG. 7C represents all possible versions of the states of doors X and Y, and thus, all possible versions of the incremental bands structure. In this approach, the incremental bands structure is a function of "states of doors". Because X takes two values, the Hamming metric has been applied to quantify the difference $D(V_i, V_k)$ between versions of the incremental band structures $V_i$ and $V_k$:

$$D(V_i, V_k) = |X_i - X_k| + |Y_i - Y_k| + \ldots \quad (Eq. 3)$$

where $X_k$ and $X_i$ are the states of the door X for versions of incremental band structures $V_k$ and $V_i$, respectively.

For the versions $V_1$ and $V_2$ of the incremental band structures illustrated in FIG. 7A, the difference between $V_1$ and $V_2$ is $$D(V_1, V_2) = |0 - 1| + |1 - 0| = 2 \quad (Eq. 4)$$

This is the maximum possible difference between versions of the structure for the fragment portrayed in FIG. 7A.

$V_1$ and $V_2$ are two versions of structure of incremental bands that differ maximally from one another. Each version of $V_1$ and $V_2$ corresponds to the 3-D chart of the growth rate $GR(V_1)$ and $GR(V_2)$ shown in FIG. 8.

The distance $$D_k = |GR(V_1)_k - GR(V_2)_k| \quad (Eq. 5)$$

between surfaces $GR(V_1)_k$ and $GR(V_2)_k$ at an individual point k cannot exceed $$w_{max}(A) - w_{min}(A) \quad (Eq. 6)$$

where $w_{max}(A)$ and $w_{min}(A)$ are the widest and the narrowest incremental bands, respectively.

Thus, the value $$q_k = D_k / (w_{max}(A) - w_{min}(A)) \quad (Eq. 7)$$

is the difference in growth rate between two versions of incremental bands structure on the continuous scale [0,1].

If $q_k=1$, then the distance between $GR(V_1)$ and $GR(V_2)$ surfaces is maximal, a description of growth rate variability at the point k greatly depends on the incremental band structure.

If, however, $q_k=0$, then the incremental structure growth rate is independent of incremental band structure, i.e. the incremental structure is isotropic.

Values $0<q_k<1$ take an intermediate place between the two extreme cases. Q is the index of structural anisotropy of an 2-D incremental pattern:

$$Q = (\Sigma q_k)/k \quad (Eq. 8)$$

This parameter is the measure the sensitivity of the growth rate (GR) to a variability in the incremental band structure. The value of Q depends on the number of transects that are being used for constructing the structure $M = \{G(n), F_{m,n}\}$.

Generally, a greater number N of transects $R_j$ sufficient for the description of the size and structure of incremental bands, provides for a greater amount of incremental pattern details which may be taken into consideration, and thus the greater the value of Q may be attained. At least an "N" number of transects are used to construct the model of an incremental pattern and calculate the index of structural anisotropy. The addition of transects to the "N" which is sufficient to describe the size and structure of the bands does not change the value of Q.

For the fish scale of Atlantic salmon, shown in FIG. 8, two 3-D charts, i.e., the $GR(V_1)$-Surface 1 and $GR(V_2)$-Surface 2 are plotted for two opposite "states of doors", i.e., $V_1$ and $V_2$ depicted in FIGS. 7A-7C.

The charts $GR(V_1)$-Surface 1 and $GR(V_2)$-Surface 2 reflect two periods of growth, i.e., $\Delta T_1$ and $\Delta T_2$, of the fish scale. The first period $\Delta T_1$ is characterized by the high growth rate, and the second $\Delta T_2$ is characterized by the low growth rate. The diagram for the Surface 3 is the mathematical subtraction (i.e. comparison) of $GR(V_1)$ from $GR(V_2)$, demonstrating that anisotropy is confined mainly to the growth period $\Delta T_1$ i.e.

$$Q(\Delta T_1) > Q(\Delta T_2) \quad (Eq. 9)$$

The visual comparison of charts describing anisotropy for two fish scales derived from two different fish, shown in FIG. 9A, demonstrates that anisotropy is higher during the growth period $\Delta T_1$ than during the growth period $\Delta T_2$. The index of structural anisotropy of the Fish scale 1 is smaller than that of the Fish scale 2, as shown in FIG. 9B, i.e., $$Q(\text{Fish scale 1}) < Q(\text{Fish scale 2}). \quad (Eq. 10)$$

The above approach of analyzing of incremental patterns with structural anisotropy has a number of disadvantages. The main disadvantage is the lack of a detailed step-by-step methodology for converting an initial incremental pattern into a 2-D model.

Another disadvantage is based on the assumption that an initial incremental pattern contains no noise, while in reality, incremental patterns contain at least some level of noise. With respect to the incremental patterns, the notion of noise means that an incremental band $A_i$ is not exactly a growth line and the width of $A_i$ is not exactly the measure of the growth rate of an incremental pattern at a given moment in time $T_i$. The level of noise, associated with the initial incremental pattern, has to be reduced in order to ensure that the variability of the growth rate of an incremental pattern and the index of structural anisotropy represent actual features of a system under study and not artifacts.

Still another disadvantage of the currently known approaches for the parameterization of incremental patterns is based on the assumption that each transect $R_j$ is a straight line perpendicular to each incremental band $a_i$. In practice, for many categories of incremental patterns, it is impossible to draw a straight line from the beginning of an incremental pattern in an outward direction which would cross each $A_i$ perpendicular to the forming front. Due to this, the results of measurements of the width of an incremental band along $R_j$ contain uncontrolled errors. Moreover, due to numerous osteons in mammal bones it is impossible to draw an even continuous $R_j$ transect from the beginning of incremental pattern outward crossing all incremental bands.

An additional disadvantage is that each individual 2-D chart which describes a 2-D growth of an incremental pattern shown in FIG. 5D is noisy. A tool to reduce the level of this noise is currently unavailable.

Accordingly, an improved technique is required for the effective and adequate parameterization of various categories of 2-D incremental patterns with structural anisotropy found in biological, geological, nanotechnology, and other objects.

SUMMARY OF THE INVENTION

It is therefore, an object of the present invention to provide a detailed methodology for converting an incremental pattern under study into a 2-D model with a sufficiently decreased level of noise.

It is another object of the present invention to provide a computer-based technique for fully automatic quantification of 2-D incremental patterns under study with structural anisotropy.

An additional object of the present invention is to provide a system for imaging micro- and macro-incremental patterns with structural anisotropy, and processing the images of the incremental patterns converted into a digital (binary) format in order to effectively and noiselessly quantify a variability of the width and area of incremental bands across 2-D plane of the incremental patterns under study.

It is another object of the present invention to provide an algorithm for quantification of the size, area and anisotropic structure of layered patterns which is not restricted to any specific category of incremental patterns, but is applicable to any 2-D pattern with a structure similar to incremental patterns, including, but not limited to, for example, fingerprints. The rhythms in variability of width and area of incremental bands, found in 2-D and 3-D charts, as well as 2-D and 3-D indicia of structural anisotropy, may serve as additional features of fingerprints that permit improvement in the identification procedure.

In one aspect, the present invention provides a method for obtaining a parameterized model of incremental patterns (IP) which begins with acquiring an initial binary image, which may be in the form of a black and white incremental pattern in pixel format. The pixel format image is transformed into ASCII, preferably, the CSV format for further processing.

Black pixels in the CSV format have value of "1". Black pixels form fronts of the incremental pattern. White pixels have no values, i.e., cells associated with white pixels are empty.

The inventive method of the present invention is carried out through the following steps:

filtering the initial IP image (in its CSV representation) in order to remove lines not associated with processes of the pattern formation;

plotting transects extending from initial points to corresponding outer margins in pseudo-perpendicular direction to the growth lines found in the IP. A binary incremental pattern with gray transects, both in a raster (pixel) format and CSV format, is sequentially produced from the initial image. All gray pixels (corresponding to the transects) have identical values greater than 1 and less than 255;

transforming the layered black and white pattern into an n-partite graph G(n) by applying segmentation and labeling procedures: first, within each pair of neighboring transects resulting in the set of bi-partite graph $G_1(2), G_2(2), \ldots, G_{n-1}(2)$, where bi-partite graph $G_j(2)$ and $G_{j+1}(2)$ are situated between neighboring transects $R_j, R_{j+1}$ and $R_{j+1}, R_{j+2}$ respectively. Second, neighboring bi-partite graphs $G_1(2), G_2(2), \ldots, G_{n-1}(2)$ are merged into an n-partite graph G(n), based on the common vertex along transects $R_{j+1}$ situated between each pair of neighboring bi-partite graph. The G(n) describes the anisotropic structure of the 2-D incremental pattern under study;

calculating the width of layers (bands) along the transects;

calculating an area of layers (bands) between two neighboring transects based on the equal distance (in pixels) between all pairs of neighboring transects;

calculating a structure of the incremental bands through using the G(n) graph, and constructing a 2-D model of the IP under study based on the calculated width and area of IBs, and the G(n) graph.

It is important for the model construction that during calculation of the IBs' widths, an angle between the IB crossing a corresponding transect, is calculated, and, if it deviates from 90°, the width is adjusted.

The method continues with calculating of a width and an area of layers (bands) across the 2-D plane for a different level of noise; and time-averaging the width and the area of bands across the 2-D plane in order to reduce the noise level.

An index of an adequacy of the model and an index of structural anisotropy of the layered incremental pattern under study are further calculated.

The index of IP anisotropy is calculated as a combination of the index of anisotropy of the IB size, area, and index of anisotropy of the IP structure.

A large noise reduction is attained through both: (a) the filtering of the IP, in its CSV format, for removal of the lines not associated with growth (or other formation mechanisms) of the IP, and (b) through noise reduction in the charts "Width of IB vs. IB number" and "Area of IB vs. IB number", which is attained through averaging different versions of IB structure (for different levels of noise), and removing IBs with a length less than a threshold which is set up in a manner permitting attaining the index of model adequacy of 0.9 or higher.

The results of calculations are output in several formats, including "Incremental bandwidth vs. Time", "Incremental band area vs. Time", Index of Adequacy, as well as Index of Anisotropy of the incremental pattern under study.

If the real time of the layers formation is unknown, then the axis "T (time)" is substituted with the axis "Incremental band number", or "Time in relative units".

The present method permits processing patterns with structural damage and is applicable to the quantification of the size and structure of various categories of patterns found in nature, for example, first scales, shells, corals, tree rings, humans and animals' bones, fingerprints, spider webs, sand ripples, dunes, sediment profiles on the Earth, Mars and Titan, and other biological, geological formations, as well as nanoripples formed on the various categories of solid surfaces and in nanostructures.

In more detail, the filtering in the subject process presented in previous paragraphs may be performed through the following steps:

(1) Defragmenting (segmentation) of the initial binary incremental pattern (unit black and white representation);

(2) Reducing the pattern noise by calculating the size of foiling fronts (number of black pixels per forming front), and removing a forming front having a size less than a threshold with the threshold value defined for each category of the incremental pattern; and (3) Reducing the pattern noise by calculating a size of white holes (white pixels) in forming fronts, and filling white gaps with black pixels, if the size of a gap is less than a threshold with the threshold value defined for each category of the incremental pattern.

The value of the threshold depends on the XY size (the pixels) of the IP under study. It is preferred that the threshold is defined for a size of IPs suitable for the subject study larger than 300×300 pixels.

(4) For the structure calculation, the method proceeds with:

Calculating X, Y coordinates of points of intersections (vertexes) of the incremental bands (IB) with the transects $R_1, \ldots, R_n$. A width of each incremental band is defined as a distance between two nearby points along the transect $R_j$ if the incremental band is perpendicular to $R_j$.

In this step, an angle between the incremental band and the corresponding transect $R_j$ is calculated. If the angle differs from 90°, then the width of the incremental band is corrected. This procedure is continued up to the full number of transects has been processed;

(5) Calculating an area of each incremental band as a feature of the IP under study;

(6) Labeling a forming front of each incremental band in order to establish a correspondence between incremental bands crossed by two neighboring transects, resulting in two n-partite graph G(n) describing a structural anisotropy of a segment of the incremental pattern situated between the two transects in question. This procedure continues up to the last transect resulting in the n-partite graph G(n) describing the structure of the incremental pattern segments positioned between the transects $R_1$ and $R_n$;

(7) Defragmenting (segmentation) the incremental pattern segment located between the two neighboring transects $R_j$ and $R_{j+1}$, and labeling each forming front and the adjusted white segment resulting in the calculation of an area of each incremental band situated between the $R_j$, and $R_{j+1}$. This operation continues up to the last pair of neighboring transects $R_{n-1}$ and $R_n$.

(8) Averaging the width and area of incremental bands across the transects $R_1, \ldots, R_n$ in order to reduce noise due to structural anisotropy resulting in 2-D charts "Width of IB vs. Time" and "Area of IB vs. Time". These charts describe variability of size of the IP with structural anisotropy across a 2-D plane;

(9) Calculating the index of adequacy of the model of the IP; and

(10) Calculating the index of structural anisotropy of the IP.

The subject method for parameterization of incremental patterns also comprises the steps of:

configuring a computer system to perform parameterization of incremental pattern, and entering an image of an incremental pattern (IP) under study into the computer system;

processing the image of the IP under study in the computer system to obtain a binary initial image of an incremental pattern under study in a predetermined format. The incremental pattern (IP) under study contains incremental bands (IB) and secondary lines which are not associated with the formation process. The binary initial image is formed with a plurality of first (black pixels) cells and a plurality of second (white pixels) cells. The black pixels determine a forming front of the incremental growth bands in the image;

filtering the binary initial image in the computer system to remove the secondary lines therefrom, thereby forming a filtered initial binary image of the incremental pattern under study;

plotting a plurality of transects in the computer system onto the filtered initial binary image. Each transect being formed by a plurality of third cells (gray pixels) on the filtered initial binary image. Each of the plurality of transects extends from a respective initial point towards the periphery of the filtered initial binary image in crossing relationship with at least one of the growth lines at an angle $\alpha_j$; and applying a segmentation/labeling procedure to the filtered initial binary image to convert the filtered initial binary image into an n-partite graph G(n) describing an anisotropic structure of the incremental pattern under study in 2-D plane.

The method proceeds with constructing, in the subject computer system, a model of the incremental pattern under study through the steps of:

calculating a width of each incremental band along each of said plurality of transects, calculating said angle $\alpha_j$ between the crossed transect and each incremental band and then adjusting the width, if the angle $\alpha_j$ differs from 90°;

calculating an area of each incremental band contained between neighboring transects of the plurality thereof, and processing the n-partite graph G(n) to reduce noise in the charts "IB Width vs. Time (or IB number)" and Area of IB vs. Time (or IB number)".

Further, parameterization continues with:

calculating an average width and average area of the incremental bands based on the width and area of each incremental band, calculating a structure of incremental bands, and outputting diagrams "Incremental Band width vs. Time (or IB number)" and "Incremental Band vs. Time (or IB number)".

Preferably, the binary initial image is converted from the pixel format into the CSV (Comma_Separated Values) format to be processed.

The segmentation and labeling procedure is applied to the image of the incremental pattern under study in CSV format to defragment the binary initial image into a plurality of segments, where each segment includes a first number of black pixels formed substantially at the same time T.

In order to filter the initial IP image, the segmentation sub-routine is followed by:

assigning an identical label to all black pixels in each segment, calculating the size of each segment, removing at least one segment from the plurality of segments formed by black pixels if in the at least one segment, the first number of the black pixels is below a predetermined first threshold; and removing at least one segment formed by black pixels if a number of white pixels contained inside the at least one segment is below a predetermined second threshold.

One of the important aspects of the subject method is that after reduction of the noise in the charts "Width of IB vs. Time" and "Area of IB vs. Time", the computer system calculates an Index of Adequacy (IA) of the model of the incremental pattern under study and an Index of Structural Anisotropy (USA) of the incremental pattern under study.

In order to further reduce the noise in the charts "Width of IB vs. Time" and "Area of IB vs. Time", different versions of the structure of incremental bands are constructed and averaged, and the incremental bands having a length below a threshold are removed with the threshold being selected to attain the Index of Adequacy of 0.9 and above.

In the subject method, the calculation of the width of each incremental band is based on the initial binary IP image and the initial binary IP image with the added transects through the steps of:

calculating XY coordinates of the gray pixels of the transects $R_1, \ldots, R_{i+1}, \ldots, R_n$ based on the initial binary IP under study in the CSV format with transects added, calculating XY coordinates of the gray pixels of a transect $R_i$, where $i=1, \ldots, n$, and calculating, for each said transect $R_i$, $$Y_i = A_i * X_i + B_i, \qquad (\text{Eq. 11})$$

where $A_i$ and $B_i$ are the upper and the lower points of the transect $R_i$ on the initial binary IP in the CSV format;

calculating XY coordinates of intersections points $P_i$, $P_{i+1}$ of a forming front of each growth incremental band with the transect $R_i$, where $i=1$, and calculating a width of each incremental band along the transect $R_i$ based on a distance between neighboring intersection points $P_{i,q}$ and $P_{i,q+1}$;

calculating a connectivity between points $P_{i,q}$ and $P_{i+1,m}$ in the same segment, and constructing an approximation of a forming front of each incremental band extending between neighboring transects $R_i$ and $R_{i+1}$; and calculating a set L of connectivity lines between the points $P_{i,q}$ and $P_{i+1,m}$ based on the connectivity calculated between sets of points $P_i$ and $P_{i+1}$, calculating the angle $\alpha_j$ between neighboring lines of the set L of lines, and calculating the width of an incremental band $IB_j$ based on a width of the incremental band $IB_j$ along the transect $R_i$ and the angle $\alpha_j$.

The segmentation/labeling procedure is applied throughout all steps of the width calculation.

The area of each incremental band is calculated through the steps of:

calculating XY coordinates of points $h_{i,j}$ of intersections of incremental bands $IB_j$ with transects $R_i$, wherein the $h_{i,j}$ includes a fragment $Pb_{i,j}$;

outlining an area of the incremental pattern between neighboring transects $R_i$ and $R_{i+1}$, where $i=1, \ldots, n-1$;

segmenting and labeling the forming fronts extending between the neighboring transects $R_i$ and $R_{i+1}$, where the black pixels constitute a foreground of the incremental pattern, and the white pixels constitute a background of the incremental pattern, assigning a fragment number $k(pb_{i,j})$ to the pixels of the forming fronts of the incremental bands, calculating a number of incremental bands $u(pb_{i,j})$ with the same fragment $k(pb_{i,j})$, calculating a number of cells $q(pb_{i,j})$ consisting of the fragment $pb_{i,j}$, and calculating an area of the forming front $S(pb_{i,j})$;

repeating the fragmenting and labeling routine when the black pixels constitute a background of the incremental pattern, and the white pixels constitute a foreground of the incremental pattern, and calculating an area of the forming front $S(pw_{i,j})$; then calculating an area $S(h_{i,j})$ of the incremental band $h_{i,j}$ as $S(h_{i,j}) = S(pb_{i,j}) + S(pw_{i,j})$.

In the present method, the n-partite graph $G(n)$ is calculated through the steps of:

calculating XY coordinates points $pw_{i,j}$ of an intersection between a white cell component of the $IB_j$ with the transect $R_i$, and XY coordinates of points $pw_{i+1,j}$ of an intersection between the white cells component of the $IB_j$ with the transect $R_{i+1}$, and labeling sets of points $pw_{i,j}$ and $pw_{i+1,j}$ in a direction of the incremental pattern formation;

calculating an area of a fragment of the incremental pattern between the neighboring transects $R_i$ and $R_{i+1}$;

labeling components formed by the white cells of the $IB_j$ extending between the neighboring transects $R_i$ and $R_{i+1}$; and calculating a connectivity between sets $pw_i$ and $pw_{i+1}$ of vertices, where vertices $pw_{i,j}$ and $pw_{i+1,j}$ are connected by an edge only if they belong to the same fragment;

calculating the graph $G(n)$ by iterating through the neighboring transects $R_i$ and $R_{i+1}$, and outputting the graph $G(n)$ as a set of binary adjacent matrix $g_i(2)$ describing the structure of the IP under study.

An average width $W(m_i)$ and an average area $S(m_i)$ of an incremental band $m_i$ are calculated based on a length $L(m_i)$ of the incremental band $M_i$, where the width w ($IBm_i$) is the width of said incremental band m, along the transects $R_i, \ldots, R_n$, and the area $S(h_{i,j})$ is the area of said incremental band $m_i$ between the neighboring transects $R_i$, and $R_{i+1}$, through the steps of:

associating each vertex $V_i$ crossing transects $R_1, \ldots, R_n$ with a corresponding width of an incremental band crossing the transects $R_1, \ldots, R_n$;

calculating the average width $W(m_i)$ as a sum of widths associated with the vertices $V_i$ of the incremental band $m_i$ divided by the length $L(m_i)$;

connecting the vertex $V_i$ with a vertex $V_{i+1}$ through a connecting line;

associating said connecting line with the area of a corresponding incremental band, and calculating the average area $S(m_i)$ of the incremental band $m_i$ as a sum of areas of connecting lines corresponding to the incremental band $m_i$ divided by $L(m_i)-1$.

In calculating the structure of the IBs, a set of paths $(M^i = \{m_1, \ldots, m_j, \ldots, m_d\}$ in the graph $G(n)$ is found, where each point of intersection of a path $m_j$ with a transect $R_i$ is defined as a vertex $V = V_1 \ldots \cup V_i \ldots \cup V_n$, in a set $V_i$, where the $M^i$ covers all vertices $V_i$ in said graph $G(n)$, and where the paths $m_j$ in said set $M^i$ have no common vertexes and no path $m_j$ has repeated vertexes.

Upon completing the calculation of the IB structure, the width and area variability are plotted for the $M^i$ across the 2-D plane of the incremental patterns under study as charts $gr\, w(i), i=1, \ldots, n$, and $gr\, a(i)$, "Width of IB vs. Time", and "Area of IB vs. Time" across a 2-D plane of the incremental pattern for different levels of confidence $C[gr\, w(i))]$ and $C[gr\, a(i))]$, respectively, for the length $L(m_i)$ of the incremental band $m_i$ varying from 1 to n, and the noise in the charts "Width of IB vs. Time" and "Area of IB vs. Time" is reduced through averaging n sets $GR(j)_{width}$ and $GR(j)_{area}$, respectively, of 2-D charts $gr^j(j)_{width}$ and $gr^j(j)_{area}$ plotted for all calculated versions of the structure $M^1, \ldots, M^i, \ldots, M^H$.

After reducing the noise in the charts "Width of IB vs. Time", and "Area of IB vs. Time", calculating the index of adequacy IA of the model M of the IP under study as:

$$IA = S[gr_{area}(n)] / S(IP), \qquad (\text{Eq. 12})$$

where $S[gr_{area}(n)]$ is the sum of areas of incremental bands comprising the chart $gr_{area}(n)$, and $S(IP)$ is the area of a segment of the incremental pattern situated between the transects $R_1$ and $R_n$, where with the predetermined number n of transects, the model M={G(n), $F_{m,n}$} attains a complete representation of the image of the IP under study, and where the $S[gr_{area}(n)] \to S(IP)$, and the IA→1.

The index of structural anisotropy (USA), where ISA(j)={Uncertainty$_{Width}$(j), Uncertainty$_{Area}$(j), Uncertainty$_{Structure}$(j)}, is calculated through the steps of:

calculating a Chart $gr_w(j, X_f)$ for the randomly chosen version $X_f$ of the structure of incremental bands, wherein the chart $gr_w(j, X_f)$ takes into account incremental bands crossing one j transects where, j=1, ..., n, and where a set $X_f$ includes incremental bands $A_{1,f}$ ... $A_{u,f}$ ..., $A_{k,f}$; $X_f$={$A_{1,f}$ ... $A_{u,f}$, ..., $A_{k,f}$};

calculating a version of the structure of incremental bands $Y_f$ which differs maximally from the $X_f$, where a set $Y_f$ consists of incremental bands $B_{1,f}$ ... $B_{u,f}$ ..., $B_{k,f}$; $Y_f$={$B_{1,f}$, ..., $B_{u,f}$, ..., $B_{k,f}$};

calculating a chart $gr_w(j, Y_f)$ for a version $Y_f$ of the structure of incremental bands;

calculating a difference $\Delta$Width(j, $X_f$, $Y_f$)$_j$ between charts $gr_w(j, X_f)$ and $gr_w(j, Y_f)$ for an instance of time $T_u$, where u=1, ..., k, where $$\Delta\text{Width}(j,X_f,Y_f)_u = |\text{Width}(j,X_f)_u - \text{Width}(j,Y_f)_u|/B, \quad \text{(Eq. 13)}$$

where width(j, $X_f$)$_u$ is the width of an incremental band (IB) at the instant of time $T_u$ for the versions $X_f$ of the structure of incremental bands;

width(j, $Y_f$)$_u$ is the width of the IB at the instance of time $T_u$ for the versions $Y_f$ of the structure of IB; and $$B = \max[\text{Width}(j,X_f)_u, \text{Width}(j,Y_f)_u]; \quad \text{(Eq. 14)}$$

repeating calculations of $gr_w(j, X_f)$, $Y_f$, $gr_w(j,Y_f)$ and $\Delta$Width(j, $X_f$, $Y_f$) for the instance of time $T_u$ and for versions of the structure of IB $X_1, Y_1, ..., X_f, Y_f, ..., X_h, Y_h$, resulting in the sequence of values $\Delta$Width(j, $X_1, Y_1$)$_u$, ..., $\Delta$Width(j, $X_f, Y_f$)$_u$, ..., $\Delta$Width(j, $X_h, Y_h$)$_u$;

averaging values $\Delta$Width(n, $X_f, Y_f$)$_u$ over H/2 pairs of the structure of IB for the instance of time $T_u$, where $$\Delta\text{Width}(j)_u = (1/h) * \Sigma \Delta\text{Width}(j,X_f,Y_f)_u, f=1,...,h, \quad \text{(Eq. 15)}$$

where $\Delta$Width(j)$_u$ is the variability of the width of incremental band at the instance of time $T_u$ due to the structural anisotropy of the incremental pattern under study, and where the $\Delta$Width(j)$_u$ takes into account incremental bands crossed j transects, j+1, ..., n; and repeating the averaging for the instances of time $T_1, ..., T_u, ... T_k$, resulting in the sequence of values $\Delta$Width(j)$_1$, ..., $\Delta$Width(j)$_u$, ..., $\Delta$Width(j)$_k$;

averaging $\Delta$Width(j)$_1$, ..., $\Delta$Width(j)$_u$, ..., $\Delta$Width(j)$_k$ over $T_1, ..., T_u, ... T_k$ to calculate the parameter Uncertainty$_{Width}$(j) as $$\text{Uncertainty}_{Width}(j) = (1/k) * \Sigma[\Delta\text{Width}(j)_u], u=1,...,k; \quad \text{(Eq. 16)}$$

calculating the Uncertainty$_{Area}$(j) according to the calculation of the parameter Uncertainty$_{Width}$(j) by substituting the width of incremental bands with an area of incremental bands;

calculating the parameter Uncertainty$_{Structure}$(j) through the steps of:

calculating a difference $\Delta$Structure(j, $A_{u,f}$, $B_{u,f}$) between structure of incremental band $A_{u,f} \in X_f$ and $B_{u,f} \in Y_f$ as:

$$\Delta\text{Structure}(j,A_{u,f},B_{u,f}) = (|A_{u,f} \cap B_{u,f}|)/(|A_{u,f} \cup B_{u,f}|), \quad \text{(Eq. 17)}$$

wherein, if $A_{u,f}$ is identical to $B_{u,f}$, then $|A_{u,f} \cap B_{u,f}| = |A_{u,f} \cup B_{u,f}|$, and $\Delta$Structure(j, $A_{u,f}$, $B_{u,f}$)=1, then at the instance of time $T_u$, the incremental pattern is the isotropic object, and where, if $A_{u,f} \cap B_{u,f} = \emptyset$, then $\Delta$Structure(j, $A_{u,f}$, $B_{u,f}$)=0, then the level of anisotropy of the incremental pattern under study is maximal at time $T_u$;

repeating the calculation of the difference for the version of incremental bands $X_1, Y_1, ..., X_f, Y_f, ..., X_h, Y_h$, resulting in the sequence of values: $\Delta$Structure(j, $A_{u,1}, B_{u,1}$), ..., $\Delta$Structure(j, $A_{u,f}, B_{u,f}$), ..., $\Delta$Structure(j, $A_{u,h}, B_{u,h}$);

averaging the values $\Delta$Structure(j, $A_{u,1}, B_{u,1}$), ..., $\Delta$Structure(j, $A_{u,f}, B_{u,f}$), ..., $\Delta$Structure(j, $A_{u,h}, B_{u,h}$) over versions of incremental bands structures $X_1, Y_1, ..., X_f, Y_f, ..., X_h, Y_h$, to calculate the Uncertainty$_{Structure}$(j)$_u$ at the time $T_u$, where $$\text{Uncertainty}_{Structure}(j)_u = (1/h) * (\Sigma \Delta\text{Structure}(j,A_{u,f},B_{u,f}), f=1,...,h; \quad \text{(Eq. 18)}$$

repeating averaging the values $\Delta$Structure(j, $A_{u,1}, B_{u,1}$), $\Delta$Structure(j, $A_{u,f}, B_{u,f}$), ..., $\Delta$Structure(j, $A_{u,h}, B_{u,h}$) for the time instances $T_1, ..., T_u, T_k$, resulting in the sequence of values Uncertainty$_{Structure}$(j)$_1$, ..., Uncertainty$_{Structure}$(j)$_u$, ..., Uncertainty$_{Structure}$(j)$_k$;

averaging values Uncertainty$_{Structure}$(j)$_1$, ..., Uncertainty$_{Structure}$(j)$_u$, ..., Uncertainty$_{Structure}$(j)$_k$ in order to quantify the Uncertainty$_{Structure}$(j) for the 2-D incremental pattern under study, where $$\text{Uncertainty}_{Structure}(j) = (1/k) * \Sigma \text{Uncertainty}_{Structure}(j)_u, u=1,...,k, \quad \text{(Eq. 19)}$$

where the area of the variability of Uncertainty$_{Structure}$(j) is [0.1], and where, if the Uncertainty$_{Structure}$(j)=0, then the IP is the object with structural isotropy, and where the Uncertainty$_{Structure}$(j)=1 indicates the highest level of variability of the structure of incremental bands in different directions; and calculating the index of structural anisotropy ISA(j) of the 2-D incremental pattern under study as:

$$\text{ISA}(j) = \{[\text{Uncertainty}_{Width}(j) + \text{Uncertainty}_{Area}(j)]/2 + \text{Uncertainty}_{Structure}(j)\}/2, \quad \text{(Eq. 20)}$$

where j=n.

In another aspect, the present invention constitutes a system which operates in accordance with a unique algorithm devised for parameterization of the IPs under study which are entered into the computer system, processed through routines supported by the subject algorithm, and the quantification parameters of which are output in the form of "IB width vs. Time", "IB area vs. Time", Index of the Adequacy of the IP model, and Index of anisotropy of the IP for further analysis and/or processing.

The subject system includes an imaging subsystem or other source of IP images at an input, which may include publicly available databases of images of layered geological objects. (Hayward, R. K., et al., 2007, Mars Global Digital Dune Database: MC2-MC29: U.S. Geological Survey Open File Report 2007-1158. [http://pubs.usgs.gov/of/2007/1158/]; McEwen, A. S., et al., 2007, Mars Reconnaissance Orbiter's High Resolution Imaging Science Experiment (HiRISE), J. Geophys. Res., 112, E05502, doi:10.1029/2005JE002605).

The imaging sub-system may include image capture devices, such as, for example, microscopes for imaging micro- and nano-scale incremental patterns, i.e. the width of incremental bands <1-100 μu; as well as digital cameras with resolution 14-20 MP for imaging macro incremental patters, i.e. the width of growth lines>1 millimeter (for instance, found in tree rings).

With the help of the imaging sub-system, an image of an incremental pattern under study is acquired which contains growth incremental bands and may contain other lines not associated with IP formation processes. The imaging system is coupled to the computer system to supply the images for further processing where the computer system converts the image into an initial binary image in a pixel format.

The system also includes an image format convertor for the conversion of an image in the raster (pixel) format into ASCII format, and more precisely into CSV (Comma Separate Value) format.

A filtering unit in the computer system is configured to process the initial binary image in the pixel format to remove the lines different than growth incremental bands to form a filtered initial binary image.

A transects plotting unit in the computer system is configured for plotting a plurality of transects onto the filtered initial binary image, where each of said plurality of transects extends in a crossing relationship with at least one of the growth incremental bands forming an angle $\alpha_j$ therebetween.

The subject system further contemplates:

a segmentation/labeling unit configured to convert the filtered initial binary image into an n-partite graph G(n) describing an anisotropic structure of said incremental pattern under study;

a model constructing unit in the computer system configured to calculate a width and an area of each incremental band, where the model constructing unit adjusts the width if said angle $\alpha_j$ deviates from 90°;

a structure calculation unit in the computer system configured to calculate a structure of the incremental bands in said IP under study, and to process the n-partite graph G(n) to find a set of paths $M^i = \{m_1, \ldots, m_j, \ldots, m_J\}$ in the graph G(n), where each point of intersection of a path $m_j$ with a transects $R_i$ is defined as a vertex $V = V_1 \ldots \cup V_i \ldots \cup V_n$, where the $M^i$ covers all vertices $V_i$ in the graph G(n), and where the paths $m_j$ in the set $M^i$ have no common vertexes, and no path $m_j$ has repeated vertexes, The system in question further includes an index of adequacy (IA) calculating unit for the model of incremental bands, an index of structural anisotropy (USA) calculating unit, and an output unit coupled to the computer system to output the results of the calculation in the form of diagrams "TB width vs. Time", "TB area vs. Time", as well as IA and ISA of the IP under study.

These and other features are advantages of the present invention will be apparent from the following detailed description taken in conjunction with accompanying Patent Drawings.

DESCRIPTION OF THE DRAWINGS

FIG. 1A: Sand ripples; FIG. 1B: Layered landform on Mars; FIG. 1C: Cross section of an iguana bone; FIG. 1D: Fish scale of Atlantic salmon; and FIG. 1E: Cross section of a human bone; and FIG. 1F: nano ripples.

FIGS. 2A-2D represent the prior art processing of a fish scale pattern as an anisotropic object, where FIG. 2A shows the fish scale pattern intersected by transects $R_1$ and $R_2$; FIG. 2B represents, at somewhat enlarged scale, the defragmenting of the image into the incremental bands; and FIGS. 2C and 2D represent plots of the widths of incremental bands along the time scale $T = T_1, T_2, \ldots, T_i, \ldots, T_n$ which differ between labeled transects $R_1$ and $R_2$ due to the anisotropy of the fish scale patterns;

FIGS. 3A-3C represent a prior art quantification process for the widths of incremental bands of 2D fish scale pattern, where FIG. 3A is the fish scale pattern intersected by transects $R_1$, $R_2$, and $R_3$; FIG. 3B shows vertexes $a_{i,j}$ of intersection of each incremental band $a_i$ with the transect $R_j$; and FIG. 3C is a table $F_{m,n}$ containing measured widths $W(a_{i,j})$ of the incremental bands $a_i$ along the transects $R_j$;

FIG. 4A is a pattern with a number of incremental bands intersected by $R_j$, and FIG. 4B is the Table containing $W(A_i)$ and $L(A_i)$ of each band $A_i$;

FIGS. 5A-5C represent quantification of the growth rate of an incremental pattern into 2-D charts;

FIG. 6A is an incremental structure, and FIG. 6B is a representation of the corresponding graph;

FIGS. 7A-7C represent a prior art technique for analyzing a structure of the fish scale pattern as a relay network, where different versions of the incremental band structures are represented in FIG. 7A; the structure of the incremental band as a function of the state of the "door" is shown in FIG. 7B; and a description of all versions of the incremental band structure is shown in FIG. 7C;

FIG. 9A shows images of the fish scales, and FIG. 9B is a comparison between charts of the index vs. band number and structural integrity for different fish scales;

FIGS. 12A-12D represent an incremental pattern (IP) under study, where FIGS. 12A and 12C are representation of the incremental pattern in the pixel format and the CSV formats, respectively, and FIGS. 12B and 12D are representations of the incremental pattern with gray transects in the pixel format and the CSV format, respectively;

FIG. 13B is a source-code of the algorithm presented in FIG. 13A;

FIGS. 14A-14D represent the routine for segmentation of the incremental pattern (IP) under study, and illustrate the IP under study before and after segmentation in the pixel and the CSV formats;

FIGS. 17A-17E represent the procedure of calculation of an area of incremental bands;

FIGS. 18A-18E represent the procedure of construction of the n-partite graph G(n);

FIGS. 24A-24D illustrate the noise reduction routine in the variability of growth rate across 2-D plane for Martian layered landscape, where FIG. 24A is a representation of a satellite image of layered Mars surface; FIG. 24B is a representation of a sampling area of the image shown in FIG. 21A with the transects 1-140; FIG. 24C represents diagrams of layer units vs. layer number for different averaging conditions, and FIG. 24D represents diagrams of width of IB vs. time for different noise levels.

DESCRIPTION OF THE PREFERRED EMBODIMENT(S)

Figure 10:
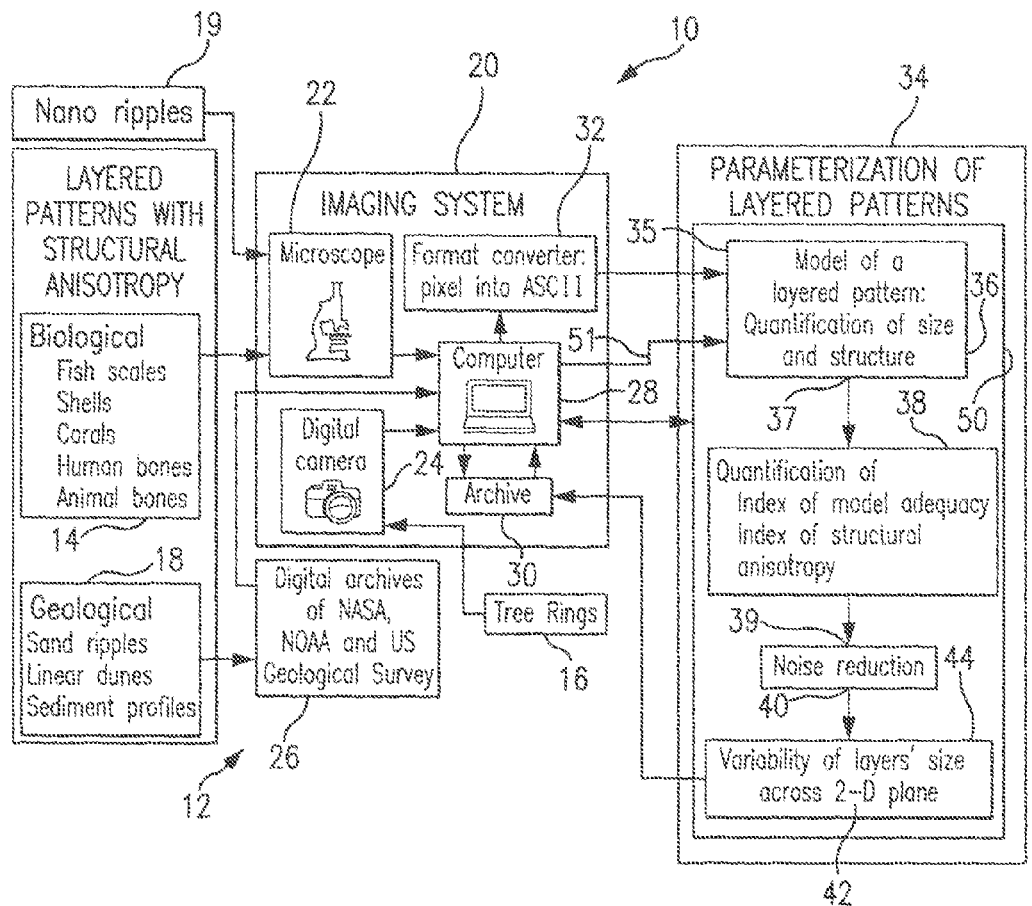
FIG. 10 is the simplified schematic representation of an example of the system of the present invention.
Figure 10:
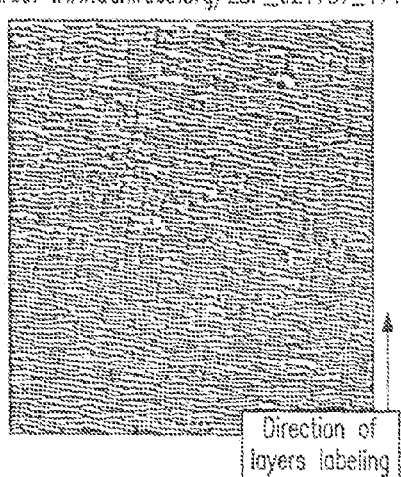
Figure 10:
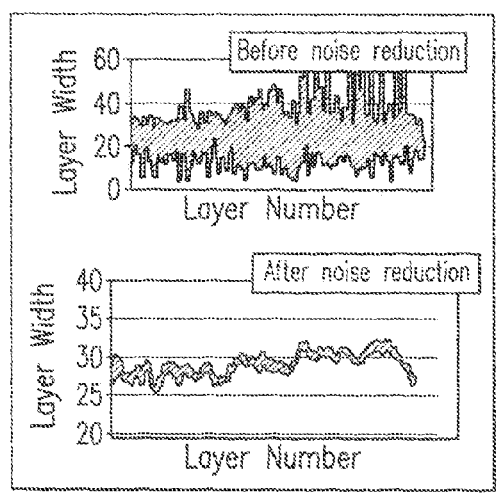

Referring to FIG. 10, there is shown system 10 of the present invention for parameterization of layered patterns includes a source 12 of layered patterns. The patterns may be of an isotropic nature, or having a structural anisotropy. The layered patterns may be represented by incremental patterns 14 of biological origin (such as, for example, fish scales, shells, corals, human bones, animal bones, as well as spider nets, fingerprints, etc., tree rings 16, as well as the incremental patterns 18 of geological origin, and nano-ripples (or micro-scale formations) found in objects of semiconductor or nano-structures fabrication.

Figure 1A:
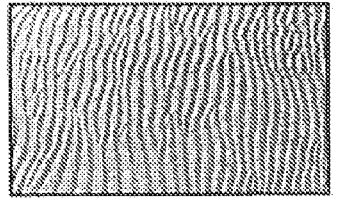
FIGS. 1A-1F represent samples of incremental patterns, including
Figure 1B:
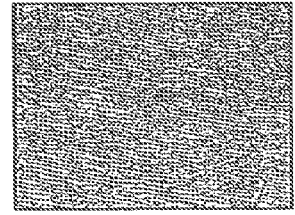
Figure 1C:
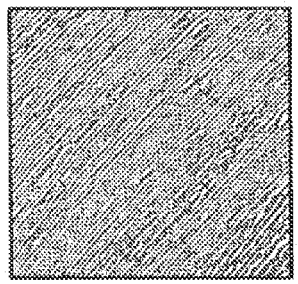
Figure 1D:
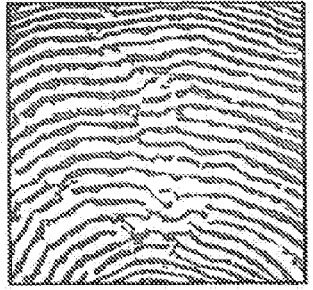
Figure 1E:
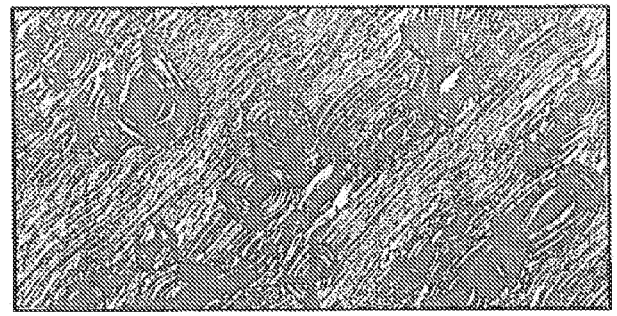
Figure 1F:
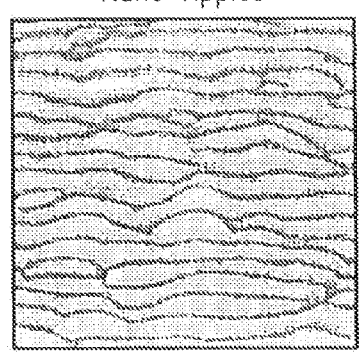
Figures 4A, 4B:
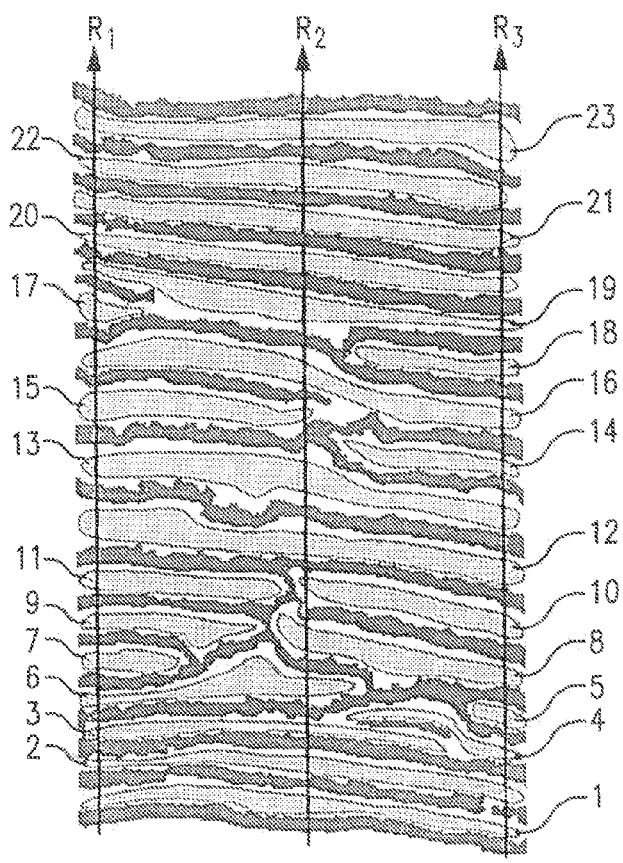
FIGS. 4A-4B represent the prior art parameterization process of the size and structure of the fish scale pattern, where
Figure 5A:
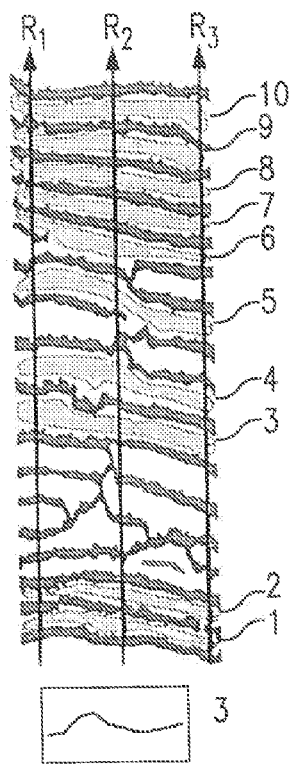
FIGS. 5A-5D represent the prior art process for quantification of the anisotropical fish scale pattern segregated into multiple segments (FIGS. 5A-5C), and compiled into a 3-D chart (FIG. 5D), where
Figure 5B:
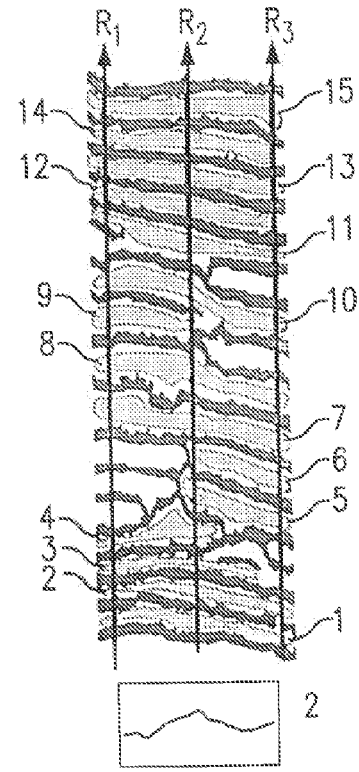
Figure 5C:
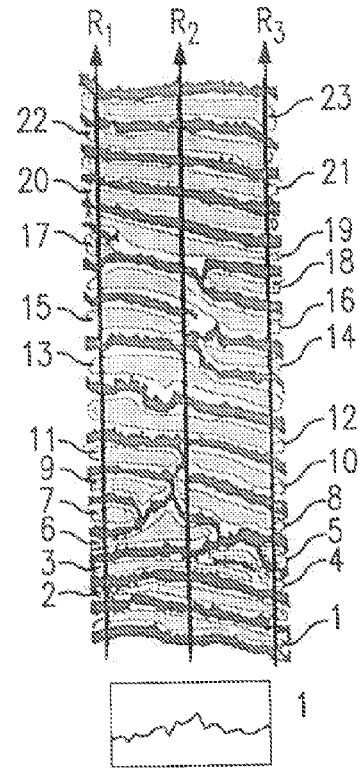
Figure 5D:
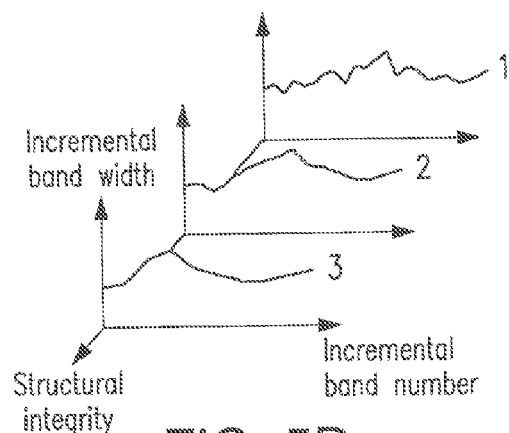
Figure 6B:
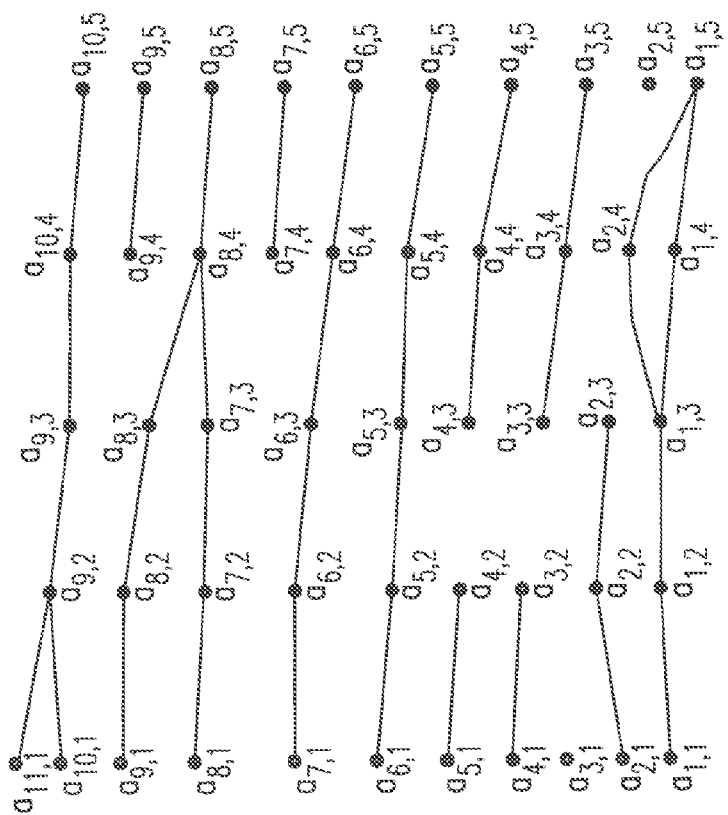
FIGS. 6A-6B represent the prior art technique for quantification of the anisotropic structure of the fish scale pattern, where
Figure 6A:
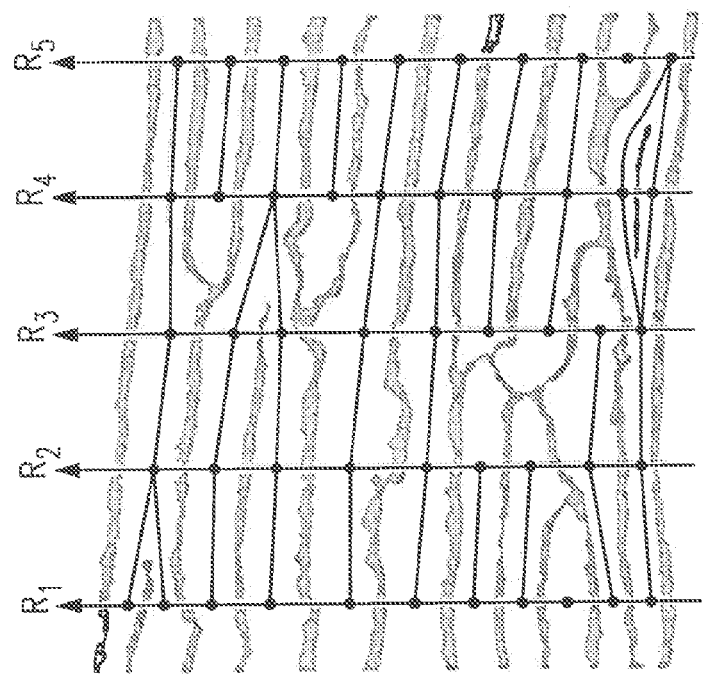
Figure 8:
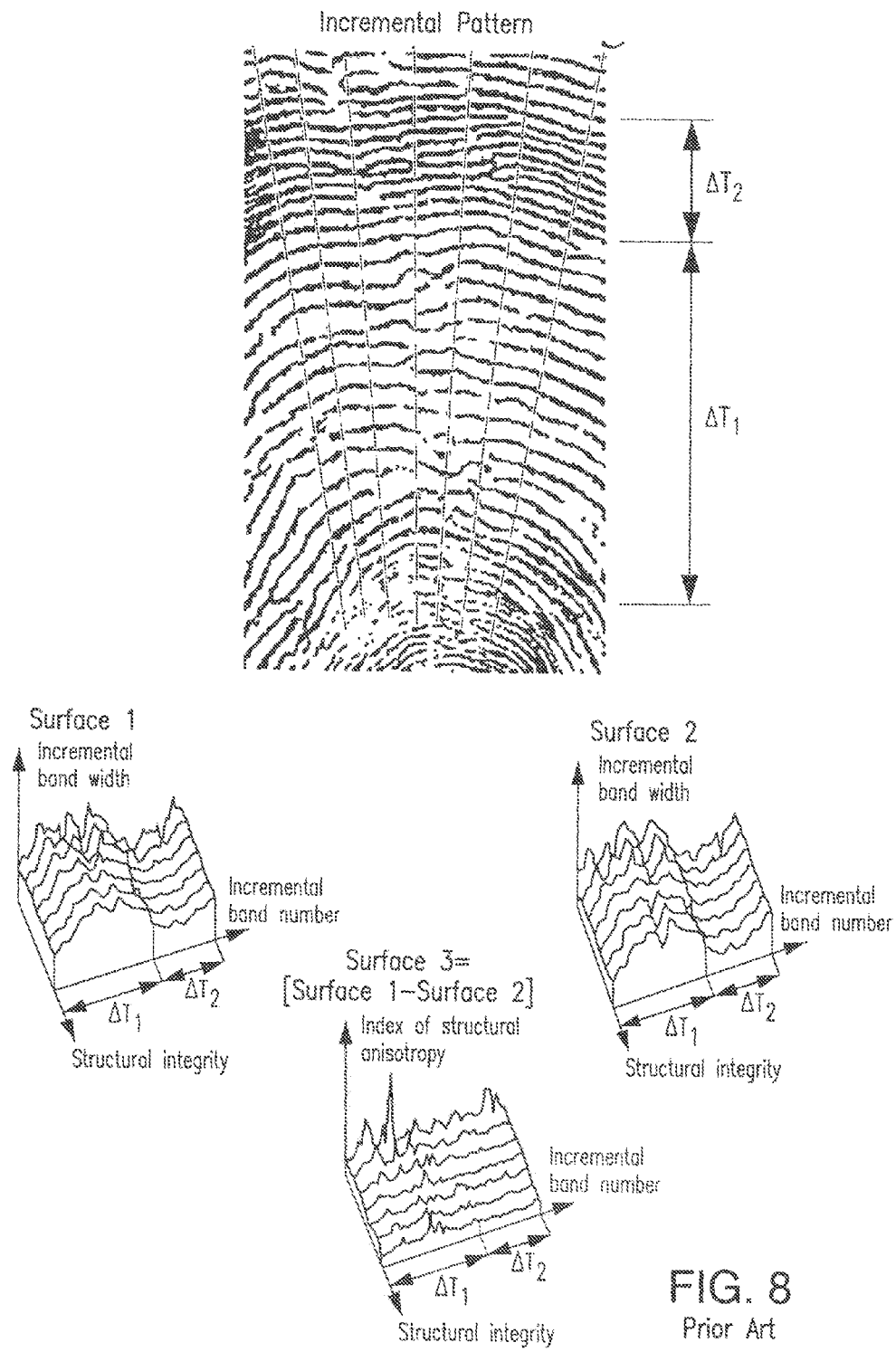
FIG. 8 represents the prior art indexing of structural anisotropic fish scale.
Figure 9A:
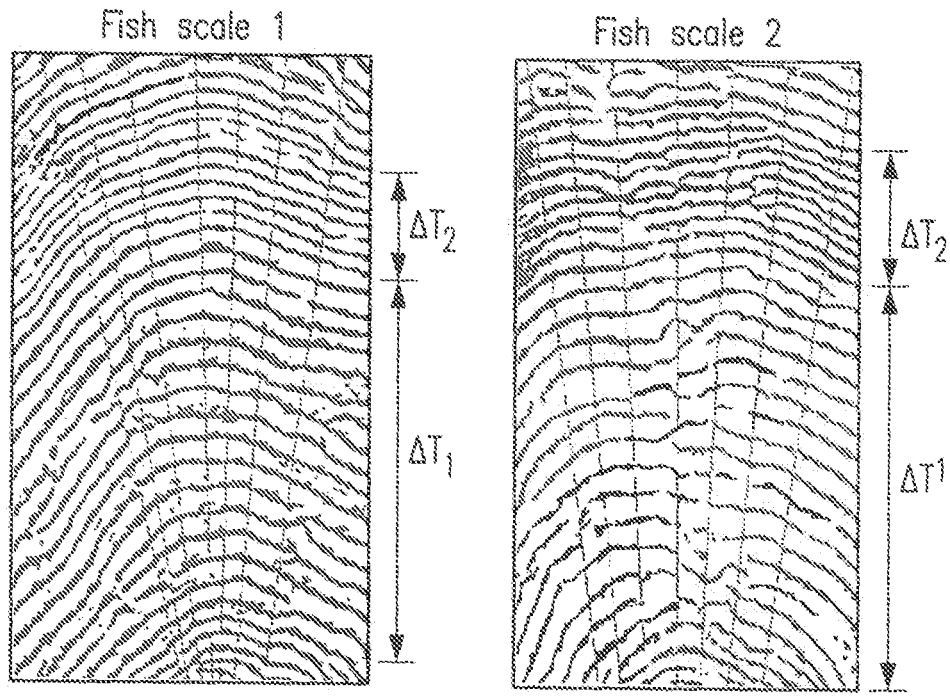
FIGS. 9A-9B represent the prior art indexing of structural anisotropy for scales from two different fish, where
Figure 9B:
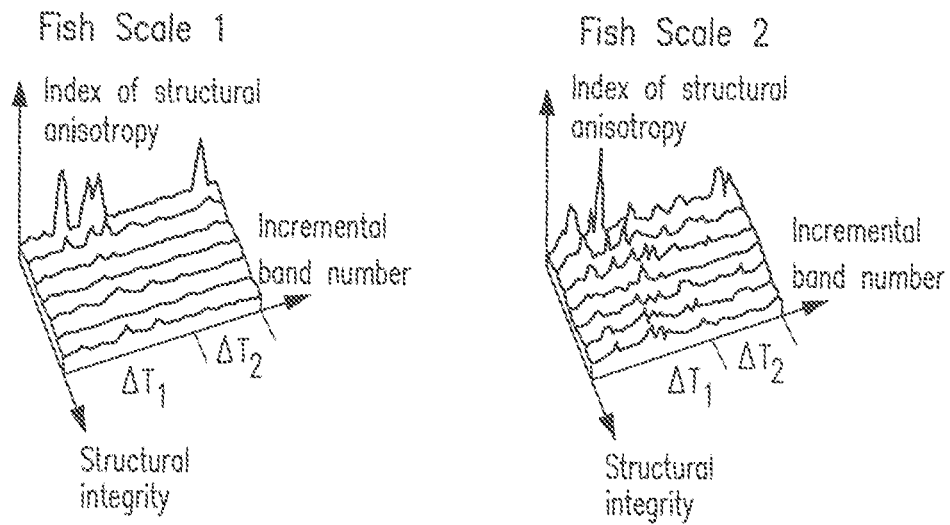

Incremental patterns 19 of nano-ripples (shown in FIG. 1F) recently discovered and presented in (P. F. A. Alkemade, "Propulsion of Ripples on Glass by Ion Bombardment", Phys. Rev. Lett, 96, 107602, 2006), may be processed in accordance with the subject method for quantification of the variability of thickness and area of nano-ripples across a 2-D plane. This may contribute to solutions and prevention of problems encountered in nanotechnology, as well as in fabrication of microminiature semiconductor systems.

The system of the present invention further includes an imaging system 20 for imaging the micro- and macro-incremental patterns. The imaging system 20 may include image capturing device, such as, for example, a microscope 22, a digital camera 24, and/or other optical data acquiring systems.

Microscopes 22 may be used for imaging micro and nano-scale incremental patterns, as well as those having the width of incremental bands ~1-100 μu, usually found in fish scales, shells, corals and bones, or even nano-structures. Digital cameras 24 with resolution 14-20 MP may be used for imaging macro incremental patters, i.e., having the width of incremental bands >1-5 millimeter, which are usually found, for instance, in tree rings.

Another source of the incremental patterns (IP) under study may be publicly available databases 26 of images of layered geological objects, such as, for example, digital archives of NASA, NOAA, and US Geological Survey, etc.

The images from the microscopes 22, digital cameras 24, and databases 26 are entered and recorded in a computer system 28 for further processing in accordance with the algorithm 50 presented in detail in further paragraphs, as well as for archiving in an archive 30 for further use.

The computer system 28 supports the algorithm 50, which controls the processing of the incremental patterns under study entered into the computer system 28 through specific routines presented in detail in further paragraphs. The algorithm 50 is operatively coupled to the computer system 28, and may run physically at the computer system 28 (or on another computer, or computers).

The system 10 also includes an image format convertor 32 coupled to the computer system 30 for conversion of acquired images into the ASCII (American Standard Code for Information Interchange) format, and more precisely, into the CSV (Comma_Separate_Value) format.

The images of the incremental patterns, in their raster format, are supplied from the computer 28 to the format converter 32 for conversion into the ASCII format. The image in its raster (pixel) format, as well as in the CSV format, is supplied to the archive 30, which is bi-directionally coupled to the computer system 28. Although shown as a separate unit, the format converter 32 may be embedded into the computer system 28, and also may be implemented as a portion of the algorithm 50, if needed.

The ASCII is a character-encoding scheme and basically is a universal language for encoding numeric bits of data into characters. With the help of the ASCII image converter 32, pixels in the digital pictures (binary format), may be converted into ASCII characters.

The images of the incremental patterns under study, in their pixel and ASCII formats, are supplied to the parameterization subsystem 34 of the computer system 28, i.e., the IP images are processed in accordance with the parameterization routine of the algorithm 50, for processing in order to attain the quantification of size and structure of the IBs.

The parameterization subsystem 34 includes a model construction unit 36 for quantification of the size and structure of the incremental pattern (also referred to herein as a layered pattern) under study. The input 35 of the model construction unit 36 is coupled to the format converter 32 to receive the IPs in their CSV format The input 35 of the unit 36 additionally receives the IPs in their pixel format for further processing.

The output 37 of the model construction unit 36 is coupled to a subsystem 38 for quantification of index of model adequacy (IA) and index of structural anisotropy (USA). The data produced in the index unit 38 are further coupled to an input 39 of the noise reduction unit 40 which outputs the resulting data 42 to an output subsystem 44, for example, in the form of variability of layers' size across a 2-D plane of the incremental pattern under study, as graphs "IB width vs. Time" and "IB are vs. Time", as well as IA and ISA of the IP model. If the real time of the incremental bands formation is not known and/or direction of IP formation is not known, then the axis "Time" is substituted with an axis of "IB number" or "Time (in relative units)".

The output sub-system 44 may be presented in the subject system 10 by any information output device, such as for example, a printer, a display, data storage devices, sound producing systems, video projector, etc., or recorded in the archive 30 or in a memory of the computer system 28 for further processing and/or use.

The operation of the present systems 10 is based on the algorithm 50 running on the computer systems 28 or any other external computer(s). The algorithm 50 has been devised for effective and noise reduction parameterization of incremental patterns of different categories.

The algorithm 50 of the present invention, as well as its various sub-routines, may be executed in a variety of different programming environments. For the purpose of illustration only, but not to limit the scope of the present invention to this particular programming environment, the subject system and method, will be detailed in following paragraphs below as implemented in the EXCEL Visual Basic environment.

Figure 11:
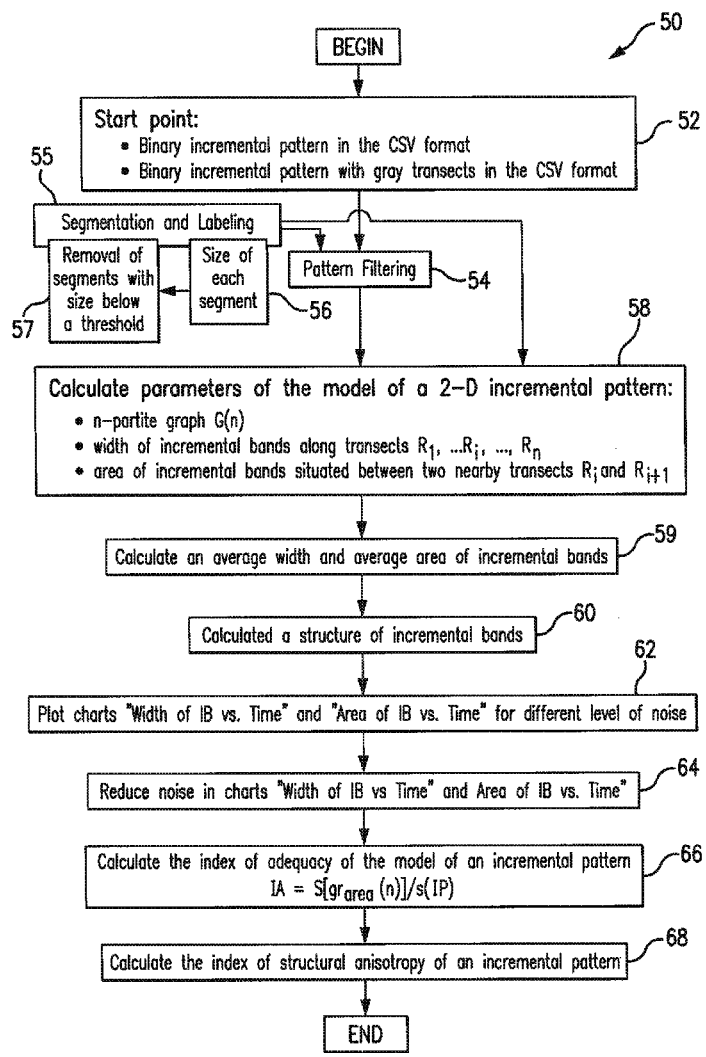
FIG. 11 is a flow chart diagram representative of the algorithm supporting the method and functions of the system of the present invention.

A flowchart of the algorithm 50 underlies the functionality of the present system 10, and particularly, the parameterization subsystem 34, for performing the present method, is presented in FIG. 11. The procedure, according to the algorithm 50, is initiated in block 52, where the initial incremental pattern 51 under study acquired through the imaging system 20 or acquired from the databases 26, is processed in the computer system 28 and formatted, in its pixel format, i.e., black and white initial incremental pattern (IP), shown in FIG. 12A.

In block 52, a plurality of transects 53 are plotted on the initial IP or preferably on a filtered IP image. The black and white IP with the transects 53 is shown in FIG. 12B as a black and white incremental pattern with gray transects 53 is the pixel format.

The number n of transects may be determined empirically, for example, in accordance with an empirical equation:

Numbers of transects=width of IP (in pixels)−20/10    (Eq. 21)

As seen in Eq. 21, the distance between transects is 10 pixels. Although other sampling densities are contemplated in the scope of the present invention, the sampling density of 10 pixels is sufficient to take into account an adequate amount of detail of various categories of IPs under study.

Figure 12A:
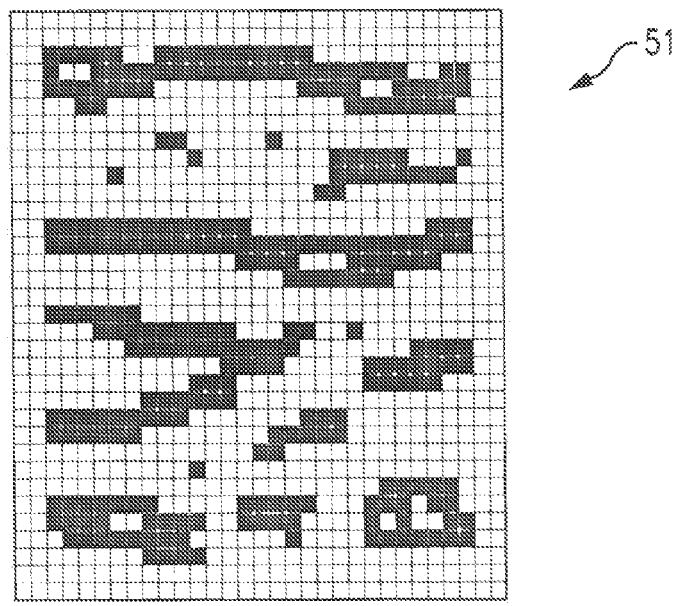
Figure 12B:
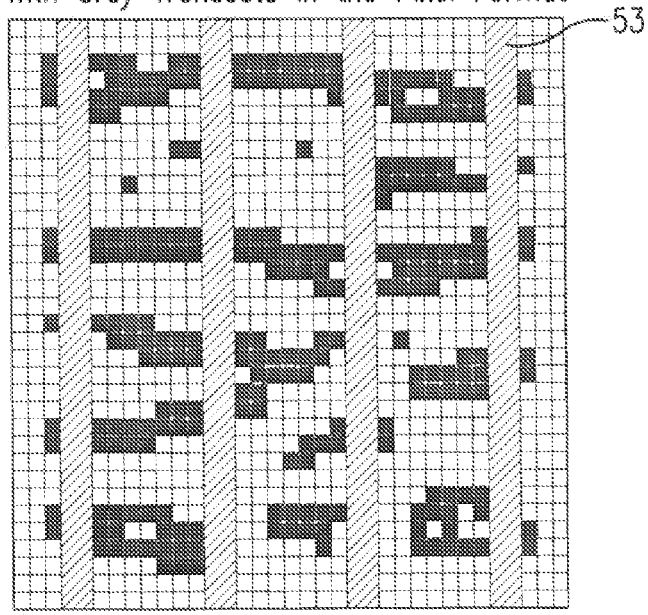
Figure 12C:
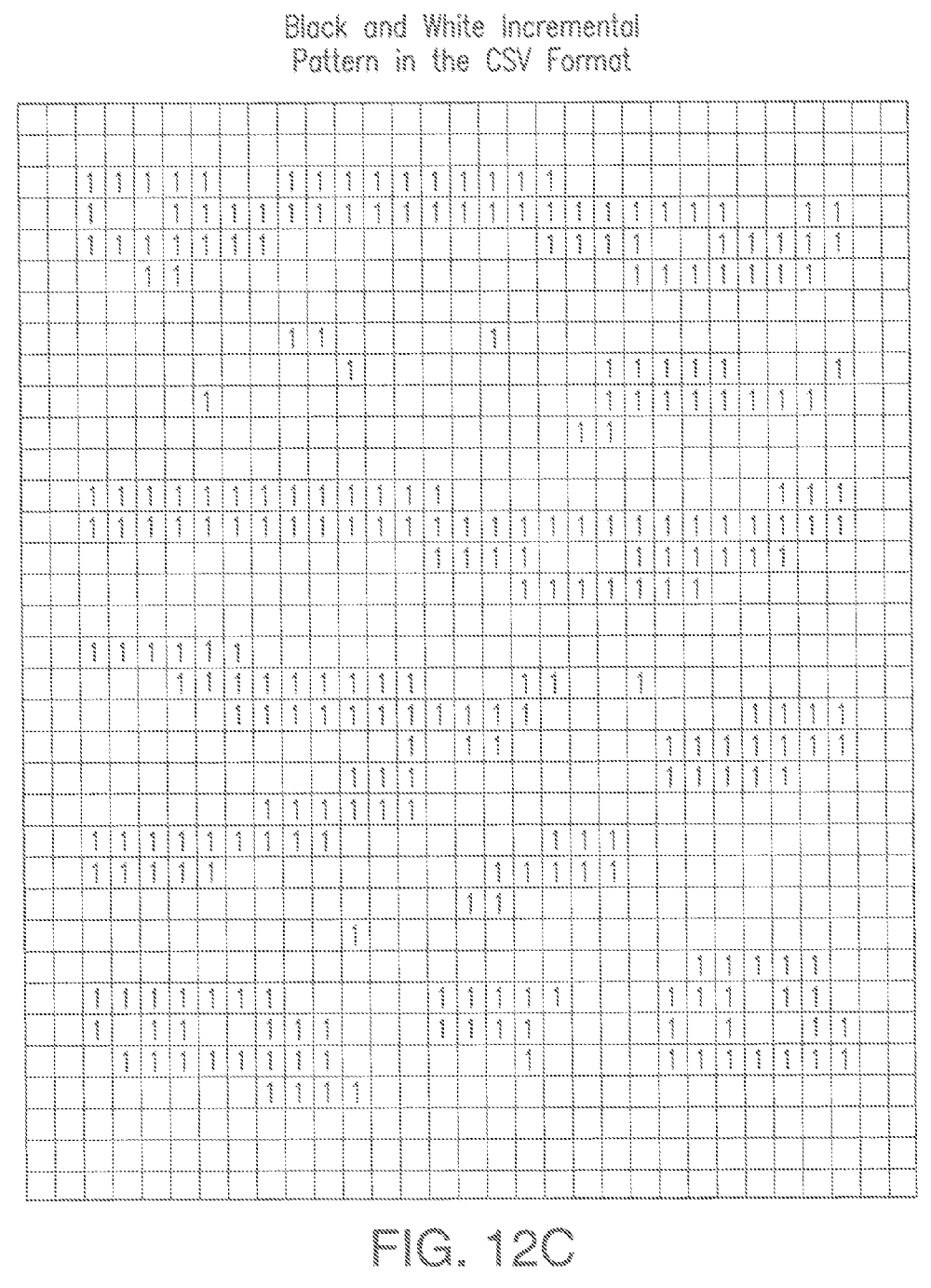
Figure 12D:
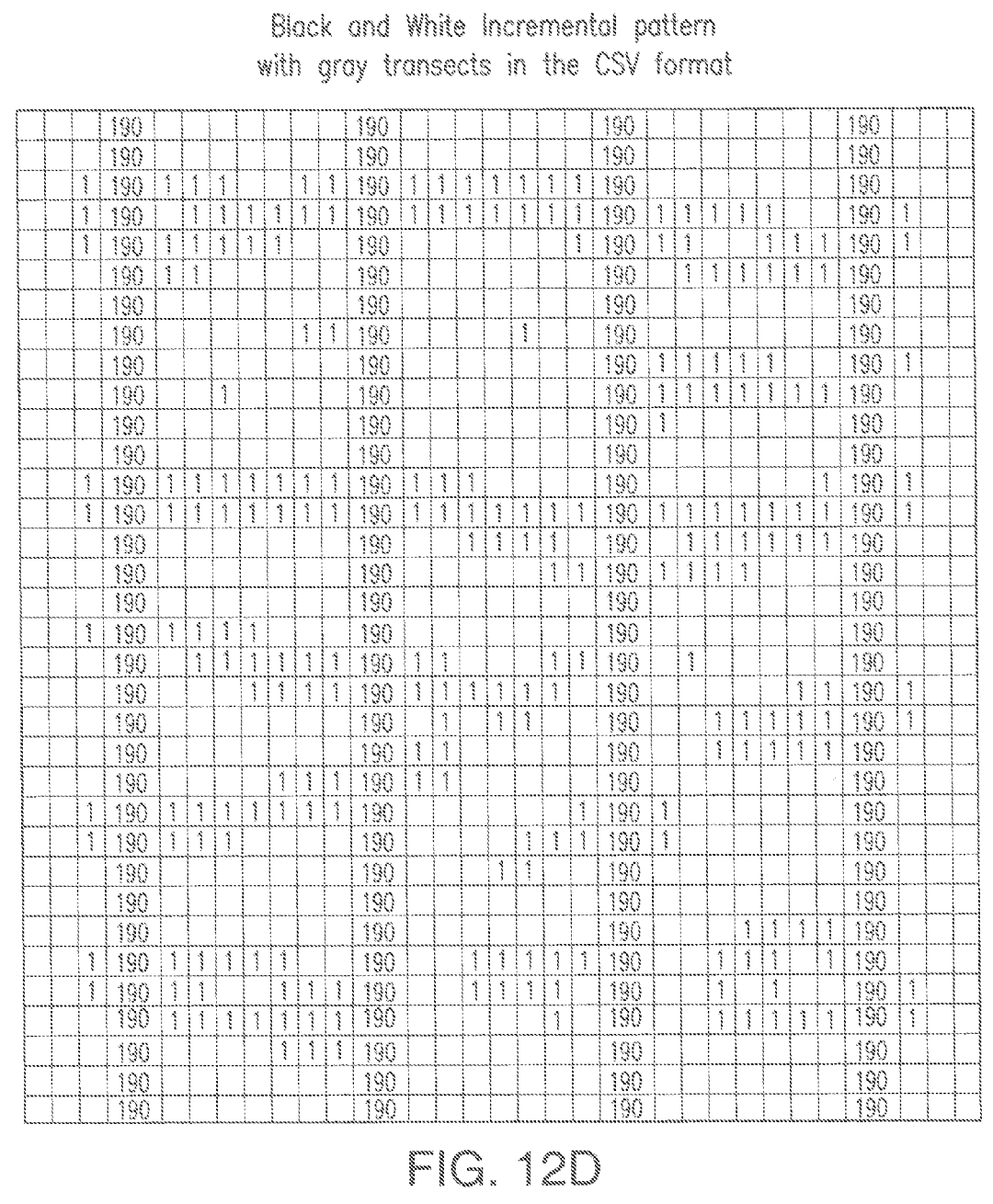

Upon converting the IP, in its pixel format, into the ASCII format in the format converter 32, the system obtains the initial incremental pattern 51 under study (FIG. 12A), as well as the IP under study with the gray transects 53 added (FIG. 12B) in the CSV format, shown in FIG. 12C-12D, respectively.

Cells in FIGS. 12C-12D, associated with the black pixels, constitute the foreground of the incremental pattern and have a value of "1". The cells in FIGS. 12C-12D, associated with white pixels, constitute the background of the incremental pattern, and have no values, i.e. cells have value "empty". Gray pixels corresponding to transects 53 in FIG. 12B may be assigned the values between 1 and 255. For example, as shown in FIG. 12D, the pixels of the transects may be assigned the value of 190 in the CSV format.

Upon obtaining (in block 52) of the CVS format of the original (initial) incremental pattern (IP) 51 and the IP with the added transects 53, the logic flows to block 54 "Pattern Filtering", where the incremental pattern, in its CSV format, is filtered to remove elements not associated with IBs. There are two categories of such elements. The first category includes black segments with a size smaller than a predetermined threshold. The second category includes white "holes" in black segments with a size smaller than a predetermined threshold. The size of a white "hole" within a black segment is determined as the number of white pixels which the "hole" consists of. As an alternative, the filtering may be applied to the initial image (in black and white representation) before adding the transects.

The removal of black pixels is performed through the following sub-routines:

a) segmentation of the incremental pattern under study and assigning an identical label to each black pixel within the same segment which is performed in block 55 of FIG. 11;

b) calculation the size of each segment which is performed in block 56 of FIG. 11; and c) removal of the segments with a size smaller than a threshold, i.e. assigning the value "empty" to each black pixel in these segments which is performed in block 57 of FIG. 11.

Filtering and construction of a model of an incremental pattern under study is accomplished through the sub-routine of segmentation (segment identification) and labeling of a binary image which constitutes an aspect of the present algorithm. It is assumed that a forming front of an incremental band consists of black pixels formed at the same instant of time $T_j$. In terms of Pattern Recognition its meaning is that a forming front is a segment which consists of the set of 8-connected black pixels, or in other words a forming front is the set of Moore neighborhood pixels (A. Rosenfeld, et al. (1982), "Signal Processing for Neuroscientists" Digital Picture Processing, Academic Press, Inc., Wim van Drongelen, Academic Press, 2008). A segmentation of an incremental pattern is the process of assigning the same label to every pixel within a segment formed at the same instant of time $T_j$. The size of a segment is the number of sets of 8-connected black pixels comprising the segment.

Figure 13A:
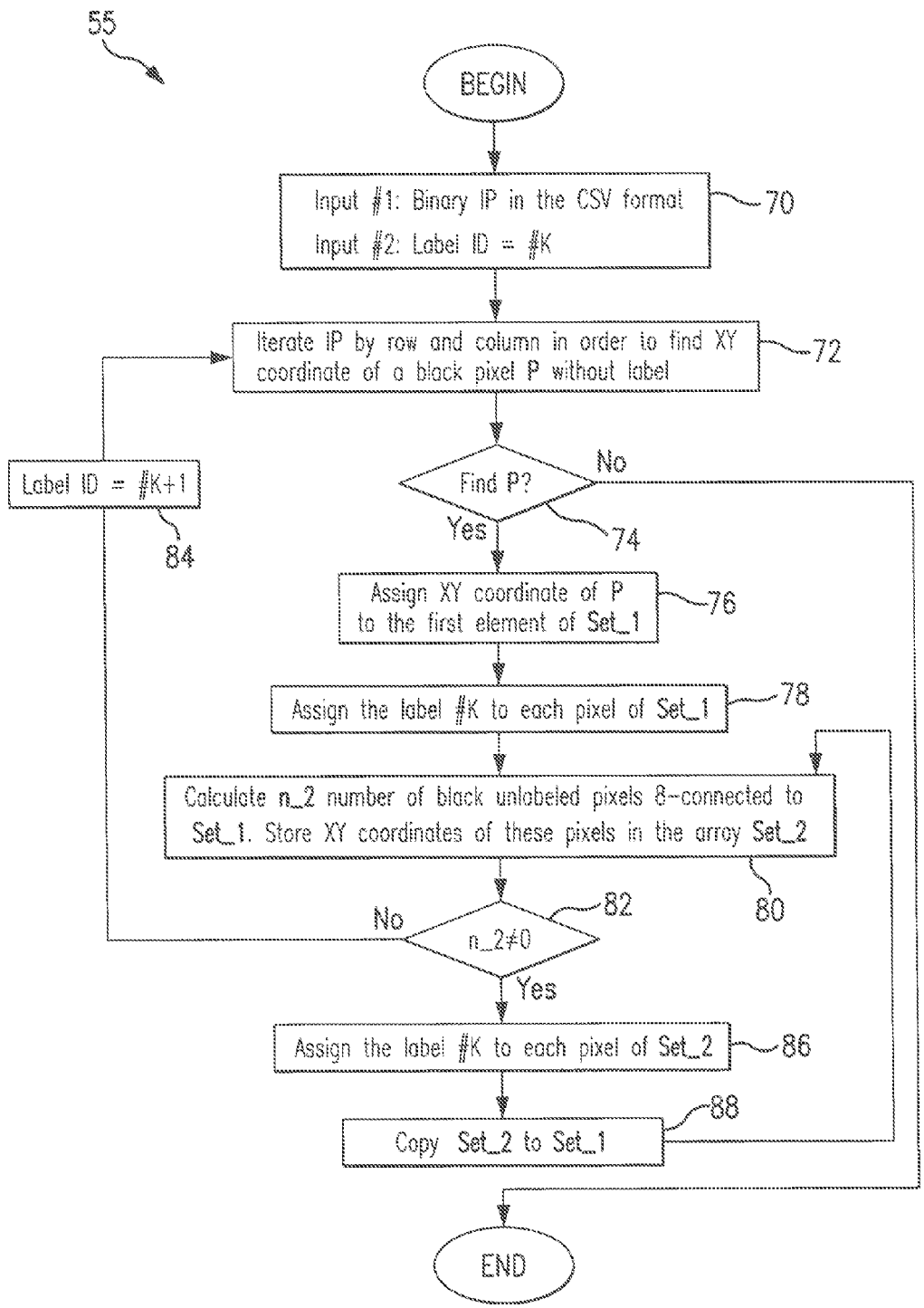
FIG. 13A is a flow chart of the algorithm devised for segmentation of a binary incremental pattern under study.

The flow chart and source code of the segment identification and labeling procedure performed in block 55 of FIG. 11 are depicted in FIG. 13A and FIG. 13B, respectively. As presented in FIG. 13A, in block 70, a binary incremental pattern in the CSV format (Input #1) is stored in the EXCEL spreadsheet (in the computer system 28) and an initial value is assigned to a first label (Input #2). In block 72, the binary IP image is scanned from left to right and from top to bottom in order to find a first unlabeled black cell P (corresponding to lines 2 and 3 of the source-code presented in FIG. 13B).

If in block 74, the logic does not find the unlabeled black cell P, then all black pixels of IP have been labeled and the labeling process is now complete.

If, however in block 74, the unlabeled black cell P is found (corresponding to line 4 of FIG. 13B), then the logic flows to block 76, where XY coordinates of the P are stored in a memory (not shown) in the computer system 28 in the array Set__1 (line 7 of FIG. 13B), and in block 78 the initial label number #K (from block 70) is assigned to P (in correspondence to line 6 of FIG. 13B).

From block 78, the logic flows to block 80, where the system calculates a number of unlabeled black pixels n__2 which are 8-connected to P. XY coordinates of these pixels are stored in Set__2 (lines 13-52 of FIG. 13B).

From block 80, the process flows to logic block 82, where a determination is made whether "n__2≠0". If n__2=0 (Set__2={ø}, then there are no further black pixels which are 8-connected to pixels with the label #K. In this case a label ID is assigned the new value equal #K+1 in block 84, and the procedure loops to block 72 to continue scanning of the IP in order to find unlabeled black pixels.

If, however, in logic block 82, n__2>0, then the logic flows to block 86 where the label #K is assigned to pixels stored in Set__2, and the XY coordinates of pixels stored in Set__2 are copied to Set__1 in block 88.

Next, the logic loops to block 80, and the sub-routines performed in blocks 80-88 are repeated in order to label all pixels which are 8-connected to P.

The algorithm of removing white pixels from the IP is similar to the algorithm of the black pixels removal described in previous paragraphs, and presented in FIGS. 13A-13B, if the notion of a "black pixel" is substituted with the notion of a "white pixel".

Figure 14A:
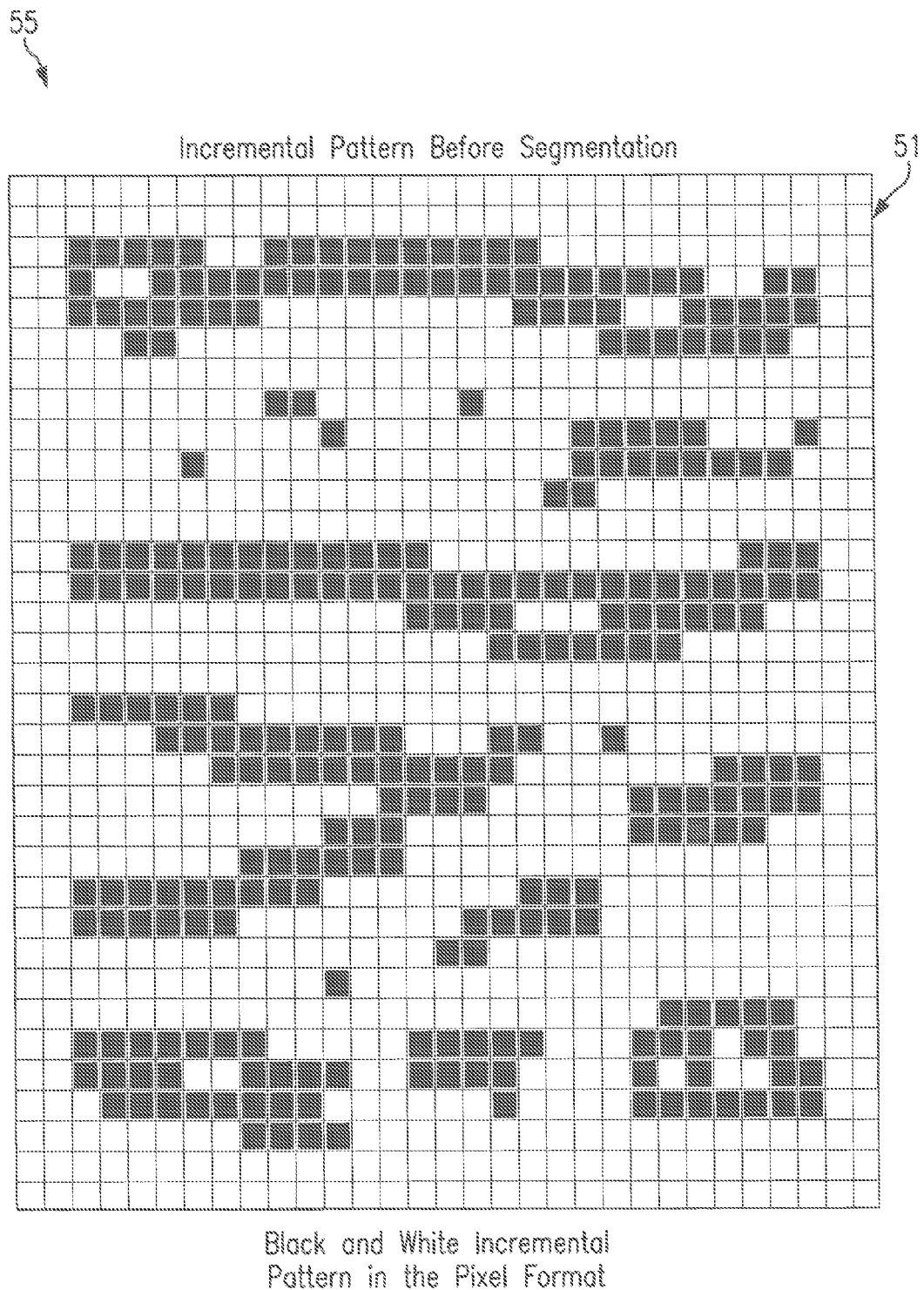
Figure 14B:
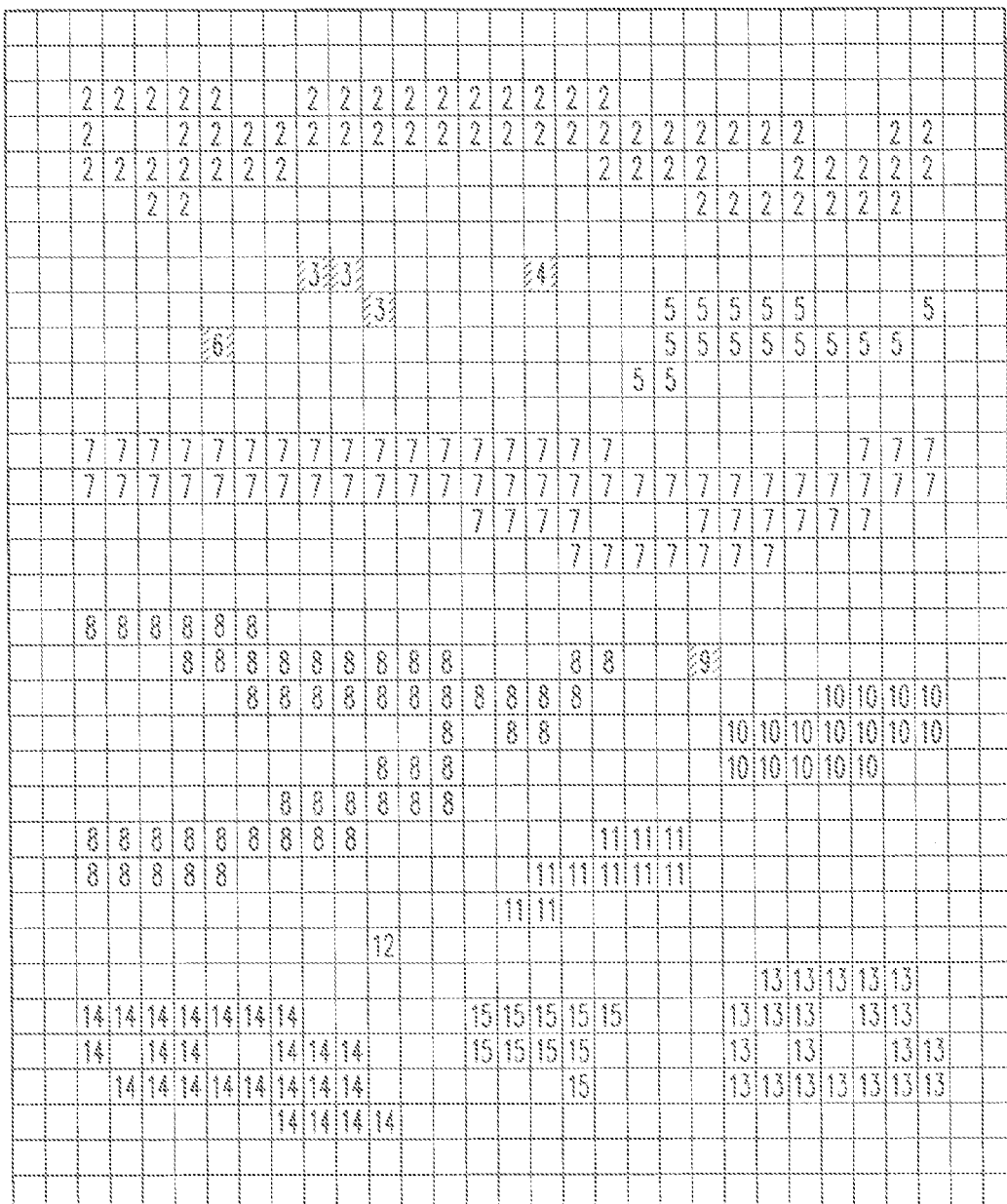
Figure 14D:
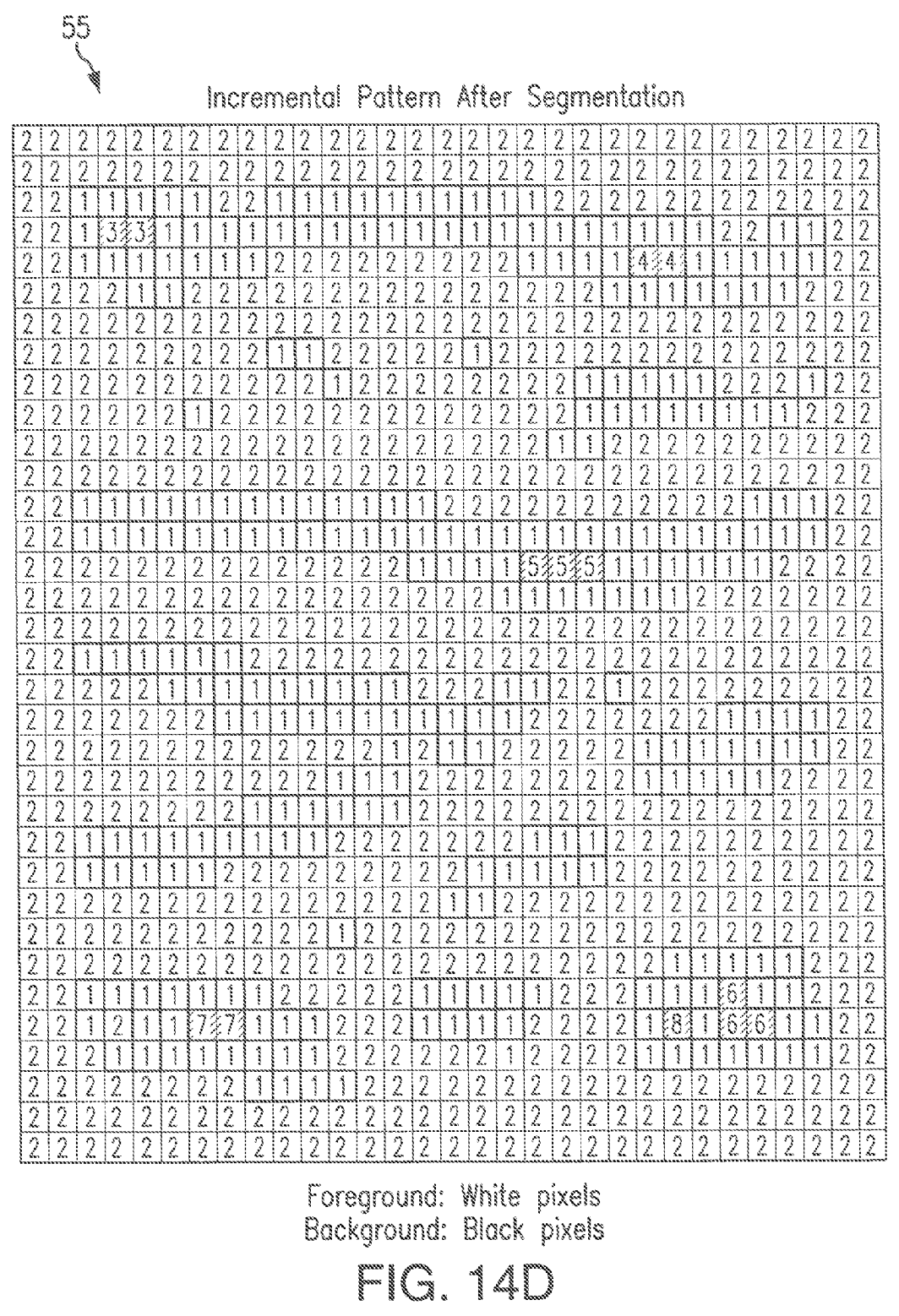
Figure 15A:
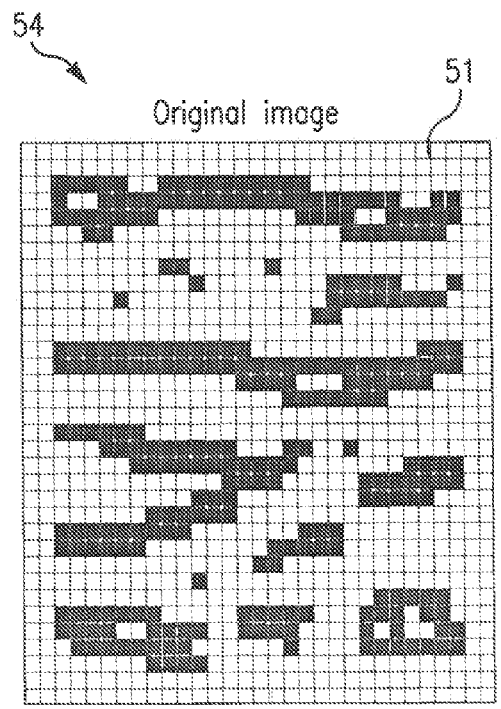
FIGS. 15A-15D represent the routine for filtering the incremental pattern under study, and illustrate the IP before and after the filtering.
Figure 15B:
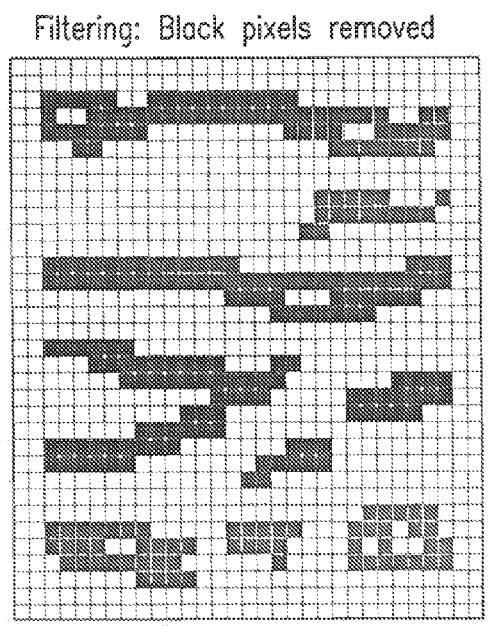
Figure 15C:
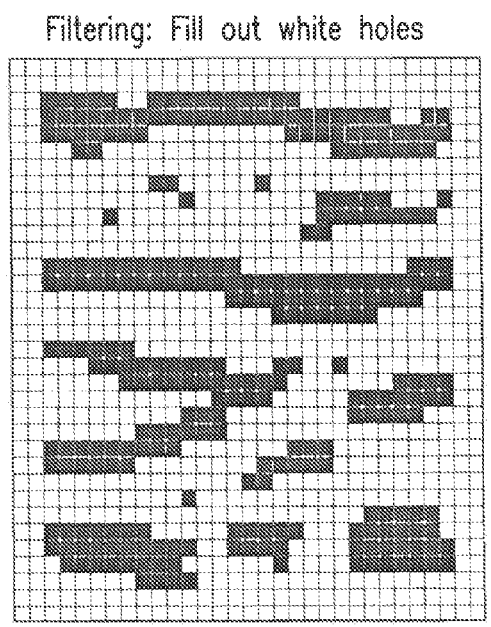
Figure 15D:
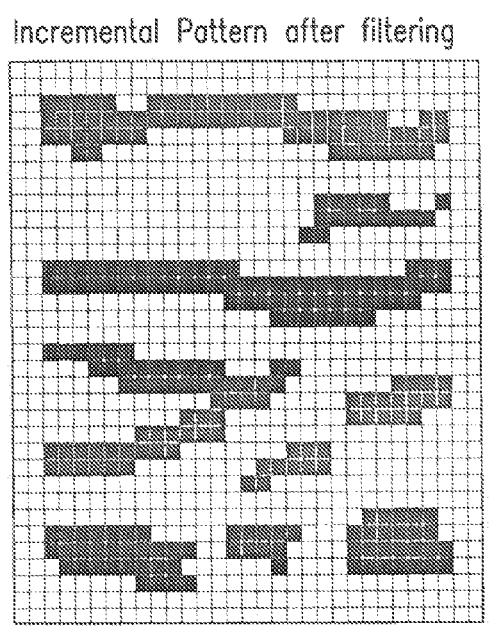

FIGS. 14A and 14C depict the initial IP 51 in pixel format and CVS format, respectively, before the segmentation. The results of segmentation and labeling of black and white pixels are presented in FIGS. 14B and 14D.

FIGS. 15A-15D depict the initial image 51 (FIG. 15A) and the results of the filtering of black and white pixels for the threshold of 3 pixel.

Referring again to FIG. 11, after the filtering is performed in block 54, a model of an IP is calculated in block 58 based on the IP after filtering in the CSV format, the binary IP image with gray transects $R_1, \ldots, R_i, \ldots, R_n$ in the CSV format, and the size of a pixel in microns (scale factor).

The model of an IP may be constructed when three components are determined, which include:

a) Width of incremental bands found in the IP under study;

b) Area of the incremental bands; and c) Structure of the IP under study.

Width of Incremental Bands

The starting point for the routine for calculating the width of incremental bands is:

a) the sheet in EXCEL which contains the binary IP in the CSV format shown in FIG. 12C, b) the sheet in EXCEL which contains the binary IP with gray transects in the CSV format shown in FIG. 12D, and c) size of a pixel (usually in centimeters for geological objects, microns for biological objects, and nanomicrons for nanoripples).

An algorithm, for calculation of width of incremental bands includes modules 90-96 presented in FIGS. 16A-16F.

Figure 16A:
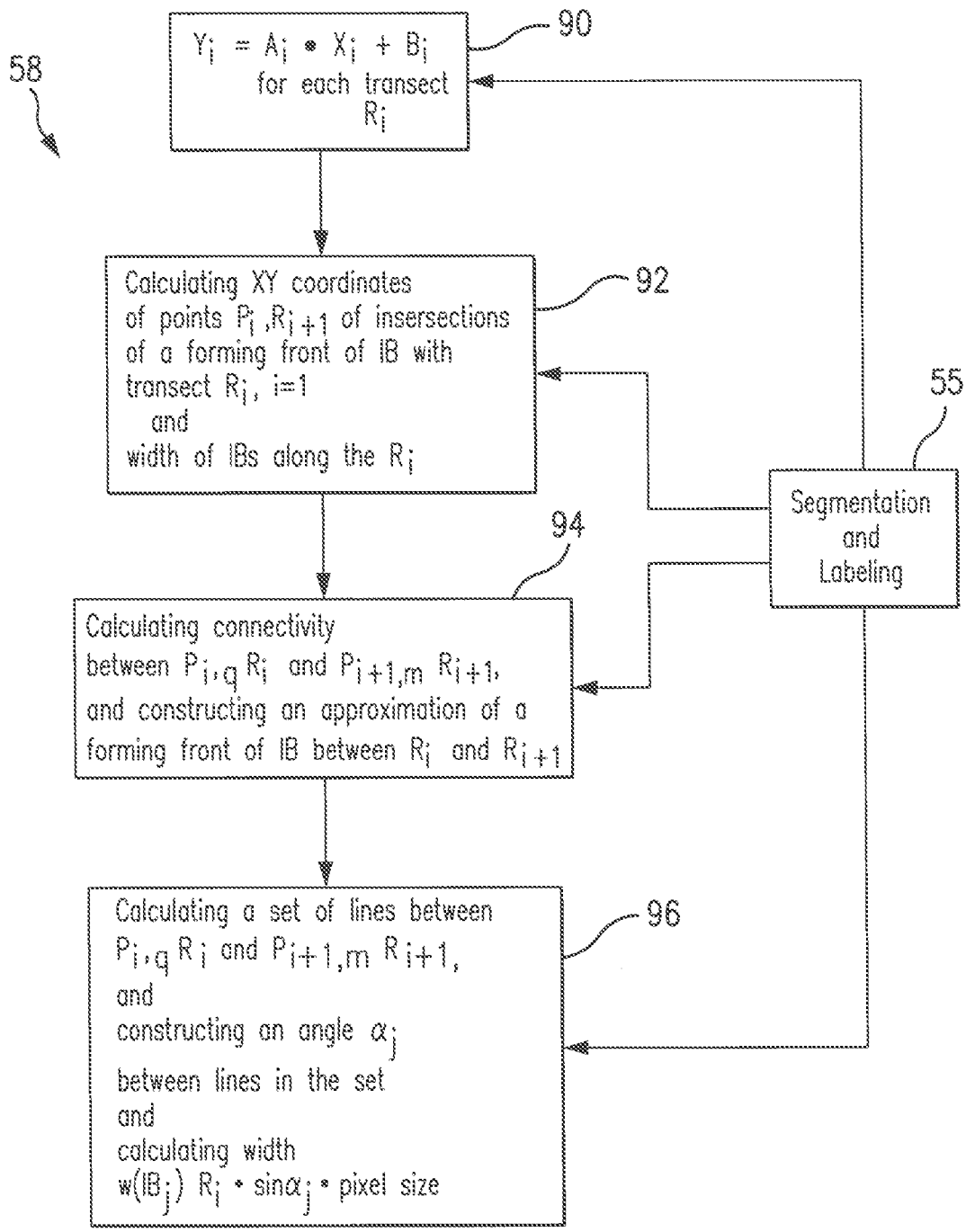
FIGS. 16A-16E represent the procedure for correction of the width of incremental bands.
Figure 16B:
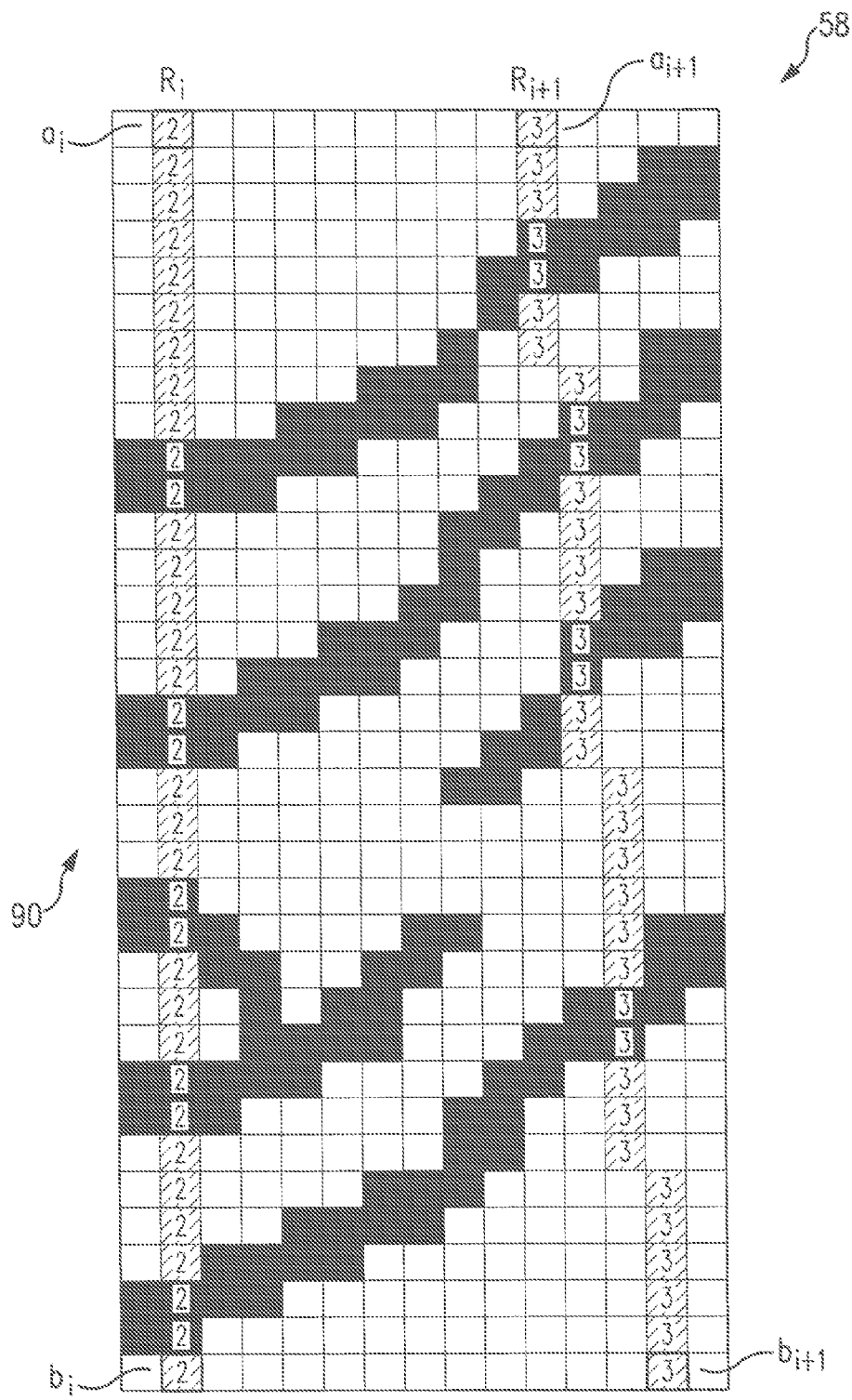

In module 90, presented in FIGS. 16A-16B, XY coordinates of gray pixels of transects $R_1, \ldots, R_{i+1}, \ldots, R_n$ are calculated based on a binary IP with gray transects in the CSV format. Each transect is considered a continuous straight line. Therefore, each transect is an 8-connected segment with foreground value equal 190 as shown in FIG. 12D. The routine 55 of segmentation and labeling is applied to label pixels of transects $R_i$, i=1, ..., n in FIG. 16B.

Next, XY coordinates of pixels of the transect $R_i$, i=1, ... n, are calculated.

Subsequently, the upper ($a_i$) and lower ($b_i$) points of the transect $R_i$ (FIG. 16B) are used to calculate a linear equation $$Y_i = A_i * X_i + B_i \quad \text{(Eq. 22)}$$

of transect $R_i$, i=1, ..., n.

Figure 16C:
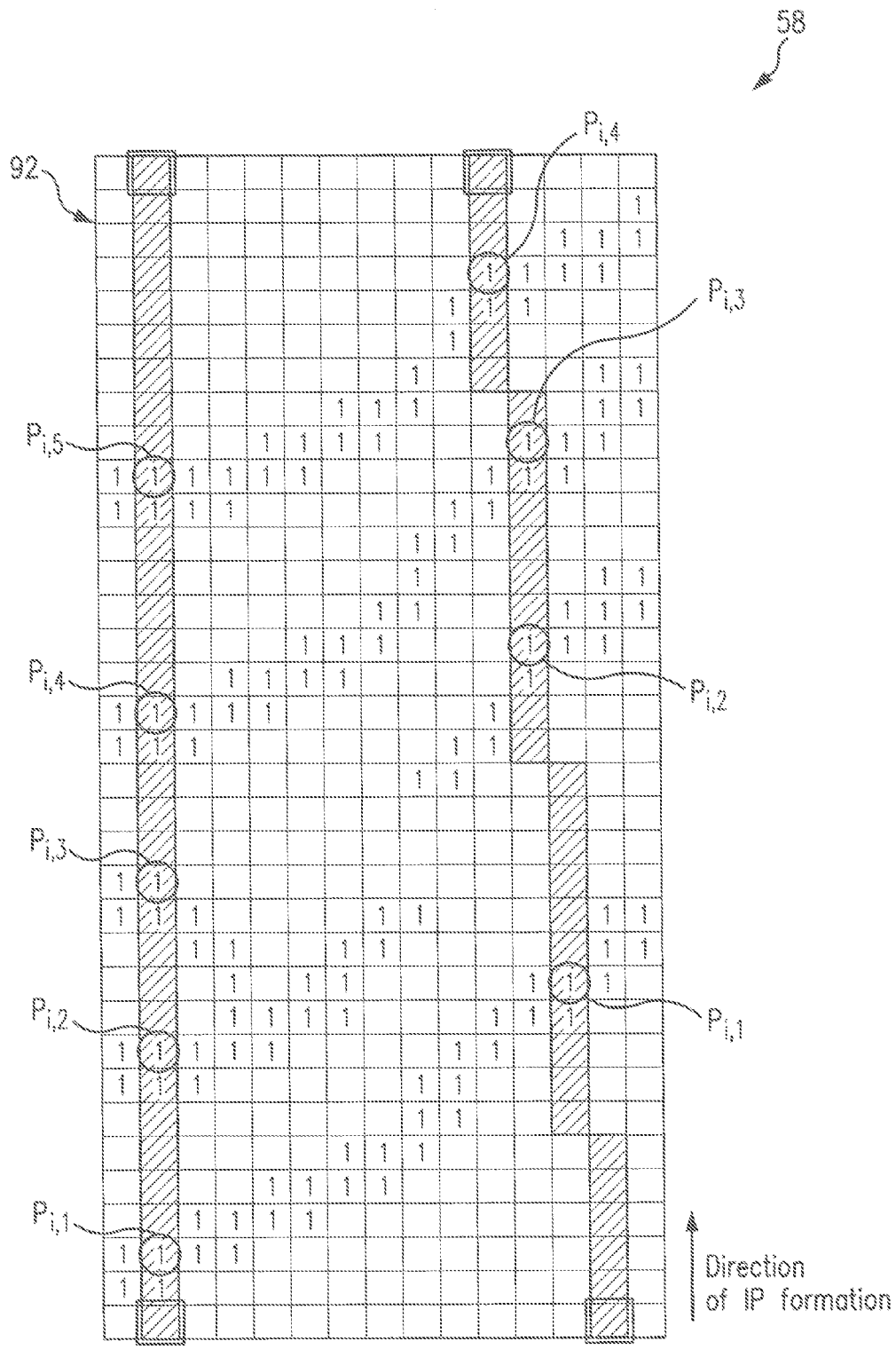

In module 92, presented in FIGS. 16A and 16C, XY coordinates of points $P_i = \{p_i,1, p_i,2, \ldots, p_i,5\}$, $P_{i+1} = \{p_{i+1},1, p_{i+1,2}, \ldots p_{i+1,4}\}$ of intersections of a forming front of incremental bands (FIGS. 12B and 12D) with transect $R_i$, i=1, are calculated based on the binary IP and XY coordinates of transects $R_1, \ldots, R_n$ attained in the module 90 (FIG. 16B). Subsequently, a width of the incremental bands along the transect $R_i$ is calculated as a distance in Euclidean space between two nearby points $p_{i,q}$ and $p_{i,q+1}$.

Figure 16D:
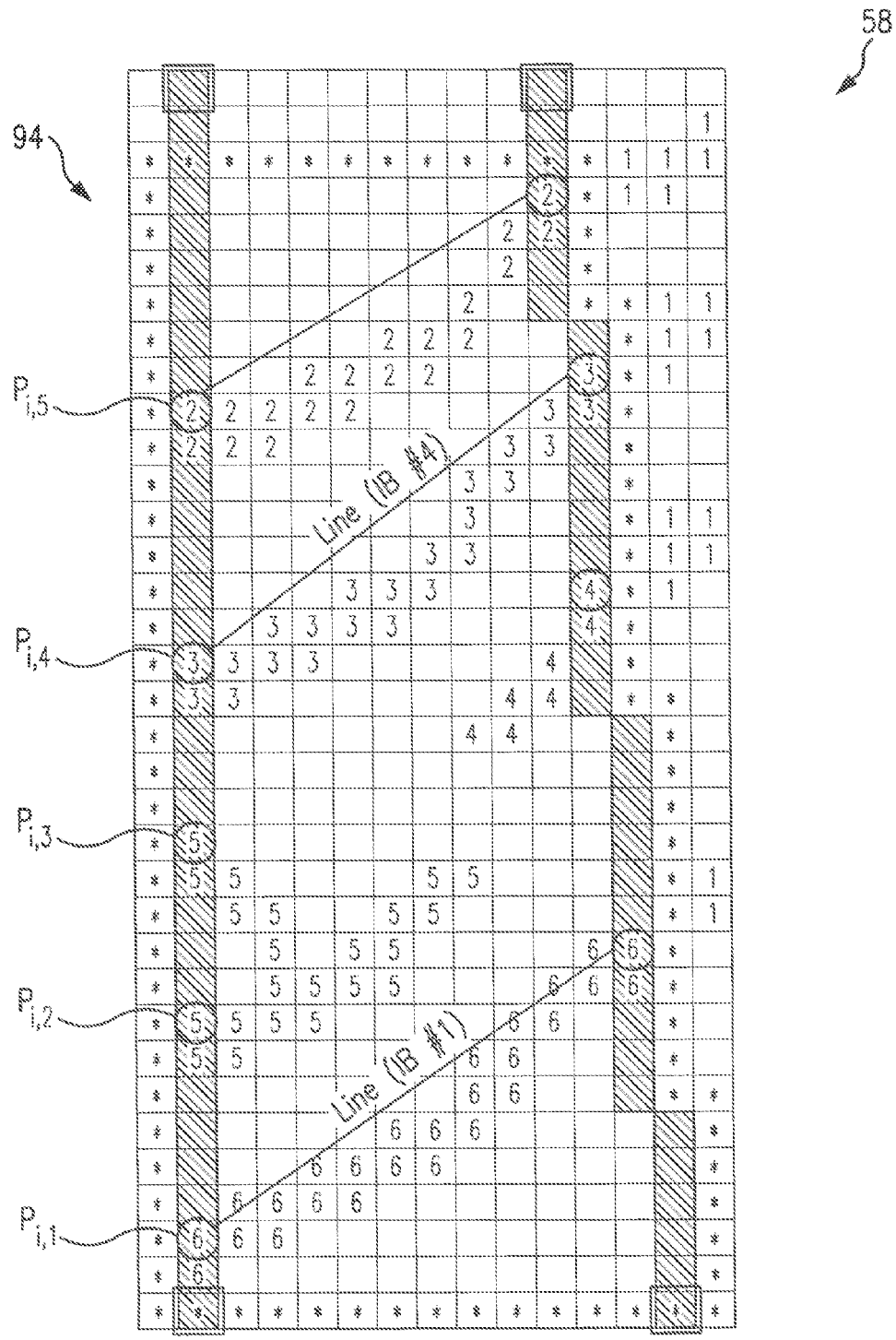

In module 94, presented in FIGS. 16A and 16D, an area of IP between two nearby transects $R_i$ and $R_{i+1}$, i=1, n−1 is surrounded by a frame which consists of asterisks (FIG. 16D). Subsequently, the algorithm 55 of fragmentation (segmentation) and labeling is applied (as shown in FIG. 13B) to label forming fronts between two neighboring transects $R_i$ and $R_{i+1}$. Because the asterisk are neither background or foreground of the IP, the fragmentation and labeling of propagation fronts of incremental bands situated between $R_i$ and $R_{i+1}$ are carried out only within the asterisk frame.

Subsequently, the connectivity between points $p_{i,q}$ and $p_{i+1,m}$ is calculated. Two points $p_{i,q}$ and $p_{i+1,m}$ are connected by a straight line if these and only these points belong to the same fragment (FIG. 16D). Thus a straight line is the approximation of a forming front between two neighboring transects $R_i$ and $R_{i+1}$.

Figure 16E:
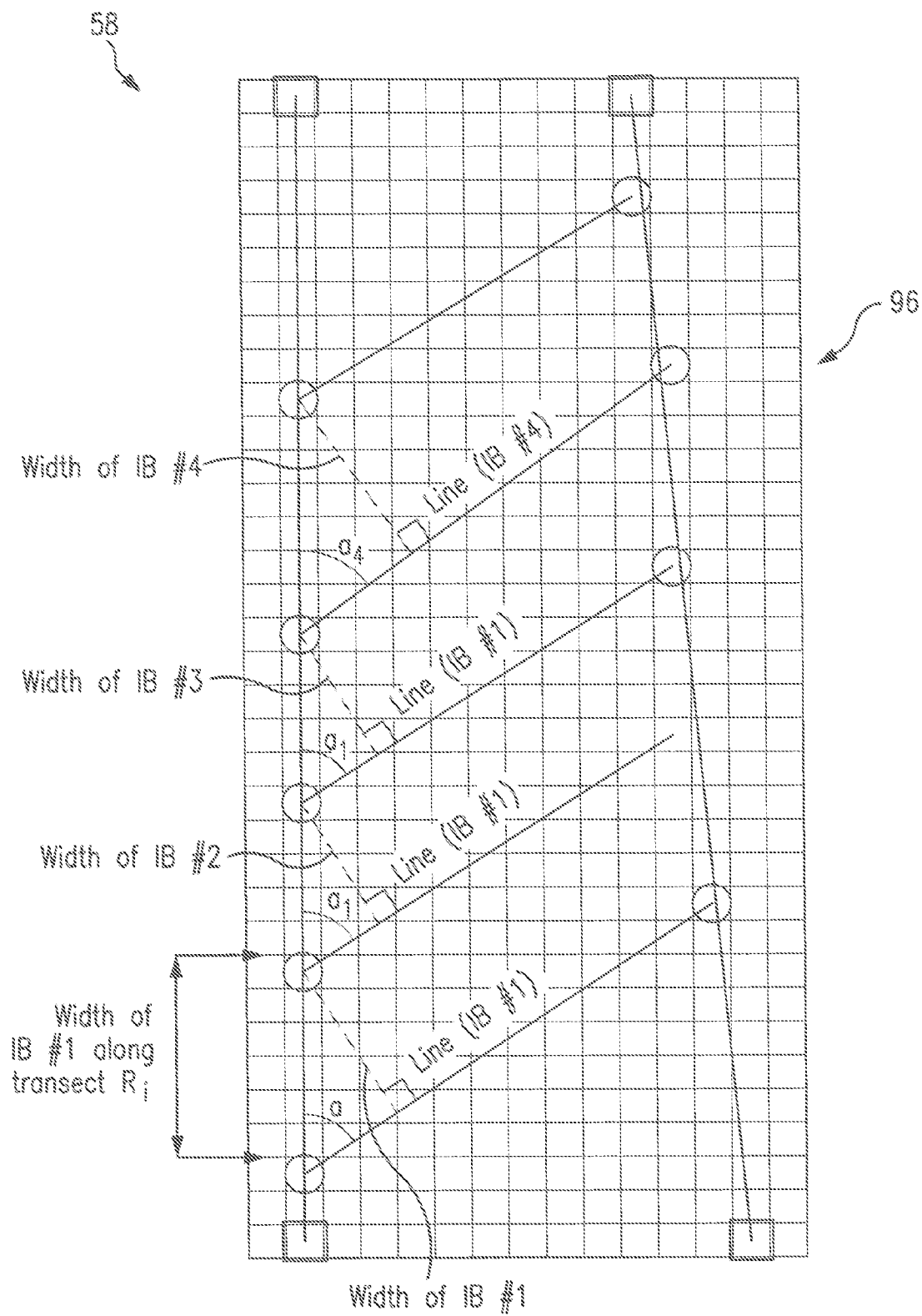

In module 96, corresponding to FIGS. 16A and 16E, equations for a set L of lines between $p_{i,q}$ and $p_{i+1,m}$ are calculated based on a connectivity between two sets of points $P_i$ and $P_{i+1}$ calculated in module 94. For the incremental pattern in FIG. 16D, the set L consist of two lines: Line (Incremental Band #1) and Line (Incremental Band #4). The line (Incremental Band #1) is the starting point of formation of the Incremental Band #1.

Subsequently, an angle $\alpha_j$ between two lines is calculated based on the equation for Line (Incremental Band #j) and the Eq. 22 ($Y_i = A_i * X_i + B_i$) for the transect $R_i$ from the module 90 (FIG. 16D). Next, a width $w(IB_j)$ of incremental band j is calculated based on a width of incremental band j along transect $R_i$ [$w(IB_j)R_i$] and the angle $\alpha_j$:

$$w(IB_j) = w(IB_j)R_i * \sin \alpha_j * \text{size of a pixel} \quad \text{(Eq. 23)}$$

(Line IB #1 and Line IB #4, FIGS. 16D and 16E).

If point $p_{i,q}$ is not connected to point from then a slope of the line which passes through $p_{i,q-1}$ is used to calculate $\alpha_q$. For example, the slope $\alpha_1$ of the Line IB #1 (FIG. 16E) is used to calculate w(IB #2) and w(IB #3). The slope of lines connected to the points along $R_{n-1}$ and $R_n$ is used to calculate a width of incremental bands crossing the last transect $R_n$.

Area of Incremental Band

An area of incremental bands between neighboring transects is calculated in block 58 of FIG. 11 in accordance with a sub-routine depicted in FIGS. 17A-17E based on the equal distance (in pixels) between all pairs of neighboring transects across the 2-D plane of the IP under study.

Figure 17A:
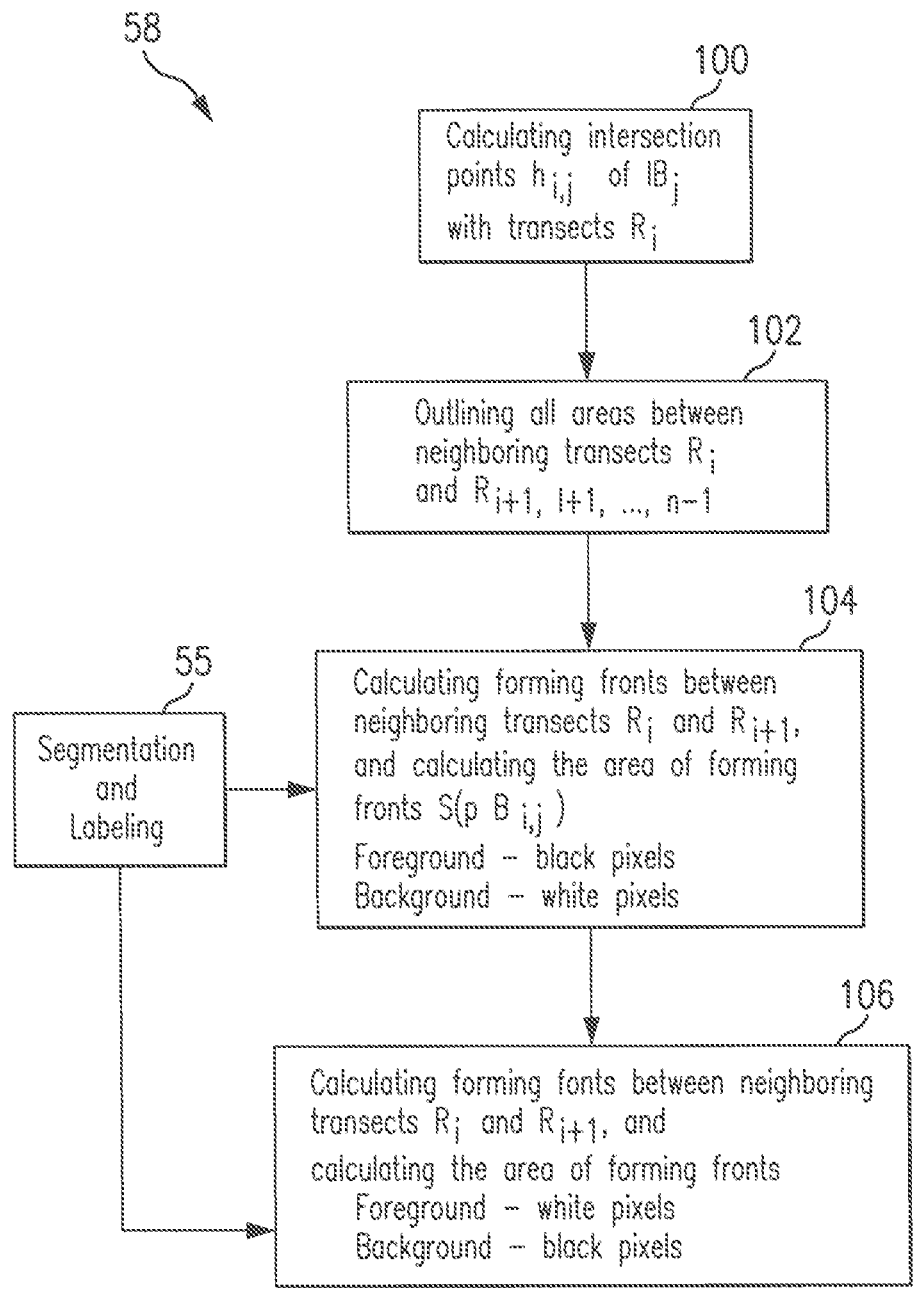
Figure 17B:
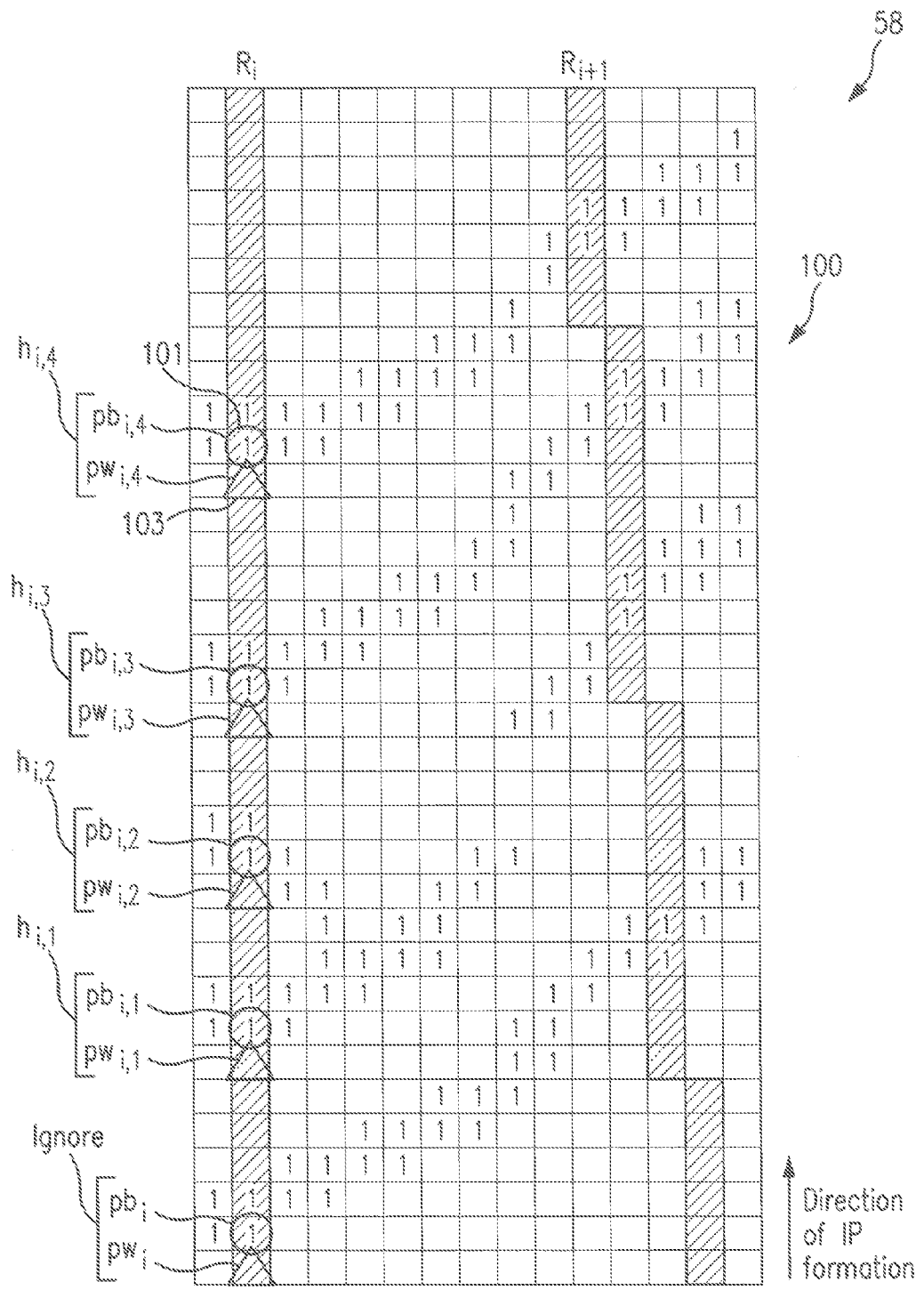

The starting point for the algorithm for calculating the area of incremental bands is:

a) a spreadsheet (in EXCEL environment) which contains the binary IP in the CSV format (as shown in FIG. 17B);

b) XY coordinates of pixels comprised of transects $R_1, \ldots, R_n$ from module 90 of FIGS. 16A-16B; and c) area of a pixel (usually in cantimiters$^2$ for geological objects, microns$^2$ for biological objects, and nanomicron$^2$ for nanoripples).

An algorithm for calculation of an area of incremental bands includes modules 100-106 depicted in FIGS. 17A-17E.

In module 100, corresponding to FIGS. 17A-17B, XY coordinates of a point $h_{i,j}$ of intersections of $IB_j$ with transect $R_i$ are calculated based on the binary IP and XY coordinates of transect $R_i$.

The point $h_{i,j}$ consist of two adjacent pixels. These pixels are indicated in FIG. 17B by a circle 101 and a triangle 103. A pixel indicated by the circle 101 is a point of intersection of a forming front with the transect $R_i$. A pixel indicated by a triangle 103 is a point of intersection of a white component of the $IB_j$ with the transect $R_i$. Subsequently, a set of points $h_{i,j}$ is labeled in the direction of growth of IP ($h_{i,1}, h_{i,2}, h_{i,3}, h_{i,4}$).

Figure 17C:
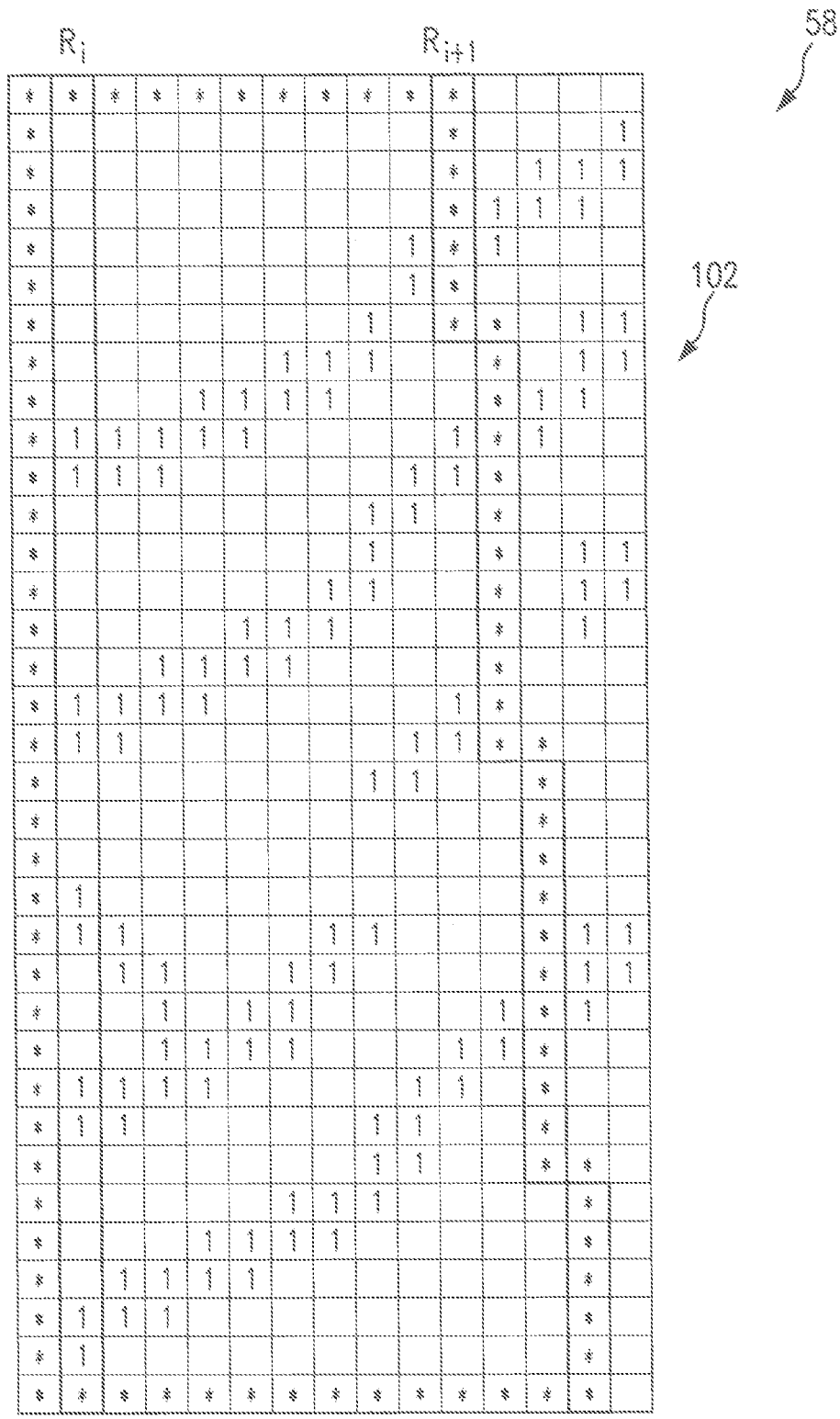

In module 102 shown in FIGS. 17A and 17C, an area of the IP between two neighboring transects $R_i$ and $R_{i+1}$, where i=1, ..., n−1, is surrounded by a frame comprised of asterisks.

Figure 17D:
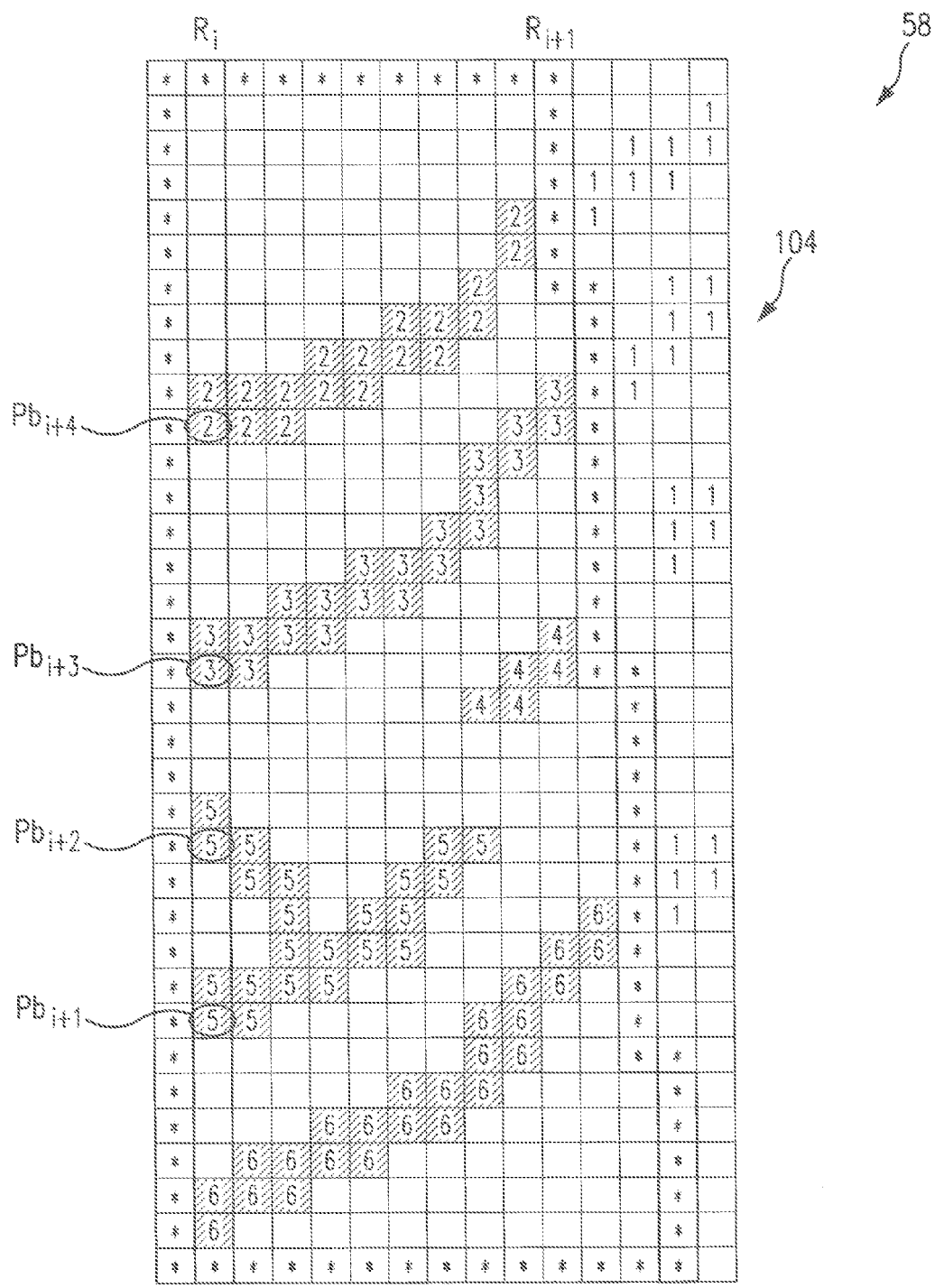

In module 104, shown in FIGS. 17A and 17D, the algorithm 55 of fragmentation and labeling is applied to label the forming fronts between two nearby transects $R_i$ and $R_{i+1}$. In this case the foreground of an IP are pixels labeled with "1", and the background of IP are pixels with no value (white pixels). Because the asterisk is neither background nor foreground in the IP, the fragmentation and labeling of forming fronts of incremental bands situated between $R_i$ and $R_{i+1}$ is carried out only inside of the frame formed by the asterisks in FIG. 17D.

Subsequently, a fragment number $k(pb_{i,j})$ is assigned to $pb_{i,j}$. For instance, $k(pb_{i,1})=5$, $k(pb_{i,2})=5$, $k(pb_{i,3})=3$, and $k(pb_{i,4})=2$, as shown in FIG. 17D.

Further, a number of incremental bands $u(pb_{i,j})$ with the same fragment number $k(pb_{i,j})$ are calculated for $pb_{i,j}$. For instance, $u(pb_{i,1})=2$, $u(pb_{i,2})=2$, $u(pb_{i,3})=1$, $u(pb_{i,4})=1$.

Subsequently, a number of pixels $q(pb_{i,j})$ consisting of a fragment $pb_{i,j}$ is calculated.

Further, an area of forming front $S(pb_{i,j})$ is calculated:

$$S(pb_{i,j}) = [(q(pb_{i,j})/u(pb_{i,j}))] \times (\text{area of a pixel}) \quad \text{(Eq. 24)}$$

Figure 17E:
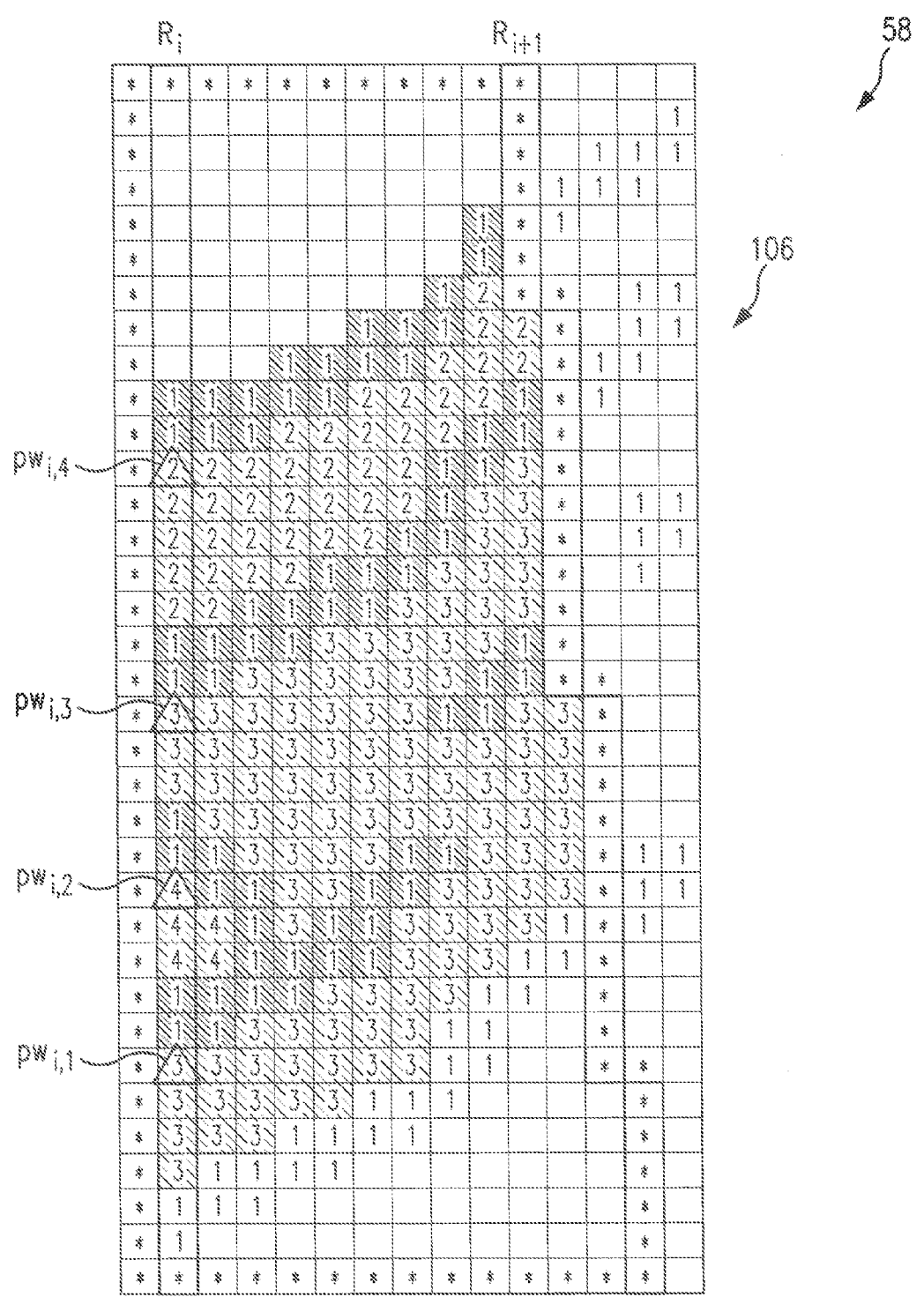

In module 106, corresponding to FIG. 17E, the algorithm 55 of fragmentation and labeling is applied to label the forming fronts between two neighboring transects $R_i$ and $R_{i+1}$. In this case the foreground of the IP is formed by the pixels with no value, and background of IP is formed by the pixels with assigned value of "1". This is the difference between module 104 (FIG. 17D) and module 106 (FIG. 17E).

Next, a fragment number $k(pb_{i,j})$ is assigned to $pw_{i,j}$. For instance, $k(pw_{i,1})=3$, $k(pw_{i,2})=4$, $k(pw_{i,3})=3$, $k(pw_{i,4})=2$ (FIG. 17E). Subsequently, a number of incremental bands $u(pw_{i,j})$ with the same fragment number $k(pw_{i,j})$ is calculated for $pw_{i,j}$. For instance, $u(pw_{i,1})=2$, $u(pw_{i,2})=1$, $u(pw_{i,3})=2$, $u(pw_{i,4})=1$ (FIG. 17E).

Further, a number of pixels $q(pw_{i,j})$ which consist of a fragment $pw_{i,j}$ is calculated, and an area of forming front $S(pw_{i,j})$ is calculated:

$$S(pw_{i,j})=[(q(pw_{i,j})/u(pw_{i,j})]\times(\text{area of a pixel}) \quad (\text{Eq. 25})$$

Next, an area $S(h_{i,j})$ of incremental band $h_{i,j}$ is calculated:

$$S(h_{i,j})=S(pb_{i,j})+S(pw_{i,j}) \quad (\text{Eq. 26})$$

n-Partite Graph G(n)

A structure of an incremental pattern is calculated in block 59 of FIG. 11 based on the n-partite graph G(n). The logic calculates the graph G(n) in block 58 of FIG. 11 in accordance with an algorithm of the calculation of G(n) which includes modules 110-118 presented in FIGS. 18A-18E.

Figure 18A:
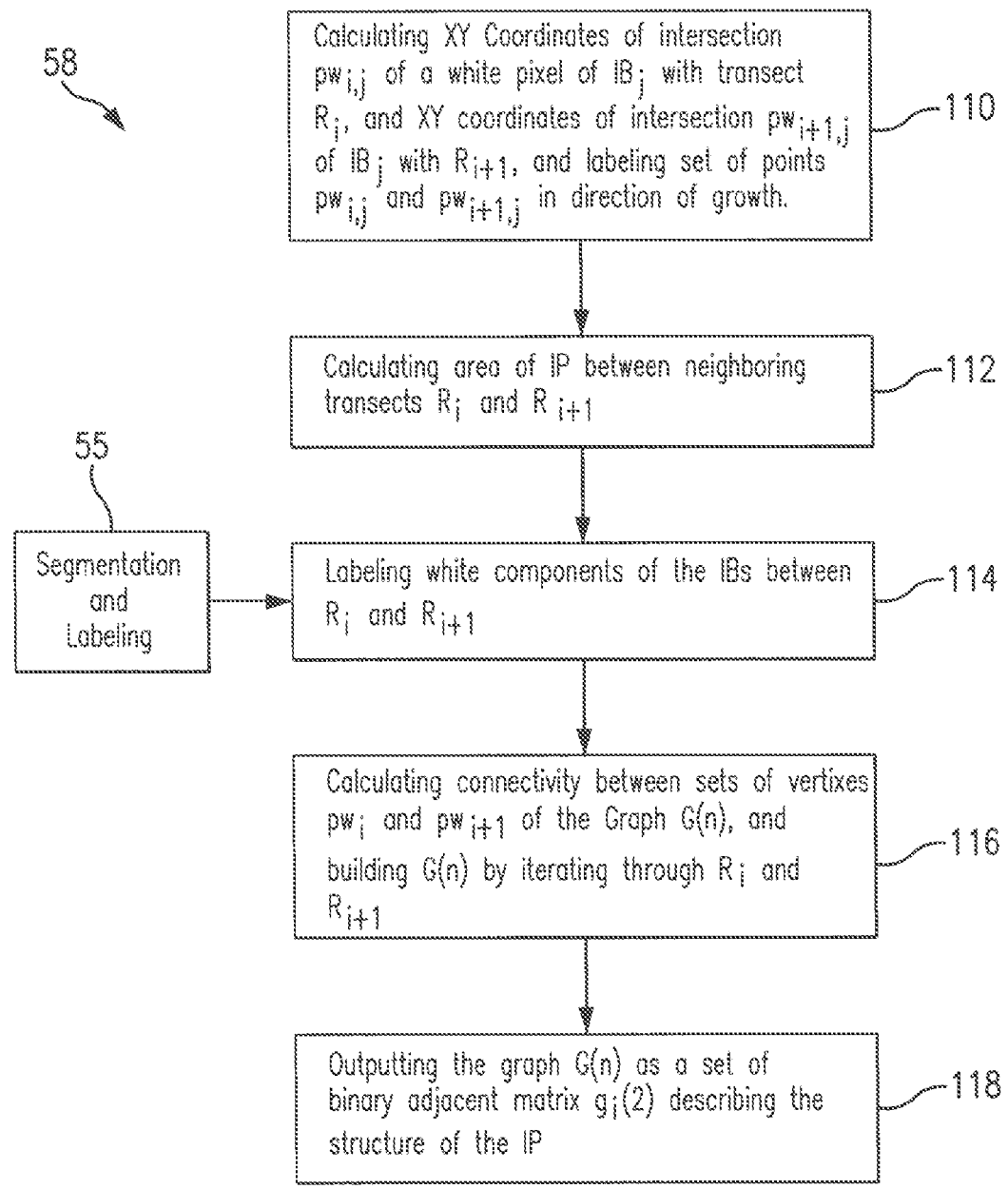
Figure 18B:
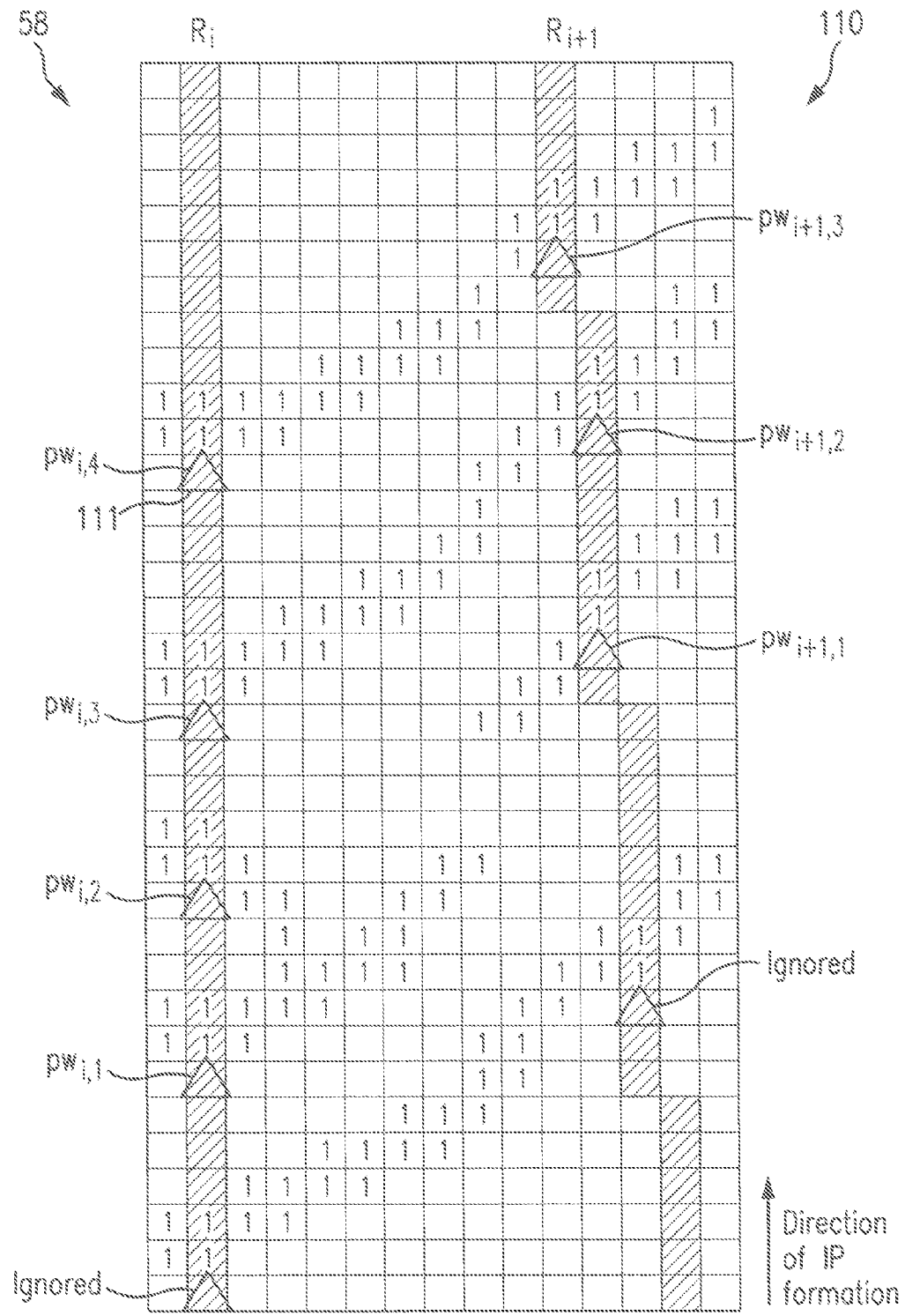

In module 110, corresponding to FIGS. 18A-18B, XY coordinates of a point of intersection $pw_{i,j}$ of a white component of an incremental band j with a transect $R_i$ and XY coordinates of a point of intersection $pw_{i+1,j}$ of a white component of an incremental band j with a transect $R_{i+1}$ are calculated based on a binary IP (shown in FIG. 17B). These points are indicated by triangles 111 in FIG. 18B. Subsequently, a set of points $pw_{i,j}$ and $pw_{i+1,j}$ are labeled in the direction of IB formation, i.e., the points $pw_{i,1}$, $pw_{i,2}$, $pw_{i,3}$, $pw_{i,4}$ along the transect $R_i$, and points $pw_{i+1,1}$, $pw_{i+1,2}$, $pw_{i+1,3}$ along the transect $R_{i+1}$, as shown in FIG. 18B.

Figure 18C:
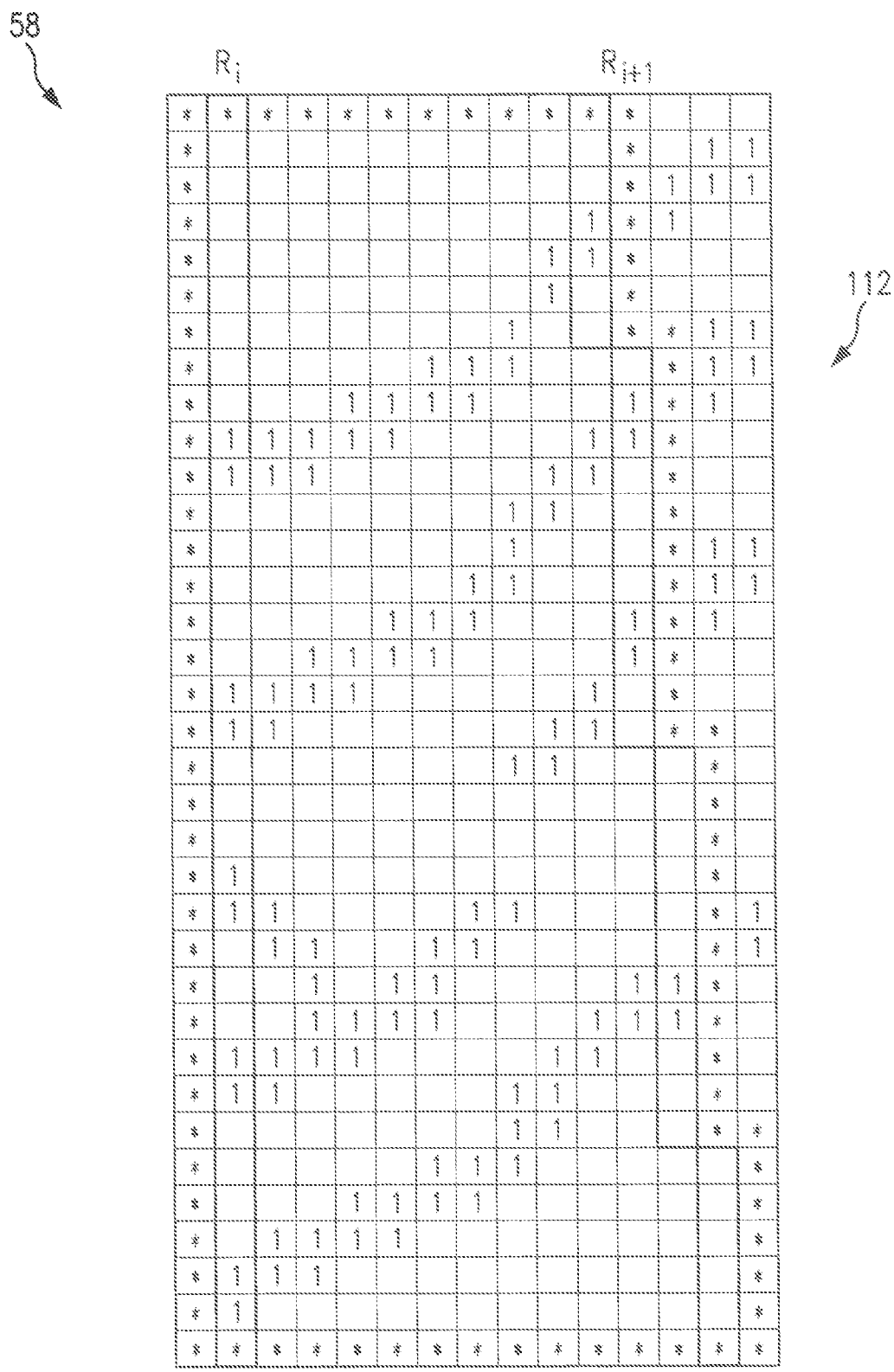

In module 112, corresponding to FIG. 18C, an area of IP between two neighboring transects $R_i$ and $R_{i+1}$, where i=1, . . . , n−1, is surrounded by a "frame" which consists of asterisks.

Figure 18D:
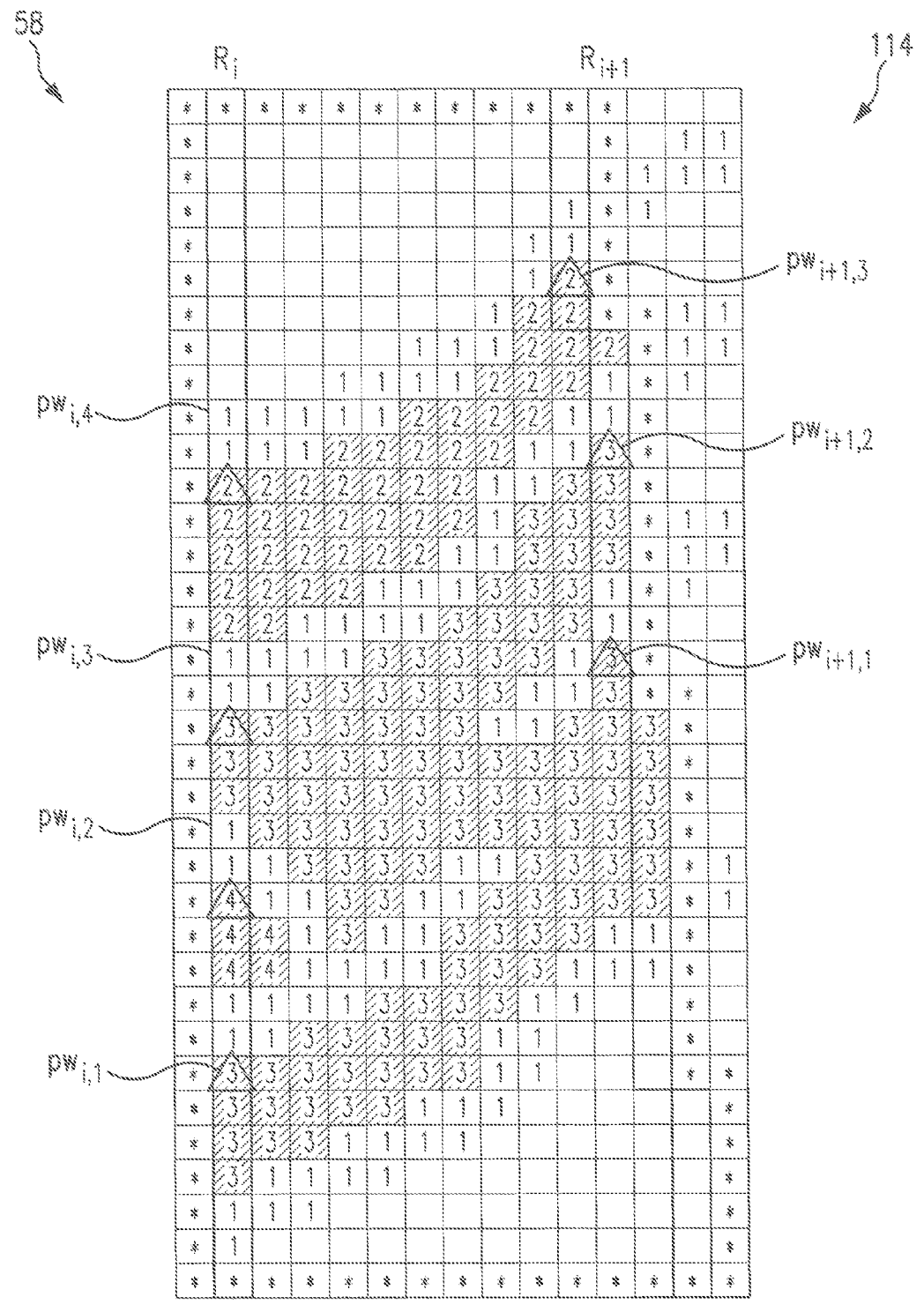

In the subsequent module 114, corresponding to FIG. 18D, the algorithm 55 of fragmentation and labeling sub-routine is applied which was detailed in previous paragraphs in conjunction with FIGS. 13A-13B to label the white components of the incremental bands between two neighboring transects $R_i$ and $R_{i+1}$.

The asterisks represent neither background nor foreground of the IP. Therefore, the fragmentation and labeling of white components of incremental bands situated between $R_i$ and $R_{i+1}$ are carried out only within the asterisk frame shown in FIG. 18D.

Figure 18E:
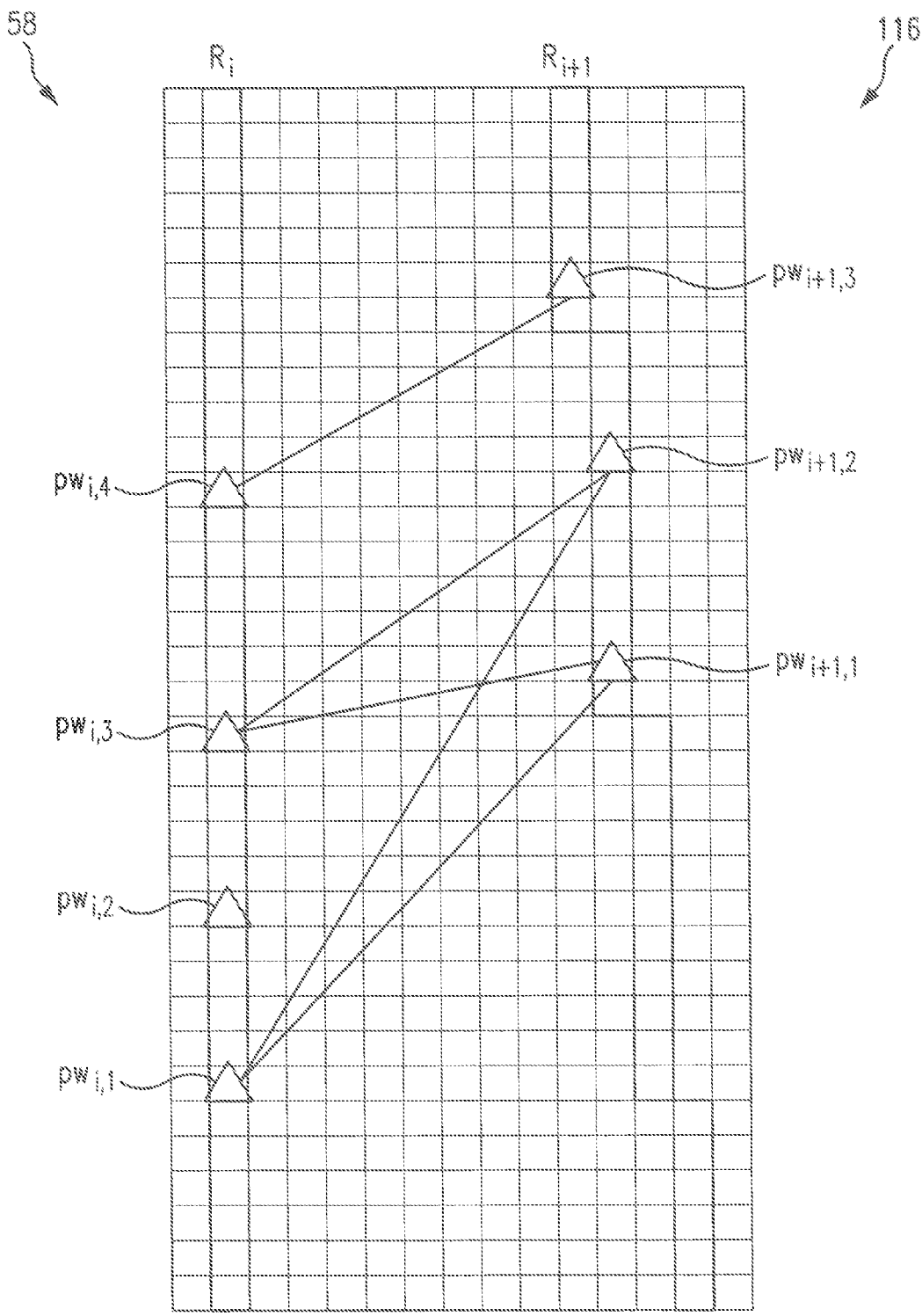

Subsequently, in module 118 corresponding to FIG. 18E, the connectivity between two set of vertices $PW_i=(pw_{i,1}, pw_{i,2}, pw_{i,3}, pw_{i,4})$ and $PW_{i+1}=(pw_{i+1,1}, pw_{i+1,2}, pw_{i+1,3}, pw_{i+1,4})$ of a graph G(n) is calculated. For this purpose, two vertices $pw_{i,j}$ and $pw_{i+1,j}$ are connected by an edge (a line) if $pw_{i,j}$ and $pw_{i+1,j}$ belong to the same fragment.

In order to calculate the n-partite graph G(n) in block 58 of FIG. 11, the layered black and white IP is processed by applying the segmentation/labeling subroutine:

first, within each pair of neighboring transects resulting in the set of bi-partite graph $G_1(2), G_2(2), \ldots, G_{n-1}(2)$, where bi-partite graph $G_j(2)$ and $G_{j+1}(2)$ are situated between neighboring transects $R_j$, $R_{j+1}$ and $R_{j+1}$, $R_{j+2}$ respectively.

Second, neighboring bi-partite graphs $G_1(2), G_2(2), \ldots, G_{n-1}(2)$ are merged into an n-partite graph G(n), based on the common vertex along transects $R_{j+1}$ situated between each pair of neighboring bi-partite graph.

The algorithm iterates through two nearby transects $R_i$ and $R_{i+1}$ where, i=1, . . . , n−1, in order to calculate connectivity between two sets $PW_i$ and $PW_{i+1}$ of vertices, where i=1, . . . , n−1.

Figure 19A:
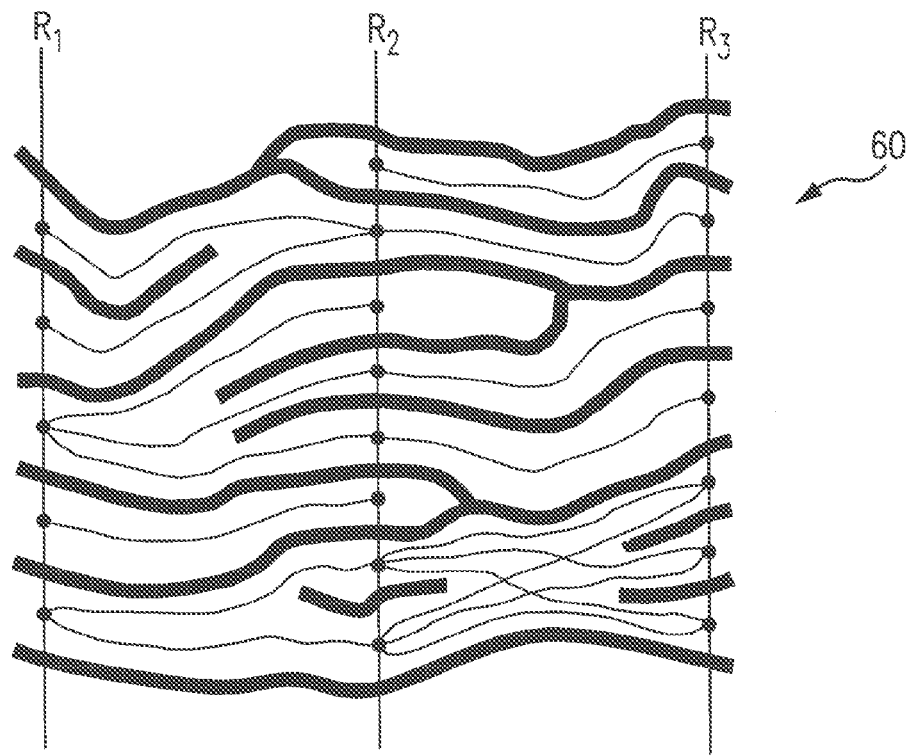
FIGS. 19A-19E illustrate the procedure of the description of structure of incremental bands.
Figure 19B:
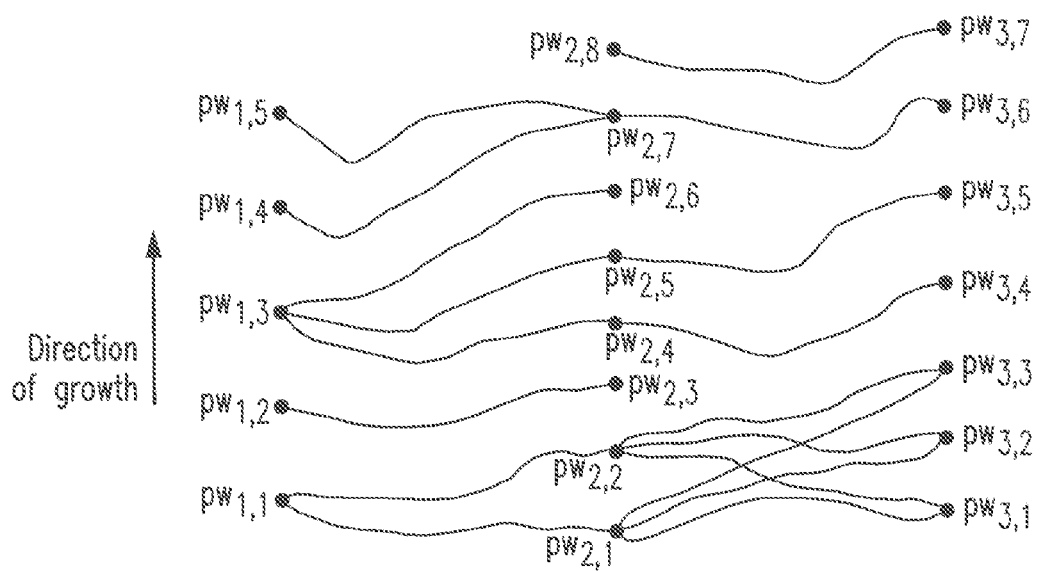
Figure 19C:
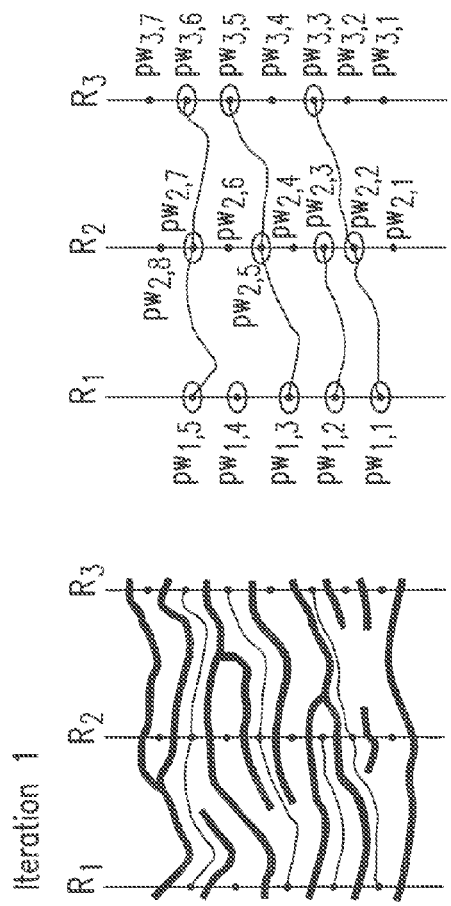
Figure 19C:
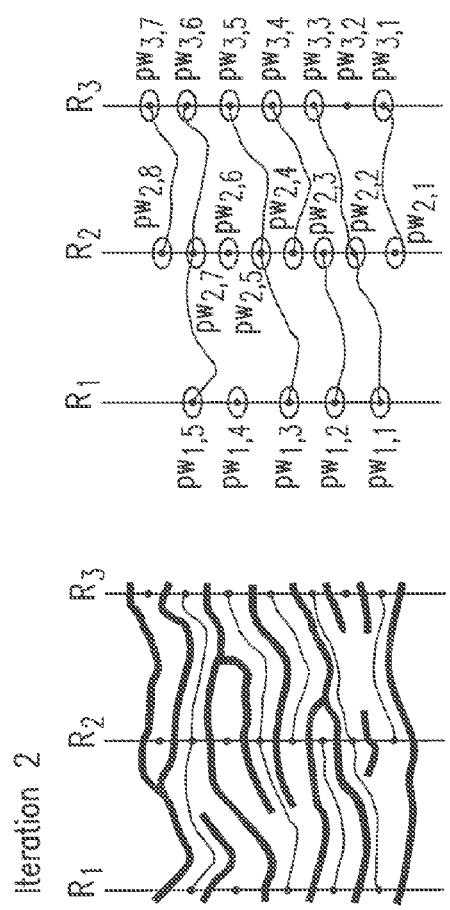
Figure 19D:
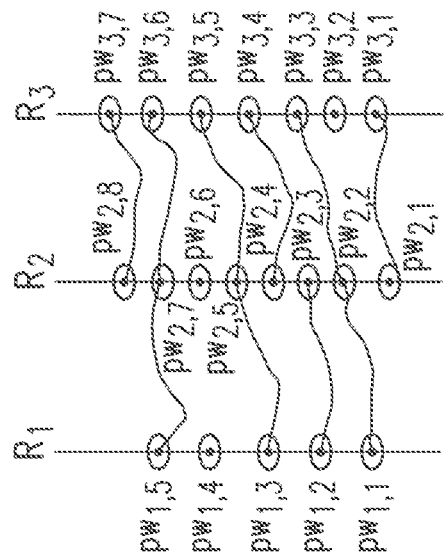
Figure 19D:
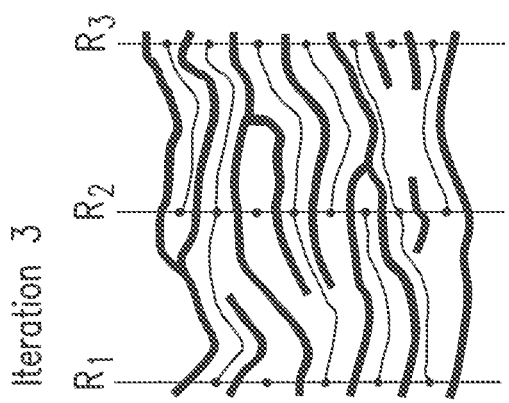

The resulting graph G(n), shown for example in FIGS. 19B-19D, is represented in the memory of the computer system 28 as a set of binary arrays $G_1(2), \ldots, G_{n-1}(2)$, where $G_i(2)$ is the adjacency matrix of a bi-partite graph $G_i(2)$ which describes the structure of the IP between two nearby transects $R_i$ and $R_{i+1}$. In terms of the graph theory, the structure of entire IP is the parallel composition of bi-partite graphs:

$$G(n)=G_1(2)+G_2(2)+\ldots+G_{n-1}(2) \quad (\text{Eq. 27})$$

Returning to FIG. 11, upon completing the routine of block 58, the logic flows to block 59, where an average width $W(m_i)$ and average area $S(m_i)$ of incremental band $m_i$, where i=1, . . . d are calculated based on:

a) the length $L(m_i)$ of $m_i$ (number of vertices that the band uses);

b) the width of incremental bands along transects $R_1, \ldots, R_n$ (FIG. 16E); and c) areas of incremental bands situated between two nearby transects $R_i$ and $R_{i+1}$, where i=1, . . . n−1 (FIG. 17E).

Figures 19E, 20:
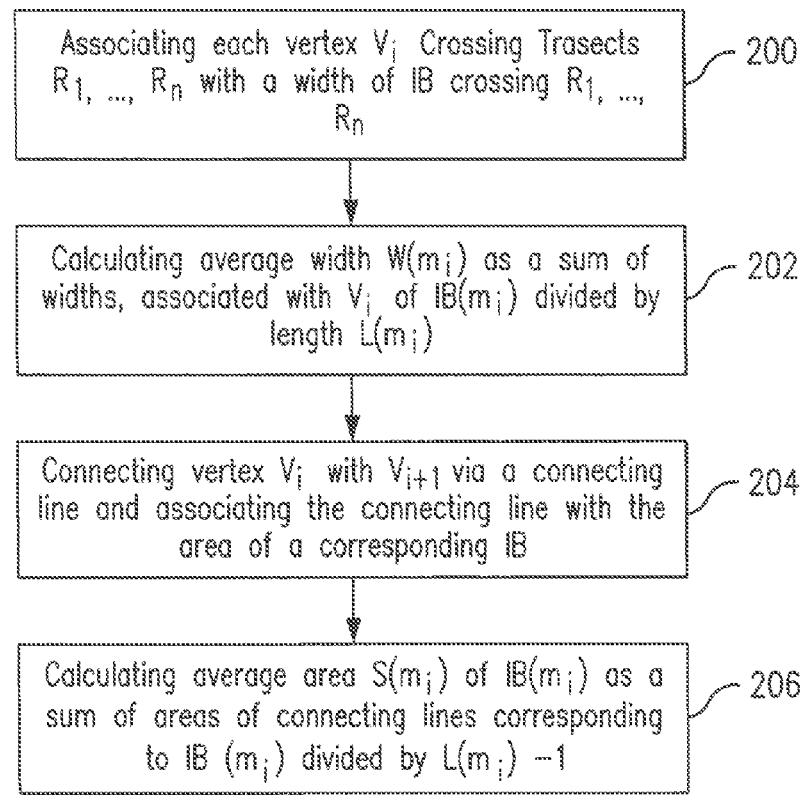
FIG. 20 is a flow-chart diagram of the routine for calculating the average width and average area of incremental bands.

The flow-chart of the sub-routine 59 for calculation of the average width and area of incremental band is presented in FIG. 20. The sub-routine 59 starts in block 200, where each vertex crossing the transects $R_1, \ldots, R_n$ is associated with a corresponding width of an incremental band crossing $R_1, \ldots, R_n$ (FIGS. 16C-16e).

Next, logic flows to block 202 to calculate the average width $W(m_i)$ as a sum of widths associated with the vertices of the band $m_j$ divided by $L(m_i)$.

In the following step 204, the logic associates each line connecting the vertex $V_i$ with vertex $V_{i+1}$ with the area of a corresponding incremental band (FIG. 17E).

In subsequent step 206, the average area $S(m_i)$ of the incremental band $m_i$ is calculated as a sum of areas of lines corresponding to the band $m_j$ divided by $L(m_i)-1$. Notice in FIGS. 19C-19D that a path which consists of one vertex has the area equal to zero.

Figure 21:
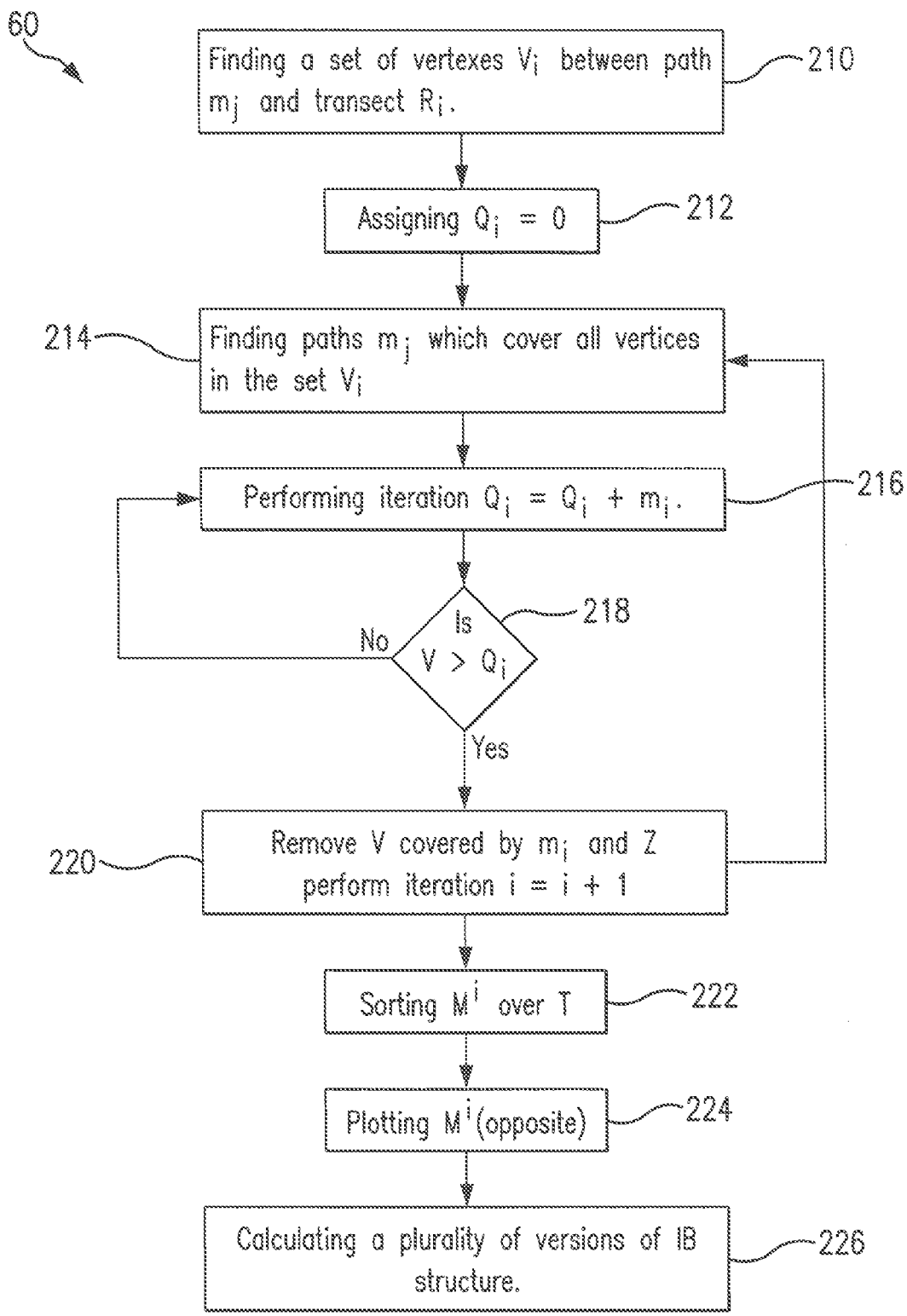
FIG. 21 is a flow-chart diagram of the routine for calculating the structure of incremental bands.

Referring again to FIG. 11, upon completing the averaging of the width and the area of incremental bands in block 59, the logic flows to block 60 to calculate a structure of incremental bands. The procedure of the calculation of one arbitrary version $M^i$ of structure of incremental bands is depicted in FIGS. 19A-19E for an IP shown in FIG. 19A. The routine is presented as a flow-chart diagram in FIG. 21 in terms of finding a set of path (formalized bands) $M^i=\{m_1, \ldots, m_j, \ldots, m_d\}$ in graph G(n) so that $M^i$ covers all vertices V in the graph G(n), i.e., $V=V_1 \ldots \cup V_i \ldots \cup V_n$. In calculations, each point of intersection of an incremental band with a transect $R_i$ is defined as a vertex in a set $V_i$, such that, $V=V1 \ldots \cup V_i \ldots \cup V_n$.

The process of finding the $M^i$ for a graph may be found in (F. Harrary, Graph Theory, Mass, 1969). Because the path $m_i$, or in another words, the incremental band $m_i$, represents a formation of IB at an instant of time $T_i$, it is logical to assume that the $M^i$ consists of paths (formalized bands) which do not have any vertex in common (independent paths), and the paths with no repeated vertexes (simple paths). These assumptions for the features of the paths are used in the process of construction of a version of the incremental band structure $M^i$ which is specified in the following paragraphs through the following pseudo-code:

Step 210. The logic starts with finding a set of vertexes $V_i$.

Step 212. The logic assigns $Q_i=0$, where $Q_i$ is the total number of vertices covered by paths on i iteration.

Step 214. The logic finds paths $m_i$ which cover all vertices of set $V_i$.

Step 216. The logic performs iteration: $Q_i = Q_i + m_i$.

Step 218. If $|V| > Q_i$; then:
  a) Arbitrarily remove from $V_{i+1}, V_{i+2}, \ldots V_n$ vertices covered by $m_i$;
  b) $i = i+1$;
  c) Go to Step 214 to find a set $M^i$ of paths $m_j$ in the Graph G(n).

As shown in FIG. 19B representing the labeled graph of the incremental pattern in question presented in FIG. 19A, the algorithm finds 5 paths which cover all vertices of $V_1$ on the first iteration. The structure of these paths is presented in the Table 3 in FIG. 19C. The 4 uncovered vertices of set $V_2$ includes $pw_{2,1}$, $pw_{2,4}$, $pw_{2,6}$, $pw_{2,8}$ after the first iteration missing from Table 1. Only one vertice $pw_{3,2}$ (missing from Table 4 of FIG. 19C) remains uncovered by sets of paths $M^1$ and $M^2$ after the second iteration. Finally, after the third iteration, ten paths (Table 5 of FIG. 19D) covered all vertices in graph of FIG. 19B.

Step 222. The logic lexicographically sorts partially ordered set $M^i$ (the paths shown in FIGS. 19C-19D) over the time scale T, as shown in FIG. 19E.

Step 224. The logic constructs a plot of the opposite version of IB structure $M^i$ (opposite) as described in (I. Smolyar, et al., "Discrete model of fish scale incremental pattern: a formalization of the 2D anisotropic structure," *ICES J. of Mar. Sc.* 2004, Vol. 61, pp. 992-1003).

Step 226. The logic calculates a set of different versions of incremental bands structure $\mu$; $\mu = \{M^1, M^1(\text{opposite}), \ldots, M^i, M^i(\text{opposite}), \ldots, M^h, M^h(\text{opposite})\}$. The total number of different versions of IB structure $H = 2h$.

The result of using the subject procedure 60 for construction of a version M of the incremental band structure for the IP depicted in FIG. 19A, is presented in FIGS. 19C-19D.

Referring again to FIG. 11, upon calculating the structure of incremental bands in block 60, the logic flows to block 62, where a set $GR_{width}$ of 2D charts "Incremental band width vs. Incremental band number (Time)" are plotted for values of $L(m_i)$ varying from 1 to n, i.e.

$$GR(M^i)_{width} = \{gr_w(1), \ldots, gr_w(j), \ldots gr_w(n)\} \quad \text{(Eq. 28)}$$

for the version $M^i$ of IB structure detailed in previous paragraphs. The flow-chart diagram for the routine performed in block 62 is presented in FIG. 22. In step 230, Charts $gr_w(n)$ and gra(n) are constructed for a set of the incremental bands regardless of their length. The chart grw(n−1) is constructed for a set of all incremental bands, except for incremental bands which cross only one transect. The chart $gr_w(1)$ is constructed only for a set of the incremental bands crossing all transects.

The greater the value of $L(m_i)$, the higher is the confidence that $W(m_i)$ is a measure of the growth rate of the incremental pattern at a time point $T_i$ rather than a source of "noise" caused by the structural anisotropy. A lower value of parameter $L(m_i)$ reflects a higher anisotropy and, consequently, a lower confidence in the description of the variability of size of IP across the 2-D plane.

Figures 22, 23A:
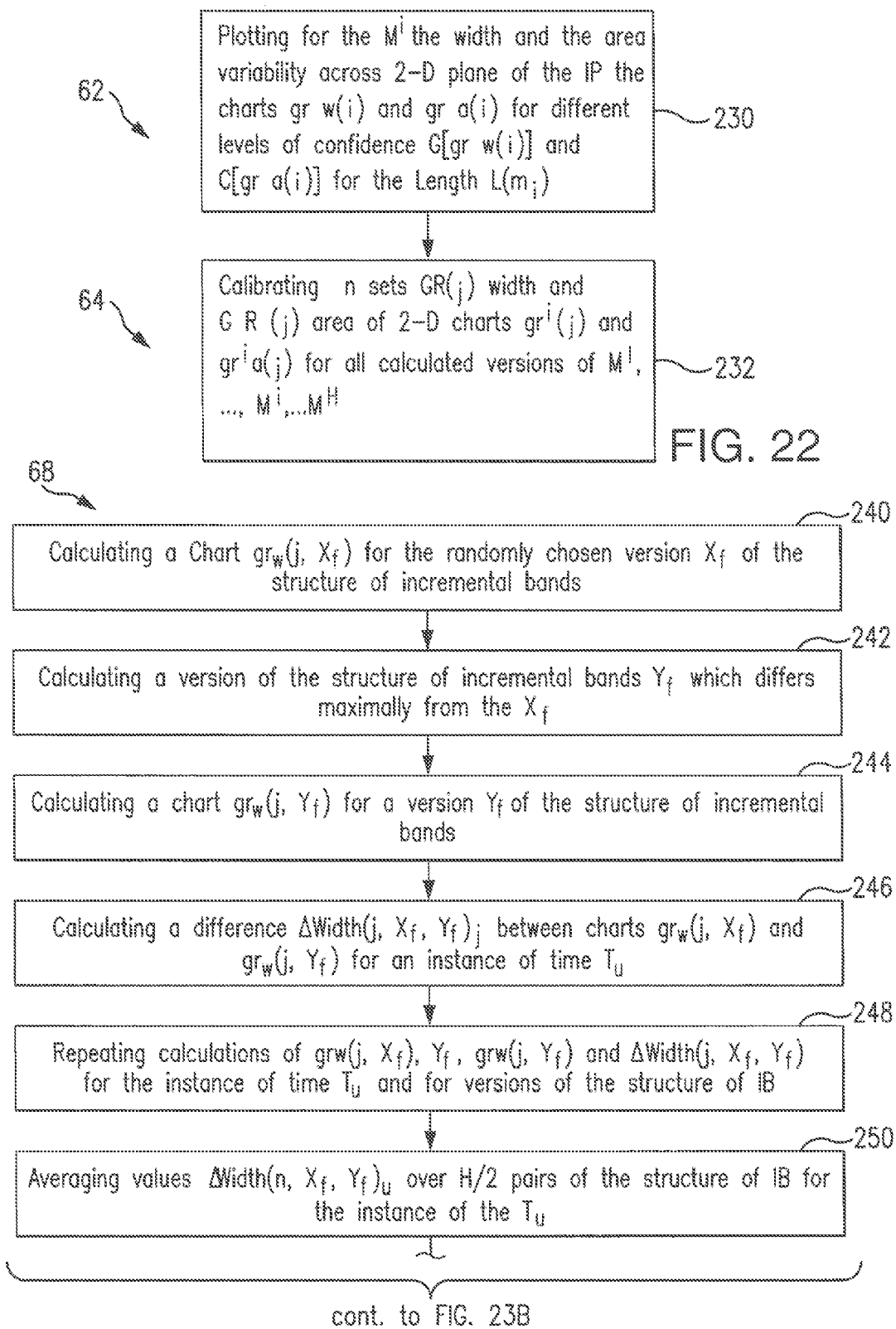
FIG. 22 is a flow-chart diagram of the routine for plotting charts "Width of IB vs. Time" and "Area of IB vs. Time"
FIG. 23A-23C represent a flow-chart diagram of the routine for calculating the index of structural anisotropy of the IP under study.

The charts $gr_w(1), \ldots, gr_w(i), \ldots gr_w(n)$ plotted in step 230 of FIG. 22 describe the variability of IB width across 2-D plane of the IP under study with different levels of confidence. The level of confidence $C[gr_w(i)]$ of the chart $gr_w(i)$ is equal to the ratio of areas of IB used for plotting $gr_w(i)$ to the sampling area of the incremental pattern. Parameter $C[gr_w(i)]$ varies in the range between "zero" to "1". The charts $gr_a(i)$ are plotted in the way similar to $gr_w(i)$.

If $C[gr_w(i)] = 0.9$, it means that the chart $gr_w(i)$ takes into account 90% of the sampling area. Only the chart $gr_w(n)$ has $C[gr_w(i)] = 1$, since this chart takes into account all IBs irrespective of their lengths, and thus has a maximal level of noise.

Charts $GR(M^i)$ are constructed the way similar to $GR(M^i)_{width}$, where the algorithm operates in the bands' area domain found in blocks 58 and 59 instead of the bands' width domain. A parameter $C[gr_a(i)]$ is calculated in the way similar to $C[gr_w(i)]$.

In step 232, n sets of $GR(j)_{width}$ and $GR(j)_{area}$ of 2-D charts are formed. The set $GR(j)_{width}$ consists of 2-D charts $gr^i(j)_{width}$ which are plotted for all calculated versions of IB structure $M^1, \ldots, M^i, \ldots, M^H$, where transects with a length less or equal j are taken into account. Because the length of IB varies from 1 to n, the total number of sets of $GR(j)_{width}$ is n. The sets of $GR(j)_{area}$ are formed similarly to $GR(j)_{width}$ construction.

Upon completing the process of plotting charts in block 62 of FIG. 11, logic flows to block 64 where sets of $GR(j)_{width}$ and $GR(j)_{area}$ are either calculated or used from step 232 of FIG. 22. Subsequently, charts $gr^1(j)_{width}, \ldots, gr^i(j)_{width}, \ldots, gr^H(j)_{width}$, are time averaged resulting in a chart AverageGR $(j)_{width}$.

Since noise contributes to the graph AverageGR$(j)_{width}$ in a probabilistic manner, i.e., the net signal of growth rate contributes to the AverageGR$(j)_{width}$ in the same direction, the noise may be substantially reduced in block 64 of FIG. 11 by applying a square root procedure to a number of different versions of the incremental bands structure, resulting in signal-to-noise ratio increase. (Wim van Drongelen "Signal Processing for Neuroscientists: An Introduction to the Analysis of Physiological Signals", 2008, Academic Press, 308p.)

Subsequently, the procedure of plotting AverageGR$(j)_{width}$ is iterated for j=1 to n.

The procedure of calculating the chart AverageGR$(j)_{area}$ is similar to the calculation of AverageGR$(j)_{width}$, except operating in the area domain instead of the width domain.

Returning to FIG. 11, the index of adequacy IA of the model of IP is calculated in block 66 as $$IA = S[gr_{area}(n)]/S(IP), \quad \text{(Eq. 29)}$$

where $S[gr_{area}(n)]$ is the sum of areas of incremental bands comprising chart $gr_{area}(n)$, and S(IP) is the area of an incremental pattern situated between a first $(R_1)$ and a last $(R_n)$ transects. The extent to which the model of an incremental pattern $M = \{G(n), F_{m,n}\}$ is representative of the initial image depends upon the number (i.e. sampling density) of transects $R_j$. With a low number of transects, an insufficient amount of image details will be sampled for construction of the model of the incremental structures under study, thus rendering that $IA \ll 1$.

At a larger number of transects, i.e., when $n \to \infty$, the model $M = \{G(n), F_{m,n}\}$ attains the complete representation of the processed image, with the $S[gr_a(n)] \to S(IP)$, and $IA \to 1$.

Figure 23B:
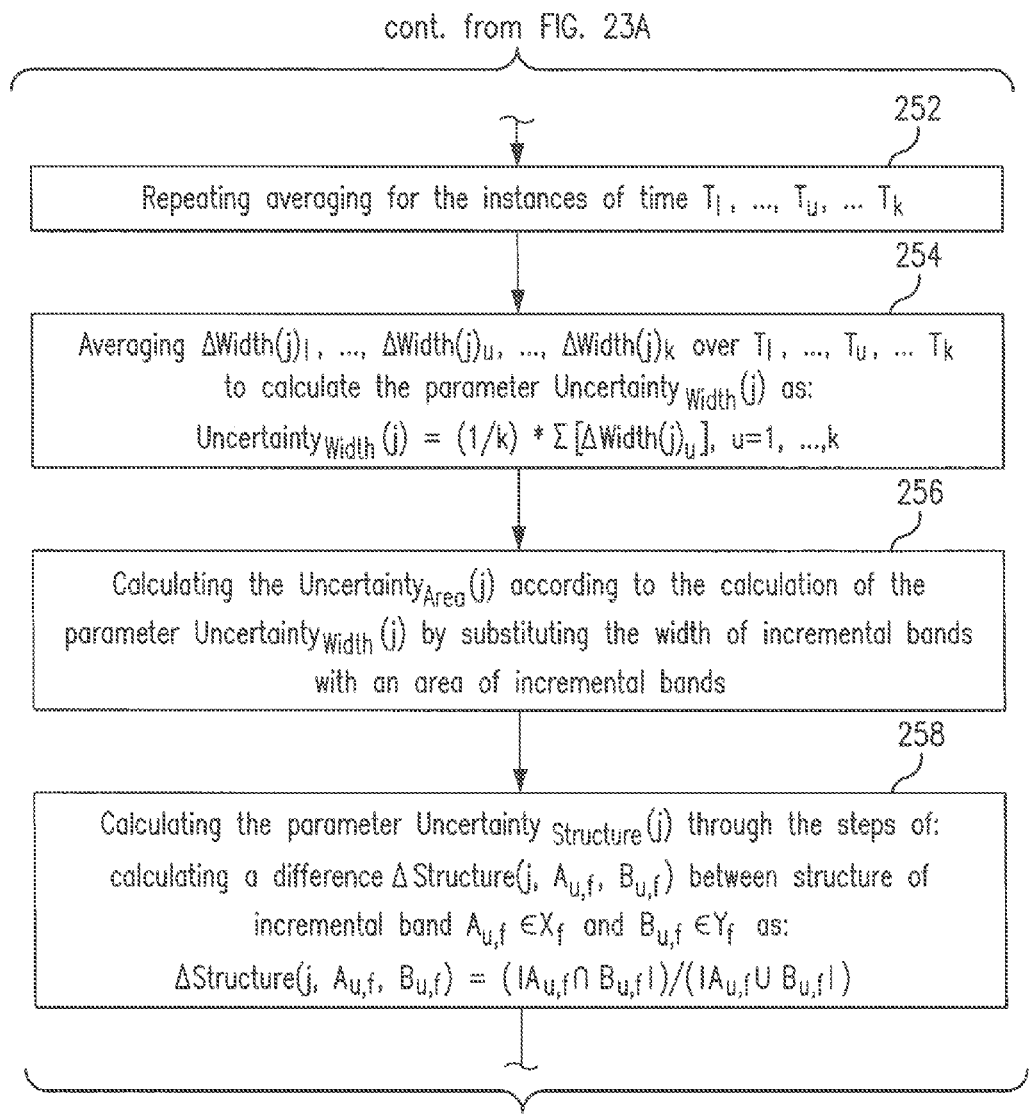
Figure 23C:
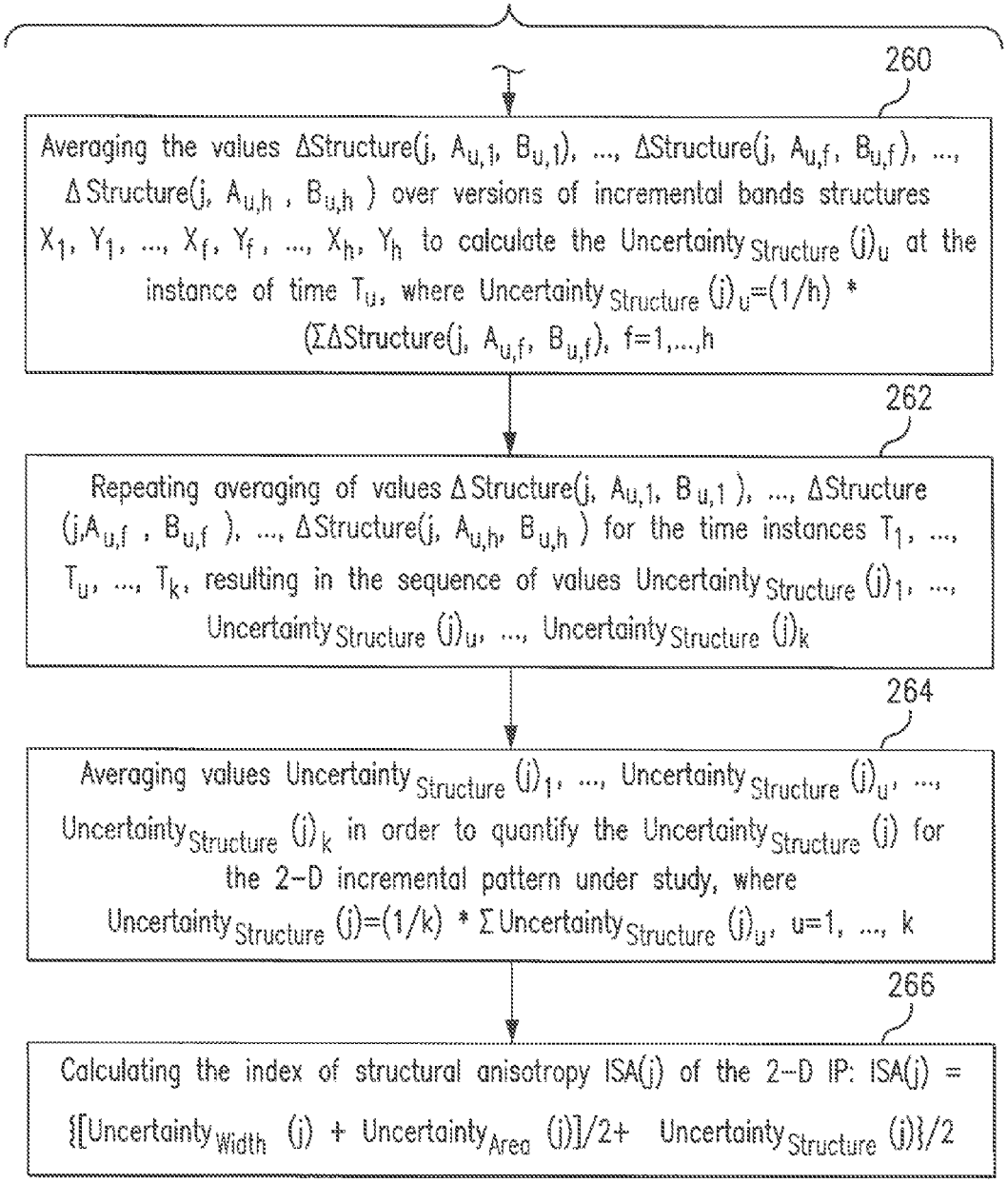

Referring again to FIG. 11, the logic calculates an index of structural anisotropy in block 68 in accordance with the flow-chart diagram presented in FIGS. 23A-23C.

The anisotropy of the IP is the source of uncertainty in its quantitative description, because different segments of the IP have different configurations of incremental bands, i.e. shape, width and area of incremental bands, the anisotropy of the IP may contribute to the uncertainty of:

a) quantification of variability of the width of incremental bands in the 2-D plane over a period of time (parameter Uncertainty$_{Width}(j)$);

b) quantification of variability of the area of incremental bands across the 2-D plane over a period of time (parameter Uncertainty$_{Area}$(j)); and c) correspondence between points on the axis "IB number" of the chart "IB width/area. vs. Time" and location, or, in other words, the structure of IB of the 2-D incremental pattern (parameter Uncertainty$_{Structure}$(j)).

Thus, the index of structural anisotropy (ISA) of the IP includes three elements:

$$ISA(j) = \{Uncertainty_{Width}(j), Uncertainty_{Area}(j), Uncertainty_{Structure}(j)\} \quad (Eq.~30)$$

In block 68 of FIG. 11, the logic calculates the index of anisotropy (USA) of the IP under study in accordance with the flow-chart diagram presented in FIGS. 23A-23C.

The procedure of calculation of the ISA(j) is based on the fact that each point on the axis "Time" of the charts AverageGR(j)$_{width}$, and AverageGR(j)$_{area}$ is the union of H different versions of the structure of incremental bands. Charts AverageGR(j)$_{Width}$, AverageGR(j)$_{Area}$ take into account incremental bands crossing 1 transect, two transects, ..., j transects, j=1, ..., n.

The routine of the calculation of the Uncertainty$_{Width}$(j) includes the following steps:

Step 240. Chart gr$_w$(j, X$_f$) is calculated for the randomly chosen version X$_f$ of the structure of incremental bands. Chart gr$_w$(j, X$_f$) takes into account incremental bands crossing one transect, two transects, ..., j transects, j=1, ..., n. Set X$_f$ consists of incremental bands A$_{1,f}$ ... A$_{u,f}$ ..., A$_{k,f}$; X$_f$={A$_{1,f}$ ... A$_{u,f}$, ..., A$_{k,f}$}.

Step 242. Version of the structure of incremental bands Y$_f$ is calculated which differs maximally from X$_f$ through the technique which may be found in (I. Smolyar, et al., "Discrete model of fish scale incremental pattern: a formalization of the 2D anisotropic structure," *ICES J. of Mar. Sc.* 2004, Vol. 61, pp. 992-1003). The Y$_f$ is calculated based on the description of the structure of the IP under study in terms of the relay network (presented in previous paragraphs in conjunction with FIGS. 7A-7C). Set Y$_f$ consists of incremental bands B$_{1,f}$ ... B$_{u,f}$, ..., B$_{k,f}$; Y$_f$={B$_{1,f}$ ... B$_{u,f}$, ..., B$_{k,f}$}.

Step 244. Chart gr$_w$(j, Y$_f$) is calculated for the version Y$_f$ of the structure of incremental bands.

Step 246. The difference ΔWidth(j, X$_f$, Y$_f$)$_j$ between charts gr$_w$(j, X$_f$) and gr$_w$(j, Y$_f$) is calculated for an instance of time T$_u$, where u=1, ..., k.

$$\Delta Width(j, X_f, Y_f)_u = |Width(j, X_f)_u - Width(j, Y_f)_u|/B \quad (Eq.~31)$$

where Width(j, X$_f$)$_u$ is the width of the IB at the instance of time T$_u$ for the versions X$_f$ of the structure of IB;
Width(j, Y$_f$)$_u$ is the width of the IB at the instance of time T$_u$ for the versions Y$_f$ of the structure of IB; and $$B = \max[Width(j, X_f)_u, Width(j, Y_f)_u)]. \quad (Eq.~32)$$

Step 248. Steps 1-4 are repeated for the instance of time T$_u$ and for versions of the structure of IB X$_1$, Y$_1$, ..., X$_f$, Y$_f$, ..., X$_h$, Y$_h$, resulting in the sequence of values ΔWidth(j, X$_1$, Y$_1$)$_u$, ..., ΔWidth(j, X$_f$, Y$_f$)$_u$, ..., ΔWidth(j, X$_h$, Y$_h$)$_u$.

Step 250. Values ΔWidth(n, X$_f$, Y$_f$)$_u$ are averaged over H/2 pairs of the structure of IB for the instance of time T$_u$.

$$\Delta Width(j)_u = (1/h) * \Sigma \Delta Width(j, X_f, Y_f)_u, f=1, \ldots, h \quad (Eq.~33)$$

where ΔWidth(j)$_u$ is the variability of the width of incremental band at the instance of time T$_u$ due to the structural anisotropy of the incremental pattern under study. The ΔWidth(j)$_u$ takes into account incremental bands crossed one transects, two transects, ..., j transects.

Step 252. Step 6 is repeated for the instances of time T$_1$, ..., T$_u$, ... T$_k$ resulting in the sequence of values ΔWidth(j)$_1$, ..., ΔWidth(j)$_u$, ..., ΔWidth(j)$_k$.

Step 254. ΔWidth(j)$_1$, ..., ΔWidth(j)$_u$, ..., ΔWidth(j)$_k$ over T$_1$, ..., T$_u$, ... T$_k$ are averaged in order to calculate the parameter Uncertainty$_{width}$(j):

$$Uncertainty_{Width}(j) = (1/k) * \Sigma[\Delta Width(j)_u], u=1, \ldots, k \quad (Eq.~34)$$

Step 256. Algorithm of the calculation of Uncertainty$_{Area}$(j) is similar to the calculation of the parameter Uncertainty$_{width}$(j) if the width of incremental bands is substituted with an area of incremental bands.

The Uncertainty$_{Width}$(j) and Uncertainty$_{Area}$(j) can vary from 0 to 1. If the Uncertainty$_{Width}$(j)=Uncertainty$_{Area}$(j)=0, then IP is the isotropic object, i.e. patterns of the variability of the width and the area of the 2-D incremental bands over a period of time T$_1$, ..., T$_k$ is not the function of the direction of measurements of width and areas of incremental bands. The values of Uncertainty$_{Width}$(j) and Uncertainty$_{Area}$(j) close to 1 indicate the opposite case, i.e., the highest level of anisotropy of an incremental pattern.

The algorithm for calculation of the parameter Uncertainty$_{Structure}$(j) comprises the following steps:

Step 258. Difference ΔStructure(j, A$_{u,f}$, B$_{u,f}$) between structure of incremental band A$_{u,f}$∈X$_f$ and B$_{u,f}$∈Y$_f$ is calculated, in accordance with:

$$\Delta Structure(j, A_{u,f}, B_{u,f}) = (|A_{u,f} \cap B_{u,f}|)/(|A_{u,f} \cup B_{u,f}|) \quad (Eq.~35)$$

If A$_{u,f}$ is identical to B$_{u,f}$, then $$|A_{u,f} \cap B_{u,f}| = |A_{u,f} \cup B_{u,f}| \quad (Eq.~36)$$

and $$\Delta Structure(j, A_{u,f}, B_{u,f}) = 1. \quad (Eq.~37)$$

Which means that at the instant of time T$_u$, the incremental pattern is the isotropic object, if only two versions of incremental bands structure A$_{u,f}$ and B$_{u,f}$ are taken into account. If, however, A$_{u,f}$∩B$_{u,f}$=∅, then $$\Delta Structure(j, A_{u,f}, B_{u,f}) = 0. \quad (Eq.~38)$$

Which means that the level of anisotropy of the incremental pattern under study is maximal at the time T$_u$ if only two versions of incremental bands structure A$_{u,f}$ and B$_{u,f}$ are taken into account.

Step 258 is repeated for the version of incremental bands X$_1$, Y$_1$, ..., X$_f$, Y$_f$, ..., X$_h$, Y$_h$, resulting in the sequence of values: ΔStructure(j, A$_{u,1}$, B$_{u,1}$), ..., ΔStructure(j, A$_{u,f}$, B$_{u,f}$), ..., ΔStructure(j, A$_{u,h}$, B$_{u,h}$).

Step 260. Values ΔStructure(j, A$_{u,1}$, B$_{u,1}$), ..., ΔStructure(j, A$_{u,f}$, B$_{u,f}$), ..., ΔStructure(j, A$_{u,h}$, B$_{u,h}$) are averaged over versions of incremental bands structures X$_1$, Y$_1$, ..., X$_f$, Y$_f$, ..., X$_h$, Y$_h$ in order to calculate the Uncertainty$_{Structure}$(j)$_u$ at the time T$_u$.

$$Uncertainty_{Structure}(j)_u = (1/h) * (\Sigma \Delta Structure(j, A_{u,f}, B_{u,f}), f=1, \ldots, h \quad (Eq.~39)$$

Step 262. Step 260 is repeated for the times T$_1$, ..., T$_u$, T$_k$ resulting in the sequence of values Uncertainty$_{Structure}$(j)$_1$, ..., Uncertainty$_{Structure}$(j)$_u$, ..., Uncertainty$_{Structure}$(j)$_k$.

Step 264. Values Uncertainty$_{Structure}$(j)$_1$, ..., Uncertainty$_{Structure}$(j)$_u$, ..., Uncertainty$_{Structure}$(j)$_k$ are averaged in order to quantify the Uncertainty$_{Structure}$(j) for the 2-D incremental pattern under study.

$$Uncertainty_{Structure}(j)(1/k) * \Sigma Uncertainty_{Structure}(j)_u, u=1, \ldots, k \quad (Eq.~40)$$

The area of the variability of variability $$\text{Uncertainty}_{Structure}(j) \text{ is } [0.1]. \quad \text{(Eq. 41)}$$

If the Uncertainty$_{Structure}$(j)=0, then the IP is the object with structural isotropy. The Uncertainty$_{Structure}$(j)=1 indicates the highest level of variability of the structure of incremental bands in different direction.

Step 266. Index of structural anisotropy ISA(j) of the 2-D incremental pattern under study is calculated:

$$ISA(j) = \{[\text{Uncertainty}_{Width}(j) + \text{Uncertainty}_{Area}(j)]/2 + \text{Uncertainty}_{Structure}(j)\}/2. \quad \text{(Eq. 42)}$$

Parameter ISA(j) is calculated for j=n. In this case all incremental bands irrespective of their length are taken into account.

An example of parameterization for a satellite image of a geological IP (Martian layered landscape) is presented in FIGS. 24A-24D. The initial IP 130 is converted into black and white patterns 132 shown in FIG. 24A.

Figure 24A:
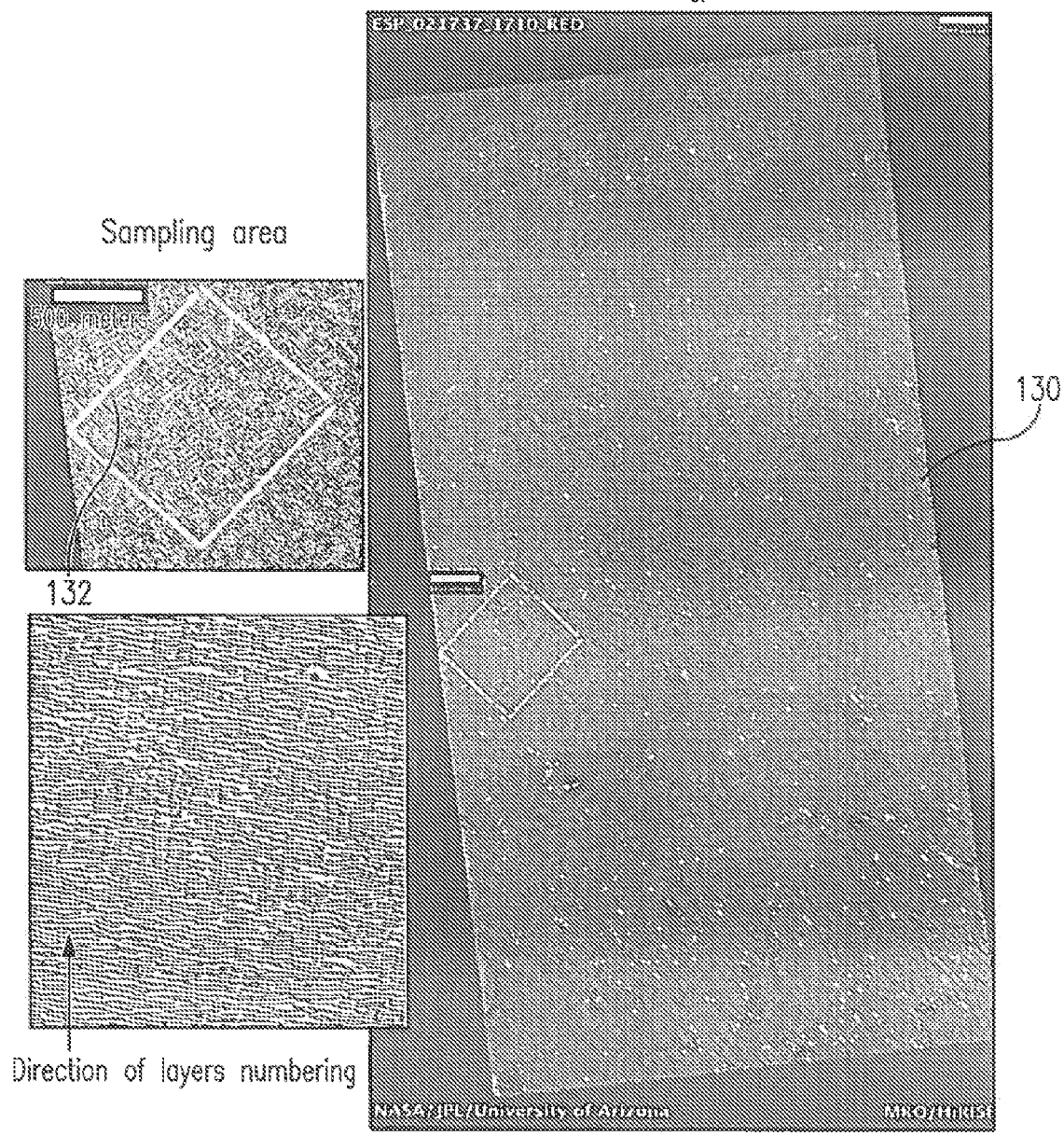
Figure 24B:
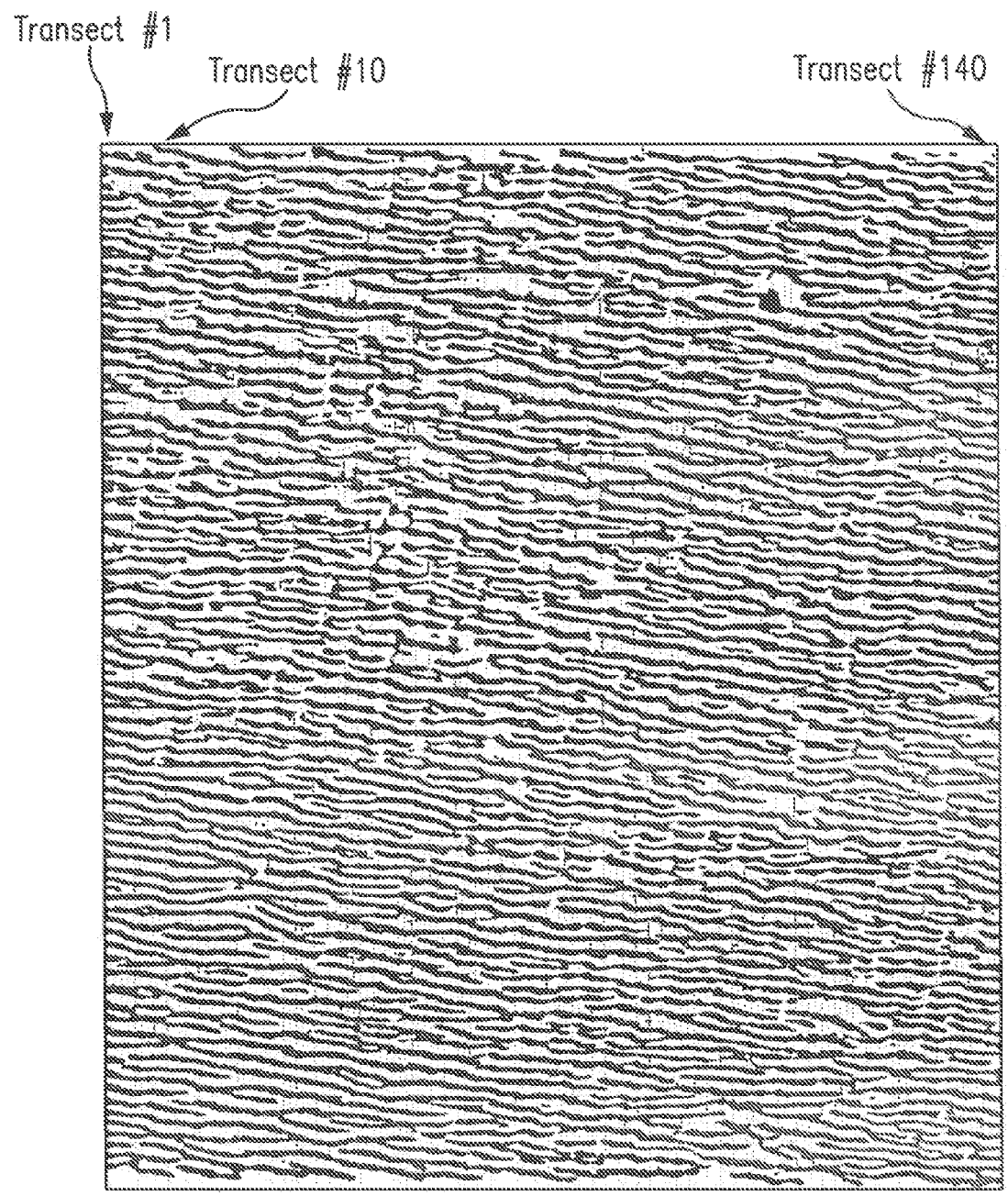
Figure 24D:
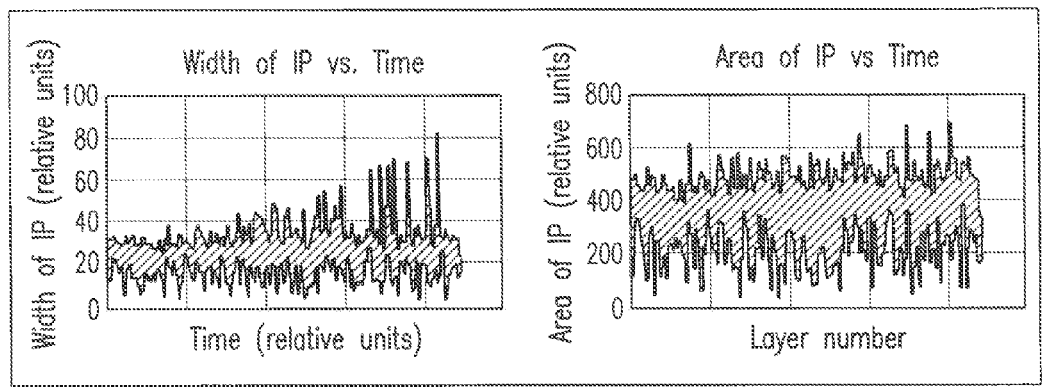
Figure 24D:
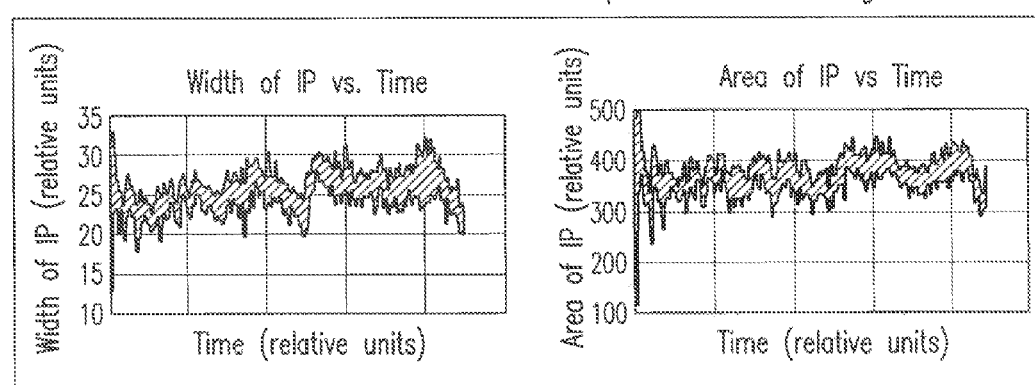
Figure 24D:
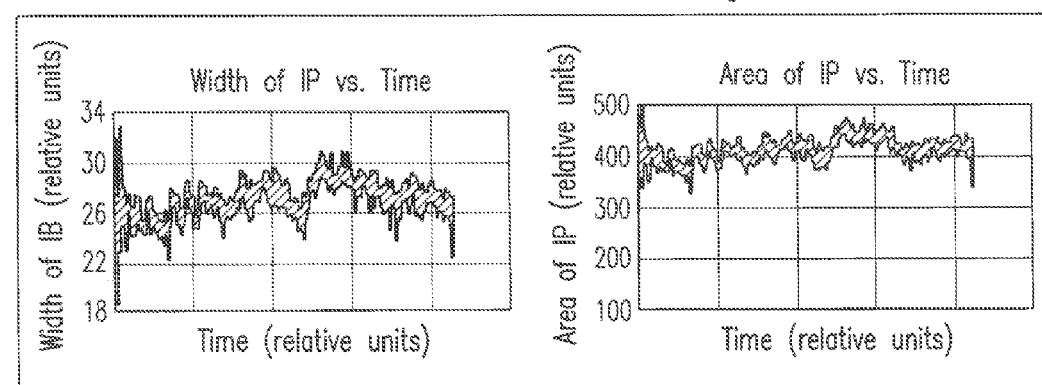

As shown in FIG. 24B, 140 transects are applied to the IP under study for the measurements of the IB's width and area, and for converting the structure of IP under study into a n-partite graph G(n).

Results of calculation of the variability of the width vs. layer number averaged over different versions of the IB structure are presented in FIG. 24C. The results of calculation of the variability of the width and the area of IB across 2-D plane are depicted on FIG. 24D for the different versions of signal to noise ratio and length of IB used for the calculation of charts AverageGR(j)$_{Width}$, AverageGR(j)$_{Area}$. The charts shown in FIG. 24D permit determination of the rhythms in the variability of width and area of layers across the 2-D geological landscape under study never observed before.

The present method and system attain preciseness and efficacy of parameterization of IPs found in a broad spectrum of layered patterns categories through processing techniques never used for these purposes, including:

considering area of IBs one of major features of the IPs, and calculating the IBs area, in addition to the width of IBs, as a participating factor of the IP model construction;

segmentation/labeling sub-routine applied to conversion of the black and white IP image into n-partite graph G(n);

correction of the width of IBs if a transect is not perpendicular to the crossing IB;

calculation of the model adequacy;

calculation of the IP's anisotropy as a combination of two variables: (a) Index of anisotropy of the IB size, and (b) Index of anisotropy of the IB structure;

noise reduction through filtering of black and white IP image in the CSV format;

noise reduction in the charts "IB width vs. IB (or Time) through:

(a) averaging different versions of IB structure, and (b) removing IBs with a length below a threshold. The threshold is set up in the way which allows to attain the index of model adequacy of 0.9 or above.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is claimed is:

1. A method for parameterization of incremental patterns, comprising the steps of:

configuring a computer system to perform parameterization of incremental patterns, and entering an image of a 2-D incremental pattern (IP) under study into said computer system;

(a) processing, in said computer system, said image of the IP under study to acquire a binary initial image of an incremental pattern under study in a predetermined format, said incremental pattern (IP) under study containing growth incremental bands (IB) and secondary lines, wherein said binary initial image is formed with a plurality of first cells and a plurality of second cells, said first cells forming a front of at least one of said incremental bands;

(b) filtering, in said computer system, said binary initial image to remove said secondary lines therefrom, thereby forming a filtered initial binary image of said incremental pattern under study;

(c) plotting, in said computer system, a plurality of transects onto said filtered initial binary image, each of said plurality of transects extending from a respective initial point towards the periphery of said filtered initial binary image in crossing relationship with at least one of said incremental bands at a specific angle ($\alpha_j$) said each transect being formed by a plurality of third cells on said filtered initial binary image;

(d) applying, through said computer systems, a segmentation and labeling procedure to said filtered initial binary image to convert said filtered initial binary image into an n-partite graph G(n) describing an anisotropic structure of said incremental pattern under study in a 2-D domain, wherein said segmentation and labeling procedure is applied between neighboring transects in each pair thereof, resulting in a set of bi-partite graphs $G_1(2)$, $G_2(2), \ldots, G_{n-1}(2)$, where bi-partite graphs $G_j(2)$ and $G_{j+1}(2)$ of said set of bi-partite graphs are situated between neighboring transects $R_j$, $R_{j+1}$ and $R_{j+1}$, $R_{j+2}$ respectively, and wherein said neighboring bi-partite graphs $G_1(2)$, $G_2(2), \ldots, G_{n-1}(2)$ are merged into said n-partite graph G(n) based on the common vertex along said transects $R_{j+1}$ situated between each pair of neighboring bi-partite graphs;

(e) constructing, in said computer system, a 2-D model of said incremental pattern under study through the steps of:

calculating a width of each of said incremental band along each of said plurality of transects across the 2-D plane of said incremental pattern under study, calculating said angle $\alpha_j$ between said crossed each transect and said each incremental band, and adjusting said width, if said angle differs from 90°, calculating an area of said each incremental band contained between neighboring transects of said plurality thereof across the 2-D plane of said incremental pattern under study based on the equal distance (in pixels) between all pairs of the neighboring transects across said 2-D plane of said IP under study, and processing said n-partite graph G(n) to reduce noise in the width and area of said incremental bands calculated across the 2-D plane of said incremental pattern under study;

(f) calculating, in said computer system, an average width and average area of incremental bands based on said width and area of said as each incremental band;

(g) calculating, in said computer system, a structure of incremental bands; and outputting results of calculation at an output of said computer system.

2. The method of claim 1, further comprising the steps of:
in said step (a), acquiring said binary initial image of said incremental pattern in a pixel format, and
in said steps (b), (c) and (d), processing said binary images of said incremental pattern under study in the pixel format thereof, wherein said first cells are black pixels, said second sells are white pixels, and said third cells are gray pixels.

3. The method of claim 2, further comprising the steps of:
in said step (a), converting said binary initial image from said pixel format into the CSV (Comma_Separated Values) format, and in said steps (a), (b), and (c), processing said binary images in either of said pixel and CSV formats,
wherein said first cells are assigned the value of "1", said second sells are assigned the value of "zero", and said third cells are assigned the same value from values ranging between "1" and "255".

4. The method of claim 1, further comprising the steps of:
in said step (b), applying said segmentation and labeling procedure to said binary initial image of said incremental pattern under study to defragment said binary initial image into a plurality of segments, wherein each of said plurality of segments includes a first number of said first cells formed substantially at the same time $T_i$,
(j) assigning an identical label to all first cells in each of said plurality of segments, and
(k) calculating the size of each said segment in said plurality thereof.

5. The method of claim 4, further comprising the steps of:
after said step (k), removing at least one segment from said plurality thereof formed by said first cells, if in said at least one segment said first number of said first cells is below a predetermined first threshold.

6. The method of claim 4, further comprising the steps of:
after said step (k), removing at least one segment formed by said first cells, if a second number of said second cells contained inside said at least one segment, is below a predetermined second threshold.

7. The method of claim 1, further comprising the steps of:
after said step (g), plotting charts "Width of IB vs. Time" and "Area of IB vs. Time" for different levels of noise.

8. The method of claim 7, further comprising the steps of:
after reduction of the noise in said charts "width of IB vs. Time" and "area of IB vs. Time",
calculating an index of adequacy of the model of said incremental pattern under study and an index of structural anisotropy of said incremental pattern under study.

9. The method of claim 8, further comprising the steps of:
reducing noise in said charts "Width of IB vs. Time" and "Area of IB vs. Time" by calculating in said step (g) and averaging different versions of said structure of incremental bands, and by removing incremental bands having a length below a threshold, wherein said threshold is selected to permit attaining the index of adequacy of 0.9 and above.

10. The method of claim 6, further comprising the steps of:
in said step (e), calculating said width of said each incremental band based on said initial binary IP image and said initial binary IP image with the added transects in said CSV format through the steps of:
(l) calculating XY coordinates of said third cells of said plurality of transects $R_1, \ldots, R_i, \ldots, R_n$ based on said initial binary IP under study in the CSV format thereof with transects added in said step (c),
calculating XY coordinates of said third cells of a transect $R_i$, where $i=1, \ldots, n$, and
calculating, for each said transect $R_i$, $$Y_i = A_i * X_i + B_i,$$

where $A_i$ and $B_i$ are the upper and the lower points of said transect $R_i$ on said initial binary IP in the CSV format;
(m) calculating XY coordinates of intersections points $P_i$, $P_{i+1}$ of a forming front of each incremental band with said transect $R_i$, where $i=1$, and
calculating a width of each incremental band along said transect $R_i$ based on a distance between neighboring intersection points $P_{i,q}$ and $P_{i,q+1}$;
(n) calculating connectivity between points $P_{i,q}$ and $P_{i+1,m}$ in the same segment, and
constructing an approximation of a forming front of said each incremental band extending between neighboring transects $R_i$ and $R_{i+1}$; and
(o) calculating a set L of connectivity lines between said points $P_{i,q}R_i$ and $P_{i+1,m}R_{i+1}$ based on said connectivity calculated between sets of points $P_i$ and $P_{i+1}$,
calculating said angle $\alpha_j$ between neighboring lines of said set L of lines, and
calculating the width of an incremental band $IB_j$ based on a width of the incremental band $IB_j$ along said transect $R_i$ and said angle $\alpha_j$.

11. The method of claim 10, further comprising the steps of:
in said steps (l), (m), (n), and (o), applying said segmentation/labeling procedure.

12. The method of claim 11, further comprising the steps of:
in said step (e), calculating said area of said each growth incremental band through the steps of:
(p) calculating XY coordinates of points $h_{i,j}$ of intersections of incremental bands $IB_j$ with transects $R_i$, wherein said $h_{i,j}$ includes a fragment $Pb_{i,j}$;
(q) outlining an area of the incremental pattern between neighboring transects $R_i$ and $R_{i+1}$, where $i=1, \ldots, n-1$;
(r) segmenting and labeling the forming fronts extending between said neighboring transects $R_i$ and $R_{i+1}$, where said first cells constitute a foreground of said incremental pattern, and said second cells constitute a background of said incremental pattern,
assigning a fragment number $k(pb_{i,j})$ to cells of the forming fronts of the incremental bands,
calculating a number of incremental bands $u(pb_{i,j})$ with the same fragment number $k(pb_{i,j})$,
calculating a number of cells $q(pb_{i,j})$ consisting of the fragment $pb_{i,j}$, and
calculating an area of the forming front $S(pb_{i,j})$;
(s) repeating said step (r) for said fragmenting and labeling routine when said first cells constitute a background of said incremental pattern, and said second cells constitute a foreground of said incremental pattern, and
calculating an area of the forming front $S(pw_{i,j})$; and
(t) calculating an area $S(h_{i,j})$ of the incremental band as $S(h_{i,j}) = S(pb_{i,j}) + S(pw_{i,j})$.

13. The method of claim 12, further comprising the steps of:
in said step (e), calculating said n-partite graph G(n) through the steps of:
(u) calculating XY coordinates points $pw_{i,j}$ of an intersection between a second cell component of the $IB_j$ with the transect $R_i$, and XY coordinates of points $pw_{i+1,j}$ of an intersection between the second cells component of the $IB_j$ with the transect $R_{i+1}$, and labeling sets of points $pw_{i,j}$ and $pw_{i+1,j}$ in a direction of said incremental pattern growth;

(v) calculating an area of a fragment of said incremental pattern between the neighboring transects $R_i$ and $R_{i+1}$;

(w) labeling components formed by said second cells of said $IB_j$ extending between said neighboring transects $R_i$ and $R_{i+1}$; and (x) calculating a connectivity between sets $PW_i$ and $PW_{i+1}$ of vertices, where vertices $pw_{i,j}$ and $pw_{i+1}$ are connected by an edge only if belonging to the same fragment, calculating the graph $G(n)$ by iterating through the neighboring transects $R_i$ and $R_{i+1}$, and outputting said graph $G(n)$ as a set of binary adjacent matrix $G_i(2)$ describing the structure of said IP under study.

14. The method of claim 13, further comprising the steps of:

after said step (e), calculating an average width $W(m_i)$ and an average area $S(m_i)$ of an incremental band $m_i$ based on a length $L(m_i)$ of the incremental band $M_i$, wherein said width $W(IBm_i)$ is the width of said incremental band $m_i$ along the transects $R_i, \ldots, R_n$, and said area $S(h_{i,j})$ is the area of said incremental band $m_i$ between said neighboring transects $R_i$, and $R_{i+1}$, through the steps of:

associating each vertex $V_i$ crossing transects $R_1, \ldots, R_n$ with a corresponding width of an incremental band crossing the transects $R_1, \ldots, R_n$, calculating the average width $W(m_i)$ as a sum of widths associated with the vertices $V_i$ of the incremental band $m_i$ divided by the length $L(m_i)$, connecting the vertex $V_i$ with a vertex $V_{i+1}$ through a connecting line, associating said connecting line with the area of a corresponding incremental band, and calculating the average area $S(m_i)$ of the incremental band $m_i$ as a sum of areas of connecting lines corresponding to the incremental band $m_i$ divided by $L(m_i)-1$.

15. The method of claim 1, further comprising the steps of:

in said step (g), finding a set of paths $(M^i = \{m_1, \ldots, m_j, \ldots, m_d\}$ in said graph $G(n)$, wherein each point of intersection of a path $m_j$ with a transect $R_i$ is defined as a vertex $V = V_1 \ldots \cup V_i \ldots \cup V_n$, in a set $V_i$, wherein said $M^i$ covers all vertices $V_i$ in said graph $G(n)$, and wherein the paths $m_j$ in said set $M^i$ have no common vertexes, and no path $m_j$ has repeated vertexes.

16. The method of claim 15, further comprising the steps of:

finding a set of vertexes $V_i$, assigning $Q_i = 0$, where $Q_i$ is the total number of vertices $V_i$ covered by paths $m_j$ on an $i^{th}$ iteration;

finding paths $m_j$ which cover all vertices of the set $V_i$;

performing iteration: $Q_i = Q_i + m_i$;

determining if $|V| > Q_i$, and removing vertices covered by $m_i$ from $V_{i+1}, V_{i+2}, \ldots V_n$, if $|V| > Q_i$;

performing iteration $i = i+1$;

finding paths $m_j$ which cover all vertices of the set $V_i$ for said $i = i+1$;

sorting the set $M^i$ over the time scale T;

constructing a plot of an opposite version $M^i$(opposite); and calculating a set of a plurality H of versions of the incremental bands structure $\mu$, where $\mu = \{M^1, M^1(\text{opposite}), \ldots, M^i, M^i(\text{opposite}), \ldots, M^h, M^h(\text{opposite})\}$.

17. The method of claim 16, further comprising the steps of:

upon completing the step (g), plotting, for the $M^i$, the width and area variability across the 2-D plane of the incremental patterns under study as charts $gr\ w(i), i=1, \ldots, n$, and $gr\ a(i)$, "Width of IB vs. Time", and "Area of IB vs. Time" across a 2-D plane of said incremental pattern for different levels of confidence $C[gr\ w(i))]$ and $C[gr\ a(i))]$, respectively, for the length $L(m_i)$ of the incremental band $m_i$ varying from 1 to n, and reducing noise in said charts "Width of IB vs. Time" and "Area of IB vs. Time" through calibrating n sets $GR(j)_{width}$ and $GR(j)_{area}$, respectively, of 2-D charts $gr^i(j)_{width}$ and $gr^i(j)_{area}$ plotted for all calculated versions of the structure $M^1, \ldots, M^i, \ldots, M^H$.

18. The method of claim 17, further comprising the steps of:

after reducing the noise in said charts "Width of IB vs. Time", and "Area of IB vs. Time", calculating the index of adequacy (IA) of the model M of the IP under study as $$IA = S[gr_{area}(n)]/S(IP),$$

where $S[gr_{area}(n)]$ is the sum of areas of incremental bands comprising the chart $gr_{area}(n)$, and $S(IP)$ is the area of a segment of the incremental pattern situated between the transects $R_1$ and $R_n$, wherein with said predetermined number n of transects, the model $M = \{G(n), F_{m,n}\}$ attains a complete representation of the image of the IP under study, and where the $S[gr_{area}(n)] \to S(IP)$, and the $IA \to 1$.

19. The method of claim 18, further comprising the steps of:

calculating an index of structural anisotropy (ISA) where $ISA(j) = \{[Uncertainty_{Width}(j) + Uncertainty_{Area}(j)]/2, + Uncertainty_{Structure}(j)\}/2$, through the steps of:

calculating a Chart $gr_w(j, X_f)$ for the randomly chosen version $X_f$ of the structure of incremental bands, wherein the chart $gr_w(j, X_f)$ takes into account incremental bands crossing one j transects where, $j=1, \ldots, n$, and wherein a set $X_f$ includes incremental bands $A_{1,f} \ldots A_{u,f} \ldots, A_{k,f}$; $X_f = \{A_{1,f} \ldots A_{u,f}, \ldots, A_{k,f}\}$;

calculating a version of the structure of incremental bands $Y_f$ which differs maximally from the $X_f$, where a set $Y_f$ consists of incremental bands $B_{1,f} \ldots B_{u,f}, \ldots, B_{k,f}$; $Y_f = \{B_{1,f} \ldots B_{u,f}, \ldots, B_{k,f}\}$;

calculating a chart $gr_w(j, Y_f)$ for a version $Y_f$ of the structure of incremental bands;

calculating a difference $\Delta Width(j, X_f, Y_f)_j$ between charts $gr_w(j, X_f)$ and $gr_w(j, Y_f)$ for an instance of time $T_u$, where $u=1, \ldots, k$, wherein $$\Delta Width(j, X_f, Y_f)_u = |Width(j, X_f)_u - Width(j, Y_f)_u|/B,$$

where width$(j, X_f)_u$ is the width of an incremental band (IB) at the instance of time $T_u$ for the versions $X_f$ of the structure of incremental bands;

width$(j, Y_f)_u$ is the width of the IB at the instance of time $T_u$ for the versions $Y_f$ of the structure of IB; and $$B = \max[Width(j, X_f)_u, Width(j, Y_f)_u)];$$

repeating calculations of $grw(j, X_f)$, $Y_f$, $grw(j, Y_f)$ and $\Delta Width(j, X_f, Y_f)$ for the instance of time $T_u$ and for versions of the structure of IB $X_1, Y_1, \ldots, X_f, Y_f, \ldots, X_h, Y_h$, resulting in the sequence of values $\Delta Width(j, X_1, Y_1)_u, \ldots, \Delta Width(j, X_f, Y_f)_u, \ldots, \Delta Width(j, X_h, Y_h)_u$;

averaging values $\Delta Width(n, X_f, Y_f)_u$ over H/2 pairs of the structure of IB for the instance of time $T_u$, wherein $$\Delta Width(j)_u = (1/h) * \Sigma \Delta Width(j, X_f, Y_f)_u, f=1, \ldots, h,$$

where $\Delta\text{Width}(j)_u$ is the variability of the width of incremental band at the instance of time $T_u$ due to the structural anisotropy of the incremental pattern under study, and where the $\Delta\text{Width}(j)_u$ takes into account incremental bands crossed j transects j+1, . . . n; and repeating said averaging for the instances of time $T_1, \ldots, T_u, \ldots T_k$, resulting in the sequence of values $\Delta\text{Width}(j)_1, \ldots, \Delta\text{Width}(j)_u, \ldots, \Delta\text{Width}(j)_k$;

averaging $\Delta\text{Width}(j)_1, \ldots, \Delta\text{Width}(j)_u, \ldots, \Delta\text{Width}(j)_k$ over $T_1, \ldots, T_u, \ldots T_k$ to calculate the parameter Uncertainty$_{Width}(j)$ as Uncertainty$_{Width}(j)=(1/k)*\Sigma[\Delta\text{Width}(j)_u]$, $u=1,\ldots,k$;

calculating the Uncertainty$_{Area}(j)$ according to the calculation of the parameter Uncertainty$_{Width}(j)$ by substituting the width of incremental bands with an area of incremental bands;

calculating the parameter Uncertainty$_{Structure}(j)$ through the steps of:

calculating a difference $\Delta\text{Structure}(j, A_{u,f}, B_{u,f})$ between structure of incremental band $A_{u,f} \in X_f$ and $B_{u,f} \in Y_f$ as:

$\Delta\text{Structure}(j,A_{u,f},B_{u,f})=(|A_{u,f} \cap B_{u,f}|)/(|A_{u,f} \cup B_{u,f}|)$, wherein, if $A_{u,f}$ is identical to $B_{u,f}$, then $|A_{u,f} \cap B_{u,f}|= |A_{u,f} \cup B_{u,f}|$, and $\Delta\text{Structure}(j, A_{u,f}, B_{u,f})=1$, then at the instance of time $T_u$, the incremental pattern is the isotropic object, and, wherein, if $A_{u,f} \cap B_{u,f}=\emptyset$, then $\Delta\text{Structure}(j, A_{u,f}, B_{u,f})=0$, then the level of anisotropy of the incremental pattern under study is maximal at the instance of time $T_u$;

repeating the calculation of the difference for the version of incremental bands $X_1, Y_1, \ldots, X_f, Y_f, \ldots, X_h, Y_h$, resulting in the sequence of values: $\Delta\text{Structure}(j, A_{u,1}, B_{u,1}), \ldots, \Delta\text{Structure}(j, A_{u,f}, B_{u,f}), \ldots, \Delta\text{Structure}(j, A_{u,h}, B_{u,h})$;

averaging the values $\Delta\text{Structure}(j, A_{u,1}, B_{u,1}), \ldots \Delta\text{Structure}(j, A_{u,f}, B_{u,f}), \ldots, \Delta\text{Structure}(j, A_{u,h}, B_{u,h})$ over versions of incremental bands structures $X_1, Y_1, \ldots, X_f, Y_f, \ldots, X_h, Y_h$ to calculate the Uncertainty$_{Structure}(j)_u$ at the instance of time $T_u$, where Uncertainty$_{Structure}(j)_u=(1/h)*(\Sigma\Delta\text{Structure}(j,A_{u,f}B_{u,f})$, $f=1,\ldots,h$;

repeating averaging of values $\Delta\text{Structure}(j, A_{u,1}, B_{u,1}), \ldots, \Delta\text{Structure}(j, A_{u,f}, B_{u,f}), \ldots, \Delta\text{Structure}(j, A_{u,h}, B_{u,h})$ for the time instances $T_1, \ldots, T_u, T_k$, resulting in the sequence of values Uncertainty$_{Structure}(j)_1, \ldots$, Uncertainty$_{Structure}(j)_u, \ldots$, Uncertainty$_{Structure}(j)_k$;

averaging values Uncertainty$_{Structure}(j)_1, \ldots$, Uncertainty$_{Structure}(j)_u, \ldots$, Uncertainty$_{Structure}(j)_k$ in order to quantify the Uncertainty$_{Structure}(j)$ for the 2-D incremental pattern under study, where Uncertainty$_{Structure}(j)=(1/k)*\Sigma$Uncertainty$_{Structure} j)_u$, $u=1,\ldots,k$, where the area of the variability of variability Uncertainty$_{Structure}(j)$ is [0.1], and where, if the Uncertainty$_{Structure}(j)=0$, then the IP is the object with structural isotropy, and where the Uncertainty$_{Structure}(j)=1$ indicates the highest level of variability of the structure of incremental bands in different directions; and calculating the index of structural anisotropy ISA(j) of the 2-D incremental pattern under study as:

ISA$(j)=\{[\text{Uncertainty}_{Width}(j)+\text{Uncertainty}_{Area}(j)]/2+$ Uncertainty$_{Structure}(j)\}/2$, where j=n.

20. A system for parameterization of incremental patterns, comprising:

a computer system configured for parameterization of incremental patterns, an imaging system for acquiring an image of an incremental pattern (IP) under study containing incremental bands, said imaging system being coupled to an input of said computer system to supply said IP image under study thereto for further processing therein, wherein said computer system converts said IP image into an initial binary image in a pixel format a format converter operatively coupled with said computer system to convert said initial binary image in the pixel format into an initial binary image in CSV format;

a filtering unit operatively coupled with said computer system and configured to process said initial binary image to remove therefrom lines different from incremental bands, thereby forming a filtered initial binary image;

a transects plotting unit operatively coupled with said filtering unit and configured for plotting a plurality of transects onto said filtered initial binary image, where each of said plurality of transects extends in a crossing relationship with at least one of said incremental bands at an angle $\alpha_j$ therebetween a segmentation/labeling unit operatively coupled with said computer system and configured to apply segmentation/labeling procedure to convert said filtered initial binary image into an n-partite graph G(n) describing an anisotropic structure of said incremental pattern under study, wherein said segmentation and labeling procedure is applied between neighboring transects in each pair thereof, resulting in a set of bi-partite graphs $G_1(2), G_2(2), \ldots, G_{n-1}(2)$, where bi-partite graphs $G_j(2)$ and $G_{j+1}(2)$ of said set of bi-partite graphs are situated between neighboring transects $R_j$; $R_{j+1}$, and $R_{j+2}$, respectively, and wherein said neighboring bi-partite graphs $G_1(2), G_2(2), \ldots, G_{n-1}(2)$, are merged into said n-partite graph G(n), based on the common vertex along said transects $R_{j+1}$ situated between each pair of neighboring bi-partite graphs a model constructing unit operatively coupled with said computer systems and configured to calculate a width and an area of each of a growth incremental band, wherein said model constructing unit adjusts the width if said angle $\alpha_j$ deviates from 90°;

a structure calculation unit operatively coupled with said model constructing unit and said segmental/labeling unit in said computer system and configured to calculate a structure of the growth incremental bands in said IP under study, and processing said n-partite graph G(n) to find a set of paths $M^i=\{m_1,\ldots,m_j,\ldots,m_j\}$ in said graph G(n), wherein each point of intersection of a path $m_j$ with a transects $R_i$ is defined as a vertex $V=V_1 \ldots \cup V_i \ldots \cup V_n$, wherein said $M^i$ covers all vertices $V_i$ in said graph G(n), and wherein the paths $m_j$ in said set M' have no common vertexes, and no path m has repeated vertexes an index of adequacy (IA) unit operatively coupled with said model constructing unit and configured to calculate the IA for the model of growth incremental bands an index of structural anisotropy (ISA) unit operatively coupled with said model constructing unit and said structure calculation unit and configured to calculate the ISA; and an output unit at an output of said computer system to output results of parameterization of said IP under study in a predetermined format.

* * * * *